United States Patent
Rabel et al.

(10) Patent No.: US 11,287,266 B2
(45) Date of Patent: *Mar. 29, 2022

(54) MAPLETS FOR MAINTAINING AND UPDATING A SELF-HEALING HIGH DEFINITION MAP

(71) Applicant: HERE Global B.V., Eindhoven (NL)

(72) Inventors: Dietmar Rabel, Eindhoven (NL); Robert Ledner, Eindhoven (NL); Carolyn Johnston, Eindhoven (NL); Jan Van Sickle, Eindhoven (NL); Timm Kayser, Eindhoven (NL); Eric Dieckman, Eindhoven (NL)

(73) Assignee: HERE Global B.V., Eindhoven (NL)

( * ) Notice: Subject to any disclaimer, the term of this patent is extended or adjusted under 35 U.S.C. 154(b) by 49 days.

This patent is subject to a terminal disclaimer.

(21) Appl. No.: 16/352,301

(22) Filed: Mar. 13, 2019

(65) Prior Publication Data
US 2020/0292328 A1    Sep. 17, 2020

(51) Int. Cl.
*G01C 21/32* (2006.01)
*G06F 16/29* (2019.01)
(Continued)

(52) U.S. Cl.
CPC ......... *G01C 21/32* (2013.01); *G06F 16/2365* (2019.01); *G06F 16/29* (2019.01); *G06K 9/00818* (2013.01); *G06K 9/00825* (2013.01)

(58) Field of Classification Search
CPC ......... G06T 2207/30252; G01C 21/32; G01C 21/3602; B60W 2420/42; G06K 9/00798;
(Continued)

(56) References Cited

U.S. PATENT DOCUMENTS

| | | | | |
|---|---|---|---|---|
| 5,517,419 A | * | 5/1996 | Lanckton | G01C 7/04 348/148 |
| 6,526,284 B1 | * | 2/2003 | Sharp | G01C 21/26 340/995.1 |

(Continued)

FOREIGN PATENT DOCUMENTS

DE    102010055370 A1    6/2012
DE    102014217847 A1    3/2016
(Continued)

OTHER PUBLICATIONS

"An algorithm for automatic detection of pole-like street furniture objects from Mobile Laser Scanner point clouds" to Cabo et al., ISPRS Journal of Photogrammetry and Remote Sensing 87 (2014) 47-56 ("Cabo") (Year: 2014).*

(Continued)

*Primary Examiner* — Kenneth J Malkowski
(74) *Attorney, Agent, or Firm* — Alston & Bird LLP

(57) ABSTRACT

An apparatus is onboard a vehicle and in communication with sensors onboard the vehicle. The apparatus receives a maplet request identifying a request region; and, responsive to determining that the vehicle is within the request region, processes sensor data captured by sensors to generate a multi-sensor data stream corresponding to a road network segment. The apparatus identifies an observation corresponding to a pole-like object within the multi-sensor data stream; and generates a maplet based on the observation and the maplet request. Generating the maplet comprises using a predetermined data model and a predetermined data format corresponding to a pole-like object observation class to encode road data corresponding to the observation corresponding to the pole-like object. The apparatus provides the maplet such that a network apparatus receives the maplet. The network apparatus is configured to validate/update map (Continued)

data of a digital map representing the road network based on the maplet.

9 Claims, 23 Drawing Sheets

(51) Int. Cl.
*G06K 9/00* (2022.01)
*G06F 16/23* (2019.01)

(58) Field of Classification Search
CPC .......... G06K 9/00791; G06K 9/00818; G06K 9/00825; G06F 16/2365; G06F 16/29
See application file for complete search history.

(56) References Cited

U.S. PATENT DOCUMENTS

| | | |
|---|---|---|
| 6,675,081 B2 | 1/2004 | Shuman et al. |
| 7,552,008 B2 | 6/2009 | Newstrom et al. |
| 8,699,755 B2 | 4/2014 | Stroila et al. |
| 8,750,567 B2 | 6/2014 | Zhang et al. |
| 8,751,150 B2 | 6/2014 | Stahlin |
| 9,123,152 B1 | 9/2015 | Chatham |
| 9,140,555 B1 | 9/2015 | Andersson et al. |
| 9,140,792 B2 | 9/2015 | Zeng |
| 9,372,089 B2 | 6/2016 | Bennah et al. |
| 9,459,626 B2 | 10/2016 | Chen et al. |
| 9,478,138 B2 | 10/2016 | Nagy |
| 9,489,601 B2 | 11/2016 | Fairfield et al. |
| 9,530,062 B2 | 12/2016 | Nguyen et al. |
| 9,553,998 B2 | 1/2017 | Permude |
| 9,710,714 B2 | 7/2017 | Chen et al. |
| 9,721,471 B2 | 8/2017 | Chen et al. |
| 9,834,207 B2 | 12/2017 | O'Dea et al. |
| 2003/0043260 A1 | 3/2003 | Yap |
| 2003/0156049 A1 | 8/2003 | Behr |
| 2004/0247157 A1* | 12/2004 | Lages ............... G06K 9/00805 382/103 |
| 2010/0070160 A1 | 3/2010 | Haatainen et al. |
| 2011/0015854 A1 | 1/2011 | Mudalige et al. |
| 2011/0275388 A1 | 11/2011 | Haney |
| 2011/0302214 A1 | 12/2011 | Frye et al. |
| 2013/0006925 A1 | 1/2013 | Sawai et al. |
| 2013/0253732 A1 | 9/2013 | Patel et al. |
| 2014/0104051 A1* | 4/2014 | Breed ................. G01S 17/86 340/435 |
| 2014/0132723 A1* | 5/2014 | More ................. G01S 7/497 348/46 |
| 2014/0229279 A1 | 8/2014 | Hohs |
| 2014/0350839 A1 | 11/2014 | Pack et al. |
| 2015/0123778 A1 | 5/2015 | Konet et al. |
| 2015/0254977 A1 | 9/2015 | Grabow et al. |
| 2015/0256534 A1 | 9/2015 | Goudy et al. |
| 2015/0266471 A1 | 9/2015 | Ferguson et al. |
| 2015/0371094 A1 | 12/2015 | Gardiner et al. |
| 2016/0026899 A1 | 1/2016 | Wang et al. |
| 2016/0094420 A1 | 3/2016 | Clemm et al. |
| 2016/0171893 A1 | 6/2016 | Chen et al. |
| 2016/0176341 A1 | 6/2016 | Raghu et al. |
| 2016/0197799 A1 | 7/2016 | Clemm et al. |
| 2016/0221592 A1 | 8/2016 | Pattagunta |
| 2016/0258777 A1 | 9/2016 | Bodake |
| 2016/0282127 A1 | 9/2016 | Goto et al. |
| 2016/0368492 A1 | 12/2016 | Al-Stouhi |
| 2017/0003396 A1 | 1/2017 | Adachi |
| 2017/0008455 A1 | 1/2017 | Goudy et al. |
| 2017/0008521 A1* | 1/2017 | Braunstein ......... G01C 21/3492 |
| 2017/0032671 A1 | 2/2017 | Toyama et al. |
| 2017/0122749 A1 | 5/2017 | Urano et al. |
| 2017/0166219 A1 | 6/2017 | Jammoussi et al. |
| 2017/0217368 A1 | 8/2017 | Lewis et al. |
| 2017/0236419 A1 | 8/2017 | Grewe |
| 2017/0243485 A1 | 8/2017 | Rubin et al. |
| 2017/0307398 A1 | 10/2017 | Iwaasa |
| 2017/0337813 A1 | 11/2017 | Taylor |
| 2017/0345228 A1 | 11/2017 | Dibb et al. |
| 2018/0005254 A1 | 1/2018 | Bai et al. |
| 2018/0101173 A1 | 4/2018 | Banerjee et al. |
| 2018/0151066 A1 | 5/2018 | Oba |
| 2018/0164825 A1 | 6/2018 | Matus et al. |
| 2018/0188037 A1* | 7/2018 | Wheeler .......... G08G 1/096827 |
| 2018/0188039 A1 | 7/2018 | Chen et al. |
| 2018/0188372 A1 | 7/2018 | Wheeler et al. |
| 2018/0189578 A1* | 7/2018 | Yang ................... G06K 9/4638 |
| 2018/0189678 A1 | 7/2018 | Gupta et al. |
| 2018/0197412 A1 | 7/2018 | Uchiyama |
| 2018/0231387 A1 | 8/2018 | Thiel et al. |
| 2018/0288589 A1 | 10/2018 | Punithan et al. |
| 2018/0300564 A1 | 10/2018 | Kwant et al. |
| 2018/0304904 A1 | 10/2018 | Stahlin |
| 2018/0364717 A1 | 12/2018 | Douillard |
| 2018/0364734 A1 | 12/2018 | Ferguson et al. |
| 2019/0019409 A1 | 1/2019 | Farr et al. |
| 2019/0025838 A1 | 1/2019 | Artes et al. |
| 2019/0035277 A1 | 1/2019 | Son et al. |
| 2019/0080142 A1 | 3/2019 | Abeywardena |
| 2019/0128678 A1 | 5/2019 | Merfels et al. |
| 2019/0132709 A1 | 5/2019 | Graefe et al. |
| 2019/0137287 A1 | 5/2019 | Pazhayampallil et al. |
| 2019/0139403 A1 | 5/2019 | Alam et al. |
| 2019/0141495 A1 | 5/2019 | Jha et al. |
| 2019/0205695 A1* | 7/2019 | Yan ................... G06K 9/6202 |
| 2019/0271550 A1* | 9/2019 | Breed ................. G08G 1/147 |
| 2019/0278273 A1 | 9/2019 | Behrendt et al. |
| 2019/0279247 A1 | 9/2019 | Finken et al. |
| 2019/0286151 A1 | 9/2019 | Palanisamy et al. |
| 2019/0291742 A1 | 9/2019 | Leach et al. |
| 2019/0295003 A1 | 9/2019 | Dronen et al. |
| 2019/0370566 A1 | 12/2019 | Su et al. |
| 2020/0027241 A1 | 1/2020 | Tong et al. |
| 2020/0098135 A1 | 3/2020 | Ganjineh et al. |
| 2020/0104608 A1 | 4/2020 | Watanabe et al. |
| 2020/0141729 A1* | 5/2020 | Nishita ................ G01S 17/66 |
| 2020/0184233 A1 | 6/2020 | Berberian et al. |
| 2020/0209852 A1 | 7/2020 | Soryal |
| 2020/0210769 A1 | 7/2020 | Hou et al. |
| 2020/0249032 A1* | 8/2020 | Lee ................... G01C 21/3848 |
| 2020/0250439 A1 | 8/2020 | Vig et al. |
| 2020/0302189 A1 | 9/2020 | Shu |

FOREIGN PATENT DOCUMENTS

| | | |
|---|---|---|
| DE | 102016211751 A1 | 1/2018 |
| EP | 3 165 879 A1 | 5/2017 |
| WO | WO-2017/025334 A1 | 2/2017 |
| WO | WO-2017/076410 A1 | 5/2017 |
| WO | WO-2017/200532 A1 | 11/2017 |
| WO | WO-2017/215829 A1 | 12/2017 |
| WO | WO-2018/017793 A1 | 1/2018 |
| WO | WO-2018/104563 A2 | 6/2018 |

OTHER PUBLICATIONS

United States Patent and Trademark Office, NonFinal Office Action for U.S. Appl. No. 16/352,206, dated Feb. 12, 2020, (39 pages), USA.

Reichardt, Dirk et al. *CarTalk 2000: Safe and Comfortable Driving Based Upon Inter-Vehicle-Communication*, Intelligent Vehicle Symposium, vol. 2, Jun. 17, 2002, pp. 545-550. DOI: 10.1109/ivs.2002.1188007.

ÖZünger Ümit et al. *Systems For Safety and Autonomous Behavior In Cars: The DRAPA Grand Challenge Experience*, Proceedings of the IEEE, vol. 95, No. 2, Feb. 2007, pp. 397-412.

Laugier, Christian et al. *Probabilistic Analysis of Dynamic Scenes and Collision Risks Assessment to Improve Driving Safety*, Its Journal, Informa UK (Taylor & Francis), (2011), vol. 3, No. 4, pp. 4-19. DOI: 10.1109/MITS.2011.942779.

European Patent Office, Extended European Search Report received for EP Application No. 20162991.2, dated Aug. 13, 2020, 10 pages.

(56) References Cited

OTHER PUBLICATIONS

*3D Mobile Mapping*, pp. 1-5, [online], [retrieved from the Internet Jul. 18, 2019] <URL:https://web.archive.org/web/20160314203351/heep://www.egis.co.za/services/3D_mobile_mapping>.
Varela-Gonzalez, et al., *A Citygml Extension For Traffic-Sign Objects That Guides The Automatic Processing Of Data Collected Using Mobile Mapping Technology*, The International Archives of the Photogrammetry, Remote Sensing and Spatial Information Sciences, vol. XL-1, ISPRS Technical Commission I Symposium, Nov. 17-20, 2014, pp. 415-420, Denver, Colorado.
Lipski et al., *A Fast and Robust Approach To Lane Marking Detection and Lane Tracking*, 2008 IEEE Southwest Symposium on Image Analysis and Interpretation, May 12, 2008, pp. 57-60, Santa Fe, New Mexico, [retrieved from the Internet Jul. 18, 2019] <URL: https://ieeexplore.ieee.org/abstract/document/4512284>.
Kim et al., *Detection and Tracking Of Road Barrier Based On Radar and Vision Sensor Fusion*, Journal of Sensors, vol. 2016, Article ID 1963450, (2016), pp. 1-8, [retrieved from the Internet Jul. 18, 2019] <URL: https://doi.org/10.1155/2016/1963450>.
Sairam et al., *Development Of Mobile Mapping System For 3D Road Asset Inventory*, Sensors, vol. 16(3):367, Mar. 12, 2016, pp. 1-19, Basel, Switzerland. DOI: 10.3390/s16030367.
Olson et al., *Exploration and Mapping With Autonomous Robot Teams Results From The Magic 2010 Competition*, Magazine Communications of he ACM, vol. 56, Issue 3, Mar. 2013, pp. 1-7. DOI: 10.1145/2428556.2428574.
Lemmens, *Mobile Laser Scanning Point Clouds—Automatic 3D Mapping of Road Objects*, Geomatrics World Newsletter, Jan. 15, 2018, (3 pages), [retrieved from the Internet Jul. 18, 2019] <URL: https://www.geomatics-world.co.uk/content/article/mobile-laser-scanning-point-clouds-automatic-3d-mapping-of-road-objects>.
Jo et al., *Precise Localization Of An Autonomous Car Based On Probabilistic Noise Models Of Road Surface marker Features Using Multiple Cameras*, IEEE Transactions on Intelligent Transportation Systems, vol. 16, Issue 6, Dec. 2015, pp. 3377-3392. DOI: 10.1109/TITS.2015.2450738.
Condliffe, *Your Car's Sensors Are About To Shorten Your Commute*, MIT Technology Review, Sep. 26, 2016, (21pages), [online], [retrieved from the Internet Jul. 18, 2019] <URL: https://www.technologyreview.com/s/602463/your-cars-sensors-are-about-to-shorten-your-commute/>.
European Patent Office, Extended European Search Report received for EP Application No. 20161911.1, dated Aug. 11, 2020, 9 pages, Germany.
United States Patent and Trademark Office, Advisory Action, Interview Summary, and AFCP 2.0 Decision received for U.S. Appl. No. 16/352,206, dated Jul. 31, 2020, 5 pages, USA.
United States Patent and Trademark Office, Non-Final Office Action for U.S. Appl. No. 16/352,206 dated Aug. 25, 2020, 41 pages.
United States Patent and Trademark Office, Final Office Action for U.S. Appl. No. 16/352,206, dated May 21, 2020, (54 pages), USA.
Final Office Action for U.S. Appl No. 16/352,206 dated Dec. 28, 2020 (54 pages).
United States Patent and Trademark Office, Non-Final Office Action for U.S. Appl. No. 16/352,337 dated Oct. 14, 2020, 30 pages.
United States Patent and Trademark Office, Non-Final Office Action for U.S. Appl. No. 16/352,265 dated Oct. 20, 2020, 34 pages.
United States Patent and Trademark Office, Non-Final Office Action for U.S. Appl. No. 16/352,286 dated Oct. 13, 2020, 32 pages.
United States Patent and Trademark Office, Non-Final Office Action for U.S. Appl. No. 16/352,327 dated Oct. 27, 2020, 37 pages.
United States Patent and Trademark Office, Non-Final Office Action for U.S. Appl. No. 16/352,317 dated Nov. 2, 2020, 37 pages.
United States Patent and Trademark Office, Non-Final Office Action for U.S. Appl. No. 16/352,278 dated Nov. 3, 2020, 42 pages.
United States Patent and Trademark Office, Non-Final Office Action for U.S. Appl. No. 16/352,254 dated Nov. 4, 2020, 38 pages.
United States Patent and Trademark Office, Non-Final Office Action for U.S. Appl. No. 16/352,225 dated Nov. 5, 2020, 20 pages.
United States Patent and Trademark Office, Final Office Action for U.S. Appl. No. 16/352,278 dated Apr. 7, 2021.
United States Patent and Trademark Office, Final Office Action for U.S. Appl. No. 16/352,254 dated Apr. 7, 2021.
United States Patent and Trademark Office, Final Office Action for U.S. Appl. No. 16/352,286 dated Mar. 3, 2021.
United States Patent and Trademark Office, Final Office Action for U.S. Appl. No. 16/352,337 dated Mar. 8, 2021.
United States Patent and Trademark Office, Final Office Action for U.S. Appl. No. 16/352,225 dated Apr. 6, 2021.
United States Patent and Trademark Office, Final Office Action for U.S. Appl. No. 16/352,265 dated Mar. 8, 2021.
United States Patent and Trademark Office, Final Office Action for U.S. Appl. No. 16/352,317 dated Apr. 7, 2021.
United States Patent and Trademark Office, Final Office Action for U.S. Appl. No. 16/352,327 dated Apr. 8, 2021.
United States Patent and Trademark Office, Notice of Allowance for U.S. Appl. No. 16/352,206 dated Apr. 16, 2021.
United States Patent and Trademark Office, Non-Final Office Action for U.S. Appl. No. 16/352,225 dated Nov. 9, 2021.
United States Patent and Trademark Office, Notice of Allowance for U.S. Appl. No. 16/352,265 dated Nov. 8, 2021.
United States Patent and Trademark Office, Corrected Notice of Allowance for U.S. Appl. No. 16/352,265 dated Nov. 17, 2021.
United States Patent and Trademark Office, Notice of Allowance for U.S. Appl. No. 16/352,301 dated Nov. 22, 2021.
United States Patent and Trademark Office, Notice of Allowance for U.S. Appl. No. 16/352,337 dated Nov. 17, 2021.

\* cited by examiner

```
{
    SDRI_ID =
    Compression Factor =
    UTC Time Offset =
    Pose Points Flag =
    GNSS Points Flag =
    Sign Faces Flag =
    Road Surface Markings Flag =
    Pole Like Objects Flag =
    Construction Markers Flag =
    Traffic Signals Flag =
    Lane Markings Flag =
    Pavement Edge Flag =
    Roadside Barriers Flag =

Position Type =
    GNSS Antennae to VCS Offset =
    Pose Point Stdev =
    GNSS Stdev =
    Lane Marking Stdev =
    Driving Surface Edge Stdev =
    Roadside Barriers Stdev =
    Pose Point Drift Rates =

Orientation Type =
    Euler Rotation Type =
    Euler Rotation Order =
    Quaternion Order =
}
```
— 1010

FIG. 10

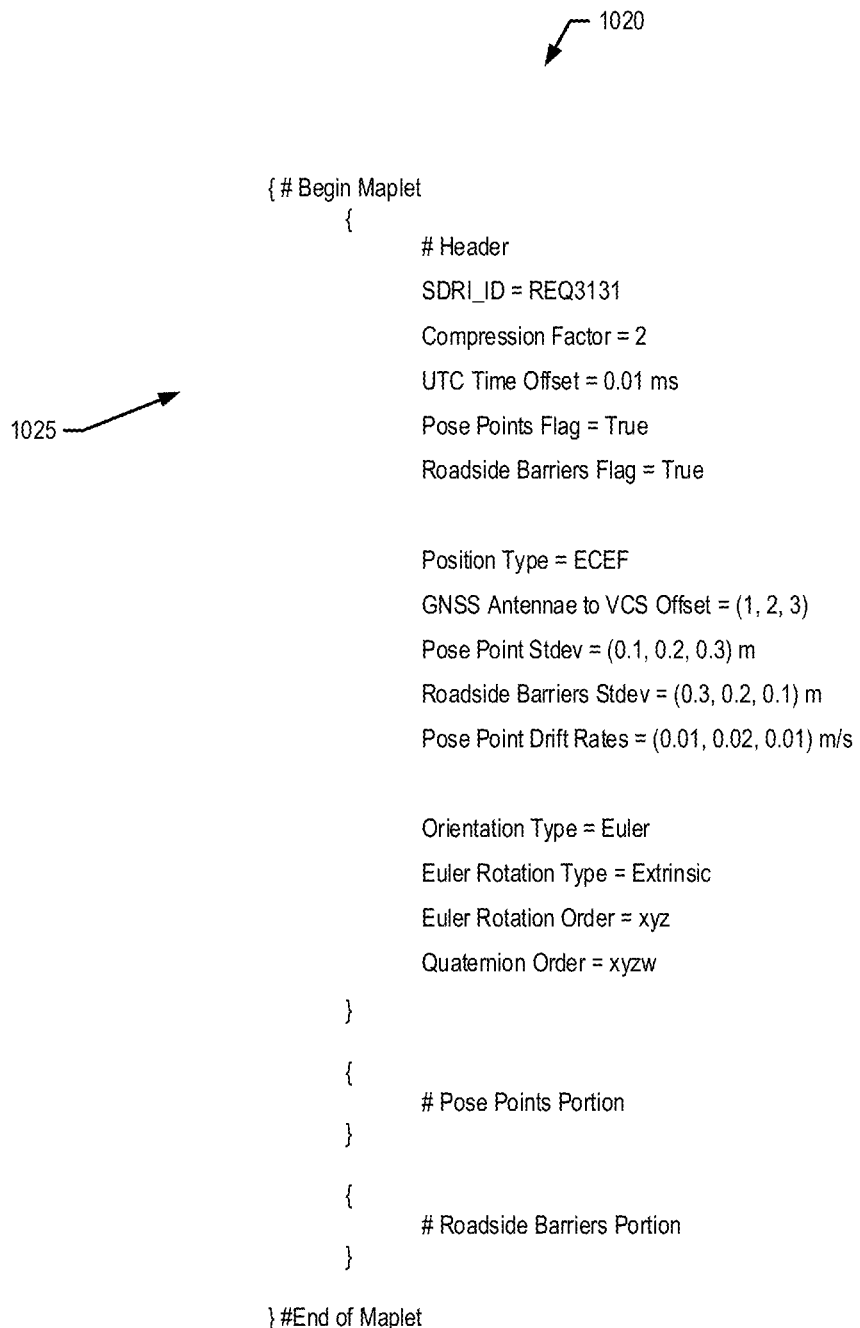

```
                            ← 1020

{ # Begin Maplet
              {
                        # Header
                        SDRI_ID = REQ3131
                        Compression Factor = 2
                        UTC Time Offset = 0.01 ms
1025 ──→                Pose Points Flag = True
                        Roadside Barriers Flag = True Position Type = ECEF
                        GNSS Antennae to VCS Offset = (1, 2, 3)
                        Pose Point Stdev = (0.1, 0.2, 0.3) m
                        Roadside Barriers Stdev = (0.3, 0.2, 0.1) m
                        Pose Point Drift Rates = (0.01, 0.02, 0.01) m/s Orientation Type = Euler
                        Euler Rotation Type = Extrinsic
                        Euler Rotation Order = xyz
                        Quaternion Order = xyzw
              }
              {
                        # Pose Points Portion
              }
              {
                        # Roadside Barriers Portion
              }
            } #End of Maplet
```

{
      Timestamp = [t1, ... tn]
      Pose Point ECEF = [(x1, y1, z1), ... (xn, yn, zn)]
      Pose Point Geodetic =
      Pose Point Elevation =
      Vehicle Orientation Euler = [O1, ... On]
      Vehicle Orientation Quaternion =
   }
```

1210

{
  Time Stamp = t1, ... tn
  GNSS Point ECEF = (x1, y1, z1), ... (xn, yn, zn)
  GNSS Point Geodetic =
  GNSS Point Elevation =
  PDOP = (P1, ... Pn)
  Constellation Count = (C1, ... Cn)
  Mask Angle = (A1, ... A2)
  RINEX = ABCDEF
}

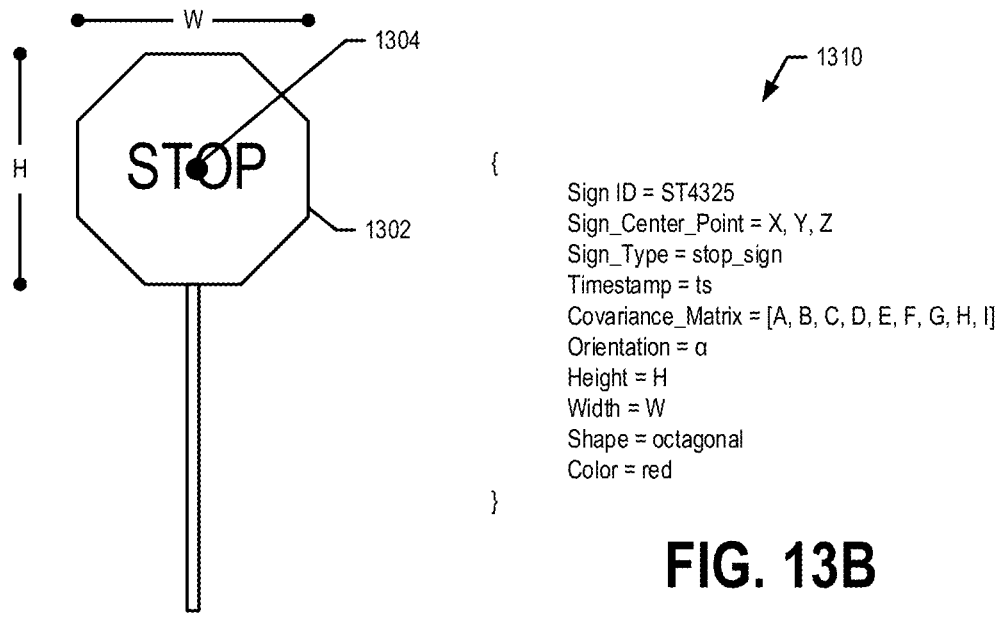
FIG. 13A
```
{
  Sign ID = ST4325
  Sign_Center_Point = X, Y, Z
  Sign_Type = stop_sign
  Timestamp = ts
  Covariance_Matrix = [A, B, C, D, E, F, G, H, I]
  Orientation = α
  Height = H
  Width = W
  Shape = octagonal
  Color = red
}
```
FIG. 13B
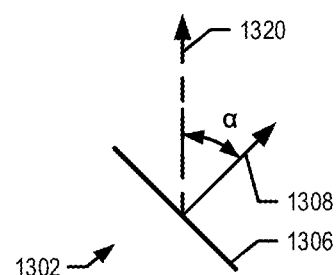
FIG. 13C {
Road Marking ID = RA12345
Timestamp = ts
Bounding Polygon = [(x1, y1), (x2, y2), (x3, y3), (x4, y4)]
Covariance_Matrix = [A, B, C, D, E, F, G, H, I]
Color = white
Marking_Type = right_turn_arrow
}

```
{
    PLO ID = PLO12345
    Timestamp = ts
    Upper Point = (xu, yu, zu)
    Lower Point = (xl, yl, zl)
    Covariance Matrix = [A, B, C, D, E, F, G, H, I]
    Upper Diameter = du
    Lower Diameter = dl
    Diameter Accuracy = a
    Color = green
    Reflectivity = R
    Reflector Coordinates = (xr, yr, zr)
    Reflectors Covariance Matrix = [J, K, L, M, N, O, P, Q, S]
}
```

```
                                              ┌─ 17010
                                              ▼
{
    Traffic Signal ID = TS3579
    Timestamp = ts
    Bounding Polygon = (x1, y1, z1), (x2, y2, z2), (x3, y3, z3),
(x4, y4, z4)
    Covariance Matrix = [A, B, C, D, E, F, G, H, I]
    Horizontal Tier Count =
    Vertical Tier Count = 3
    Horizontal Tier Light Count = 0
    Vertical Tier Light Count = (2, 2, 1)
}
```

MAPLETS FOR MAINTAINING AND UPDATING A SELF-HEALING HIGH DEFINITION MAP

TECHNOLOGICAL FIELD

An example embodiment relates generally to detecting and/or communicating information/data regarding features of a road network. An example embodiment relates generally to providing a correct, accurate, and up-to-date digital map representing a road network.

BACKGROUND

Vehicles will soon be making driving decisions without human intervention. Map information/data is an important and indispensable source of guidance for autonomous vehicles, so it is preferable that the map information/data be correct, accurate, and up-to-date. The world is not static. It is constantly shifting and evolving. Therefore, it is preferred that mapping systems detect, verify, and update mapping information/data based on changes that are happening in the world in near real-time or real-time.

BRIEF SUMMARY OF SOME EXAMPLE EMBODIMENTS

Correct, accurate, and up-to-date map information/data is important for performing various navigation functions by an autonomous, self-driving vehicle, an advanced driver assistances system (ADAS), and/or a vehicle apparatus configured to assist and/or guide a human operator. For example, map information/data may be used to perform navigation functions such as localization, route determination, lane level route determination, lane maintenance, route guidance, lane level route guidance, provision of traffic information/data, provision of lane level traffic information/data and/or the like. However, as road networks and conditions of road networks (e.g., construction, obstructions, traffic incidents, state of traffic signals, and/or the like) are constantly shifting and evolving, it is preferred that the map information/data is regularly modified and/or updated to maintain map information/data that is correct, accurate, and up-to-date. Preferably the map information/data would be updated in at least near real time (e.g., near real time or real time) with respect to changes in the road network. One strategy for maintaining a digital map such that the map information/data of the digital map is correct, accurate, and up-to-date is to crowdsource information/data from sensors installed on vehicle in order to timely detect changes to the road network and/or conditions of the road network and to determine appropriate updates for the map information/data to reflect the detected changes.

Various embodiments provide methods, systems, apparatuses, and computer program products for updating a digital map representing a road network such that the map information/data of the digital map is correct, accurate, and up-to-date. For example, various embodiments provide methods, systems, apparatuses, and computer program products for crowdsourcing road information/data such that topology of portions of the road network and/or changes to the road network may be efficiently and timely identified and the map information/data of the digital map may be updated accordingly. In various embodiments, the road information/data is generated based on sensor information/data captured by sensors onboard a vehicle traversing at least a portion of the road network. A vehicle apparatus onboard the vehicle may process the sensor information/data to generate the road information/data. Various embodiments provide for the reporting of the road information/data in a predetermined, standardized data model using predetermined, standardized data formats. The predetermined, standardized data model and predetermined standardized data formats are configured for efficient use of network bandwidth for the transmitting of the road information/data. In various embodiments, the road information/data is packaged, compiled, formatted, and/or the like into a maplet. A maplet is a data structure comprising (a) abstracted, parameterized, fused representations of environment elements detected in sensor information/data captured by one or more sensors of a vehicle apparatus and (b) a representation of the vehicle's trajectory history for a segment of a vehicle's trajectory. In an example embodiment, the segment of the vehicle's trajectory may correspond to predetermined length and/or time of a single vehicle ignition cycle. In various embodiments, the data structure of the maplet is a predefined and/or predetermined, standardized data structure. In various embodiments, the environment elements comprise a topology of a segment of the road network as indicated by segment of the vehicle's trajectory and observations corresponding to the segment of the road network such as sign faces, road surface markings, pole-like objects, construction markers, traffic signals, lane markings, driving surface edge (e.g., edge of the pavement comprising the driving surface), road side barriers, and/or the like. For example, an environment element may be a real world object in the environment of the segment of the road network and/or a property (e.g., topology) of the road network itself.

In various embodiments, a network apparatus may generate and provide maplet requests based on a management strategy. For example, the network apparatus may determine that a request trigger has been identified corresponding to a particular region of a geographic area represented by the digital map. Responsive to determining that the request trigger has been identified, the network apparatus may generate and provide a request trigger such that vehicle apparatuses on board vehicles located in or near the region identified in the request (referred to as the request region herein) may receive the maplet request. Responsive to receiving a maplet request a vehicle apparatus may determine if the corresponding vehicle is located within the request region and/or if/when the corresponding vehicle enters the request region. When the vehicle is within the request region, the vehicle apparatus may use sensor information/data captured by sensors onboard the vehicle to generate an observation. The vehicle apparatus may then generate a maplet that encodes a trajectory of a corresponding vehicle and various classes of features within the observation. For example the maplet request may identify one or more classes for which road information/data should be provided if features corresponding to the identified one or more classes are identified within the observation. Some example classes include sign faces, road surface markings, pole-like objects, construction markers, traffic signals, lane markings, driving surface edge (e.g., edge of the pavement comprising the driving surface), and road side barriers. For example, the road information/data of the pose points and/or GNSS points classes may provide and/or encode a trajectory of the vehicle along a predetermined and/or predefined length of the request region. For example, the road information/data of the sign faces, road surface markings, pole-like objects, construction markers, traffic signals, lane markings, driving surface edge (e.g., edge of the pavement comprising the driving surface), and/or road side barriers classes may provide and/or encode road information/data regarding observations identified within the observation.

After generating the maplet, the vehicle apparatus may provide the maplet such that the network apparatus receives the maplet. In various embodiments, the maplet may be compressed (e.g., using a compression algorithm) and provided in a compressed format. The network apparatus receives the maplet, performs any necessary decompression, and analyzes the maplet. In various embodiments, the network apparatus may receive a plurality of maplets from a plurality of vehicle apparatuses that correspond to overlapping portions of the request region. The analysis of the received maplets performed may be based on the type of the request trigger that was identified. In various embodiments, the analysis of the received maplets may be used to update the digital map. For example, the analysis of the received maplets may be used to determine road network topology within the request region (e.g., to identify road segments, lane segments, and/or portions thereof that were not previously encoded in and/or represented by the digital map); determine whether map information/data corresponding to the request region is still accurate, correct, and up-to-date and/or whether the map information/data should be updated to better reflect the current real world conditions of the request region as encoded by the road information/data of the maplet; and/or to determine new and/or updated map information/data.

In an example embodiment, the digital map may be a high definition map that may be used for navigation functions for an autonomous, self-driving vehicle, an advanced driver assistances system (ADAS), and/or a human operator. For example, the digital map and/or portions thereof may be used to perform navigation functions such as localization, route determination, lane level route determination, lane maintenance, route guidance, lane level route guidance, provision of traffic information/data, provision of lane level traffic information/data and/or the like.

Various embodiments of the present invention provide technical solutions to the technical problems of providing a digital map that is correct, accurate, and up-to-date such that the digital map is an effective tool for performing navigation functions that enable navigation of a road network by an autonomous, self-driving vehicle, an advanced driver assistances system (ADAS), and/or a human operator. Various embodiments of the present invention provide technical solutions to the technical problem of transmitting sufficient and rich enough road information/data for maintaining and updating the digital map while not overwhelming the limited bandwidth network over which the road information/data is transmitted. Various embodiments of the present invention provide technical solutions to the technical problem of using sensor information/data captured by a plurality of vehicles having a variety of (possibly proprietary) sensor configurations onboard to build a coherent, self-consistent, and accurate representation of the road network (e.g., the digital map). In various embodiments, the maplets and corresponding methods, apparatuses, systems, and/or computer program products provide technical solutions to these technical problems by providing a maplet that provides road information/data in a predetermined/predefined, standardized data format using a predetermined/predefined, standardized data model and that is configured to be an efficient information/data packet so as to reduce the bandwidth needed to communicate the road information/data such that road information/data may be automatically, efficiently, and timely provided to the network apparatus for use in maintaining and updating the digital map.

In an example embodiment, a vehicle apparatus receives a maplet request identifying a request region. The vehicle apparatus (a) is onboard a vehicle, (b) comprises (i) a communication interface configured to communicate via at least one network, (ii) at least one processor, and (iii) at least one memory, and (c) is in communication with a plurality of sensors onboard the vehicle. Responsive to determining that the vehicle is within the request region, the vehicle apparatus processes sensor data captured by two or more sensors of the plurality of sensors to generate a multi-sensor data stream corresponding to a segment of a road network. The vehicle apparatus identifies one or more observations corresponding to at least one pole-like object within the multi-sensor data stream. A pole-like object is a generally vertical element having a length longer than a minimum length. The vehicle apparatus generates a maplet based on the one or more observations and the maplet request. Generating the maplet comprises using a predetermined data model and a predetermined data format corresponding to a pole-like object observation class to encode road data corresponding to at least one of the one or more observations corresponding to that at least one pole-like object. The vehicle apparatus provides the maplet such that a network apparatus receives the maplet. The network apparatus is configured to validate or update map data of a digital map of the road network based at least in part on the maplet.

According to an aspect of the present invention, a method for providing a maplet corresponding to a pole-like object is provided. In an example embodiment, the method comprises receiving, by a vehicle apparatus, a maplet request identifying a request region. The vehicle apparatus (a) is onboard a vehicle, (b) comprises (i) a communication interface configured to communicate via at least one network, (ii) at least one processor, and (iii) at least one memory, and (c) is in communication with a plurality of sensors onboard the vehicle. The method further comprises, responsive to determining that the vehicle is within the request region, processing, by the vehicle apparatus, sensor data captured by two or more sensors of the plurality of sensors to generate a multi-sensor data stream corresponding to a segment of a road network. The method further comprises identifying, by the vehicle apparatus, one or more observations corresponding to at least one pole-like object within the multi-sensor data stream. A pole-like object is a generally vertical element having a length longer than a minimum length. The method further comprises generating, by the vehicle apparatus, a maplet based on the one or more observations and the maplet request. Generating the maplet comprises using a predetermined data model and a predetermined data format corresponding to a pole-like object observation class to encode road data corresponding to at least one of the one or more observations corresponding to that at least one pole-like object. The method further comprises providing, by the vehicle apparatus, the maplet such that a network apparatus receives the maplet. The network apparatus is configured to validate or update map data of a digital map of the road network based at least in part on the maplet.

In an example embodiment, the maplet comprises a header comprising a pole-like object flag. In an example embodiment, the pole-like object is one of a post used to mount a roadside sign, a street light pole, a utility pole, or a pole used to mount a traffic signal. In an example embodiment, the predetermined format comprises one or more fields each configured to receive values of coordinates of (a) an upper point, wherein the upper point is a point located along a central axis of the pole-like object and located at an upper portion of a visible portion of the pole-like object or (b) a lower point, wherein the lower point is a point located along a central axis of the pole-like object and located at a lower portion of a visible portion of the pole-like object. In an example embodiment, the predetermined format comprises a field configured to receive a value of a covariance matrix for the at least one of the upper point or the lower point. In an example embodiment, the predetermined format comprises one or more fields each configured to receive values of (a) an upper diameter, wherein the upper diameter is a diameter of bounding circle bounding the pole-like object at the upper point or (b) a lower diameter, wherein the lower diameter is a diameter of a bounding circle bounding the pole-like object at the lower point. In an example embodiment, the predetermined format comprises one or more fields configured to receive values characterizing one or more reflectors mounted to the pole-like object.

According to another aspect of the present invention, an apparatus is provided. In an example embodiment, the apparatus comprises at least one processor, a communication interface configured to communicate via at least one network, and at least one memory storing computer program code. The apparatus is onboard a vehicle and is in communication with a plurality of sensors onboard the vehicle. The at least one memory and the computer program code are configured to, with the processor, cause the apparatus to at least receive a maplet request identifying a request region. The at least one memory and the computer program code are further configured to, with the processor, cause the apparatus to at least, responsive to determining that the vehicle is within the request region, process sensor data captured by two or more sensors of the plurality of sensors to generate a multi-sensor data stream corresponding to a segment of a road network. The at least one memory and the computer program code are further configured to, with the processor, cause the apparatus to at least identify one or more observations corresponding to at least one pole-like object within the multi-sensor data stream. A pole-like object is a generally vertical element having a length longer than a minimum length. The at least one memory and the computer program code are further configured to, with the processor, cause the apparatus to at least generate a maplet based on the one or more observations and the maplet request. Generating the maplet comprises using a predetermined data model and a predetermined data format corresponding to a pole-like object observation class to encode road data corresponding to at least one of the one or more observations corresponding to that at least one pole-like object. The at least one memory and the computer program code are further configured to, with the processor, cause the apparatus to at least provide the maplet such that a network apparatus receives the maplet. The network apparatus is configured to validate or update map data of a digital map of the road network based at least in part on the maplet.

In an example embodiment, the maplet comprises a header comprising a pole-like object flag. In an example embodiment, the pole-like object is one of a post used to mount a roadside sign, a street light pole, a utility pole, or a pole used to mount a traffic signal. In an example embodiment, the predetermined format comprises one or more fields each configured to receive values of coordinates of (a) an upper point, wherein the upper point is a point located along a central axis of the pole-like object and located at an upper portion of a visible portion of the pole-like object or (b) a lower point, wherein the lower point is a point located along a central axis of the pole-like object and located at a lower portion of a visible portion of the pole-like object. In an example embodiment, the predetermined format comprises a field configured to receive a value of a covariance matrix for the at least one of the upper point or the lower point. In an example embodiment, the predetermined format comprises one or more fields each configured to receive values of (a) an upper diameter, wherein the upper diameter is a diameter of bounding circle bounding the pole-like object at the upper point or (b) a lower diameter, wherein the lower diameter is a diameter of a bounding circle bounding the pole-like object at the lower point. In an example embodiment, the predetermined format comprises one or more fields configured to receive values characterizing one or more reflectors mounted to the pole-like object.

According to yet another aspect of the present invention, a computer program product is provided. In an example embodiment, the computer program product comprising at least one non-transitory computer-readable storage medium having computer-readable program code portions stored therein. The computer-readable program code portions comprise executable portions configured, when executed by a processor of a vehicle apparatus onboard a vehicle, to cause the vehicle apparatus to receive a maplet request identifying a request region. The computer-readable program code portions further comprise executable portions configured, when executed by the processor of the vehicle apparatus, to, responsive to determining that the vehicle is within the request region, process sensor data captured by two or more sensors of the plurality of sensors to generate a multi-sensor data stream corresponding to a segment of a road network. The computer-readable program code portions further comprise executable portions configured, when executed by the processor of the vehicle apparatus identify one or more observations corresponding to at least one pole-like object within the multi-sensor data stream. A pole-like object is a generally vertical element having a length longer than a minimum length. The computer-readable program code portions further comprise executable portions configured, when executed by the processor of the vehicle apparatus generate a maplet based on the one or more observations and the maplet request. Generating the maplet comprises using a predetermined data model and a predetermined data format corresponding to a pole-like object observation class to encode road data corresponding to at least one of the one or more observations corresponding to that at least one pole-like object. The computer-readable program code portions further comprise executable portions configured, when executed by the processor of the vehicle apparatus provide the maplet such that a network apparatus receives the maplet. The network apparatus is configured to validate or update map data of a digital map of the road network based at least in part on the maplet.

In an example embodiment, the maplet comprises a header comprising a pole-like object flag. In an example embodiment, the pole-like object is one of a post used to mount a roadside sign, a street light pole, a utility pole, or a pole used to mount a traffic signal. In an example embodiment, the predetermined format comprises one or more fields each configured to receive values of coordinates of (a) an upper point, wherein the upper point is a point located along a central axis of the pole-like object and located at an upper portion of a visible portion of the pole-like object or (b) a lower point, wherein the lower point is a point located along a central axis of the pole-like object and located at a lower portion of a visible portion of the pole-like object. In an example embodiment, the predetermined format comprises a field configured to receive a value of a covariance matrix for the at least one of the upper point or the lower point. In an example embodiment, the predetermined format comprises one or more fields each configured to receive values of (a) an upper diameter, wherein the upper diameter is a diameter of bounding circle bounding the pole-like object at the upper point or (b) a lower diameter, wherein the lower diameter is a diameter of a bounding circle bounding the pole-like object at the lower point. In an example embodiment, the predetermined format comprises one or more fields configured to receive values characterizing one or more reflectors mounted to the pole-like object.

According to still another aspect of the present invention, an apparatus is provided. In an example embodiment, the apparatus comprises means for receiving a maplet request identifying a request region. The apparatus comprises means for, responsive to determining that the vehicle is within the request region, processing sensor data captured by two or more sensors of the plurality of sensors to generate a multi-sensor data stream corresponding to a segment of a road network. The apparatus comprises means for identifying one or more observations corresponding to at least one pole-like object within the multi-sensor data stream. A pole-like object is a generally vertical element having a length longer than a minimum length. The apparatus comprises means for generating a maplet based on the one or more observations and the maplet request. Generating the maplet comprises using a predetermined data model and a predetermined data format corresponding to a pole-like object observation class to encode road data corresponding to at least one of the one or more observations corresponding to that at least one pole-like object. The apparatus comprises providing the maplet such that a network apparatus receives the maplet. The network apparatus is configured to validate or update map data of a digital map of the road network based at least in part on the maplet.

BRIEF DESCRIPTION OF THE DRAWINGS

Figure 1:
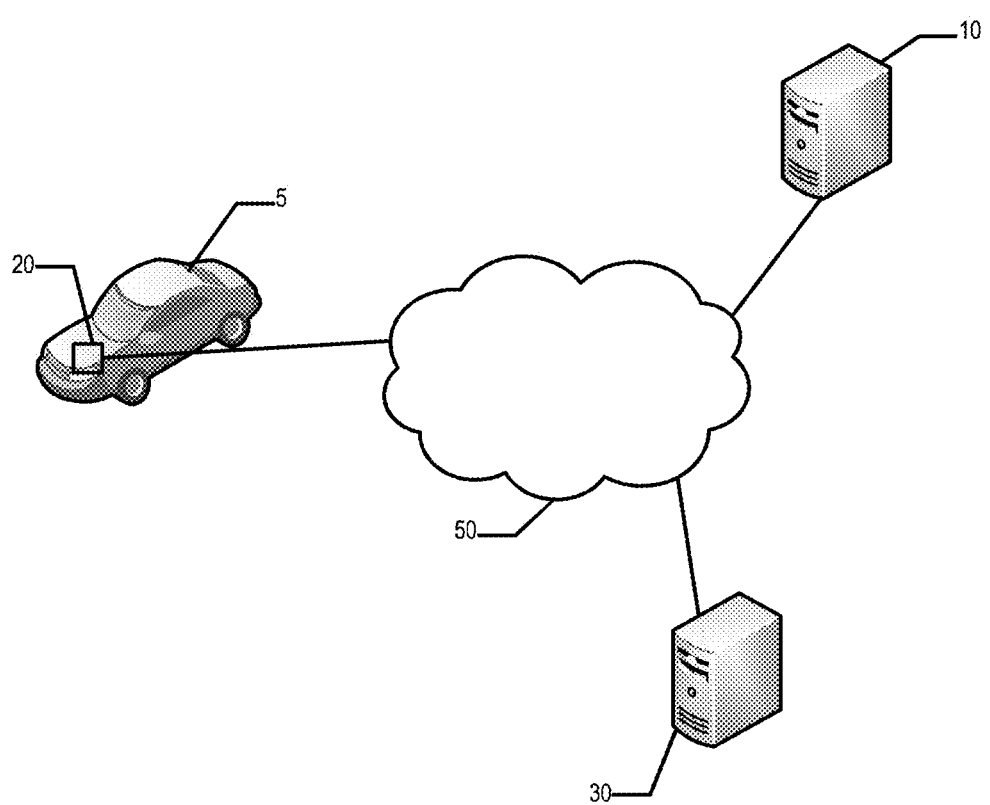
Figure 1A:
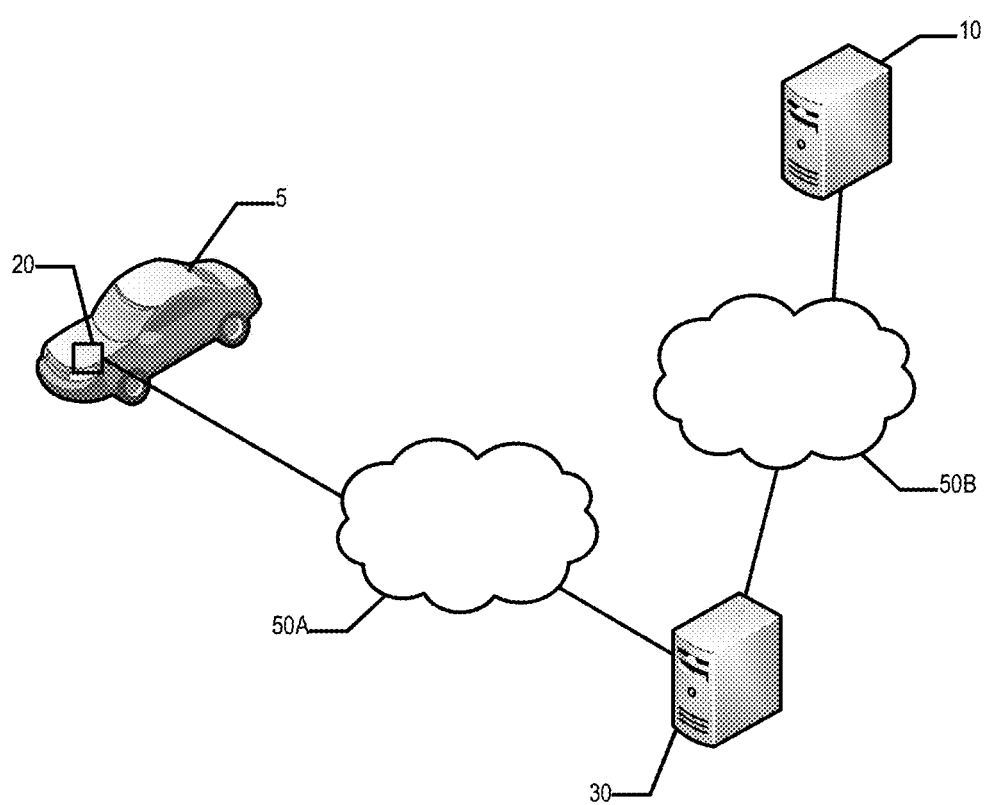
Figure 2A:
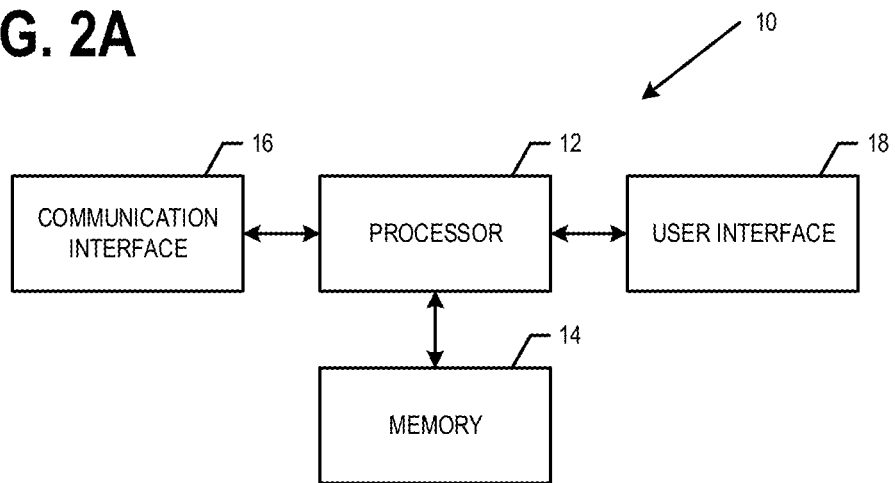
Figure 2B:
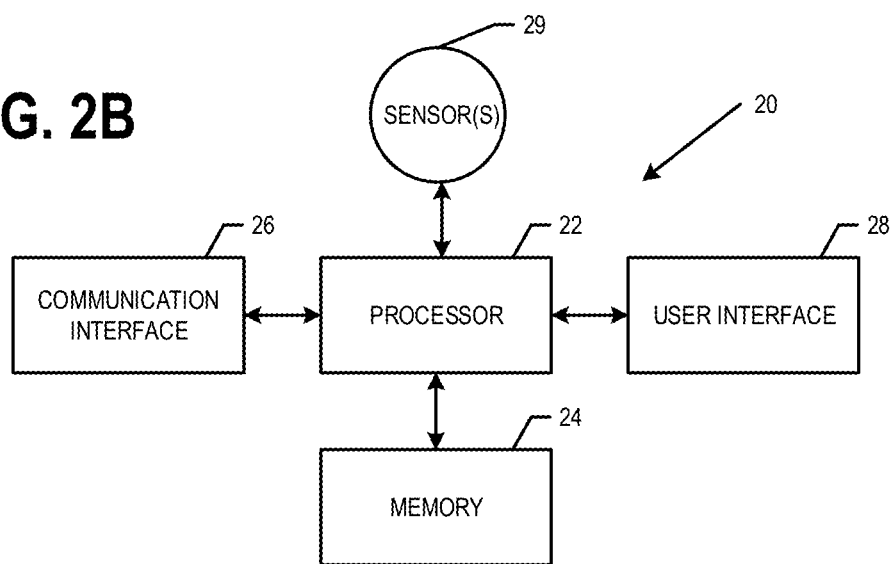
Figure 2C:
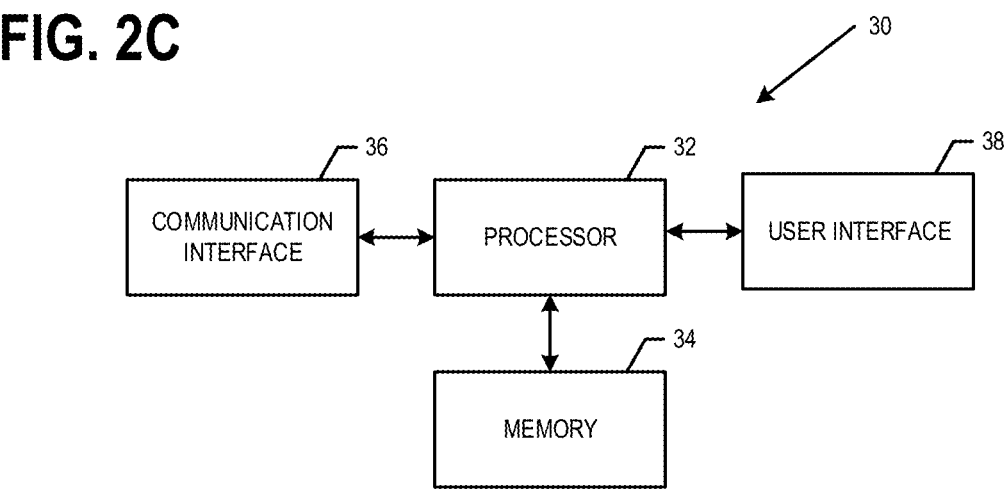
Figure 3:
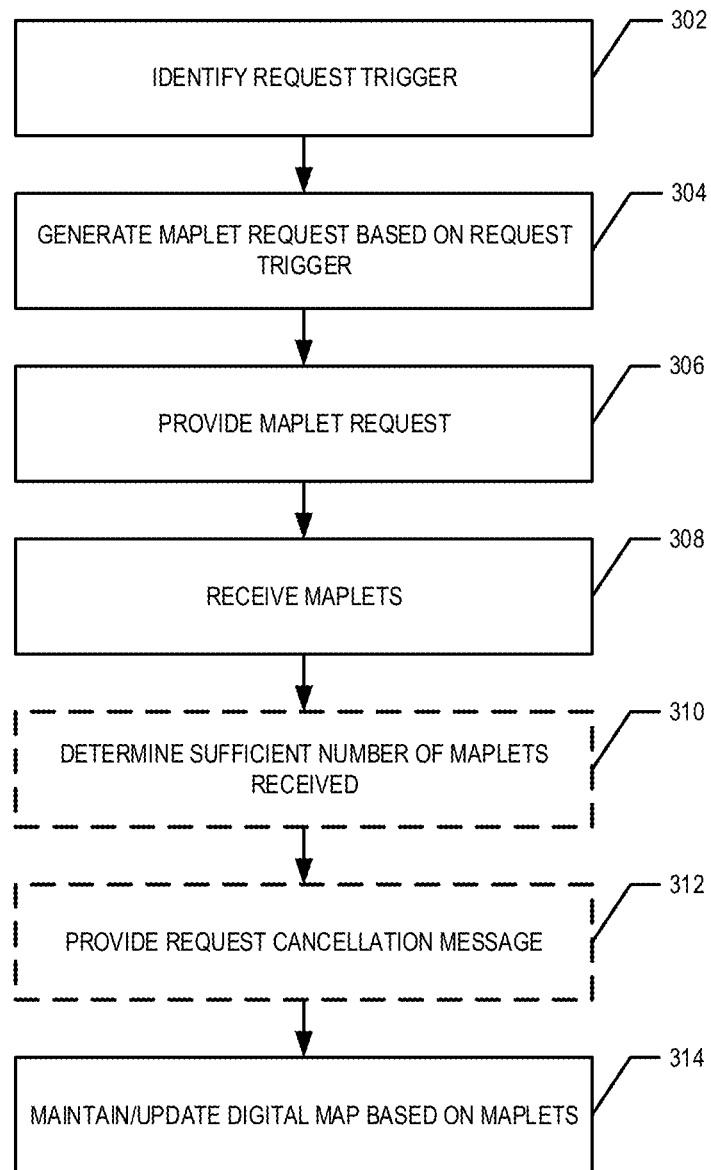
Figure 4:
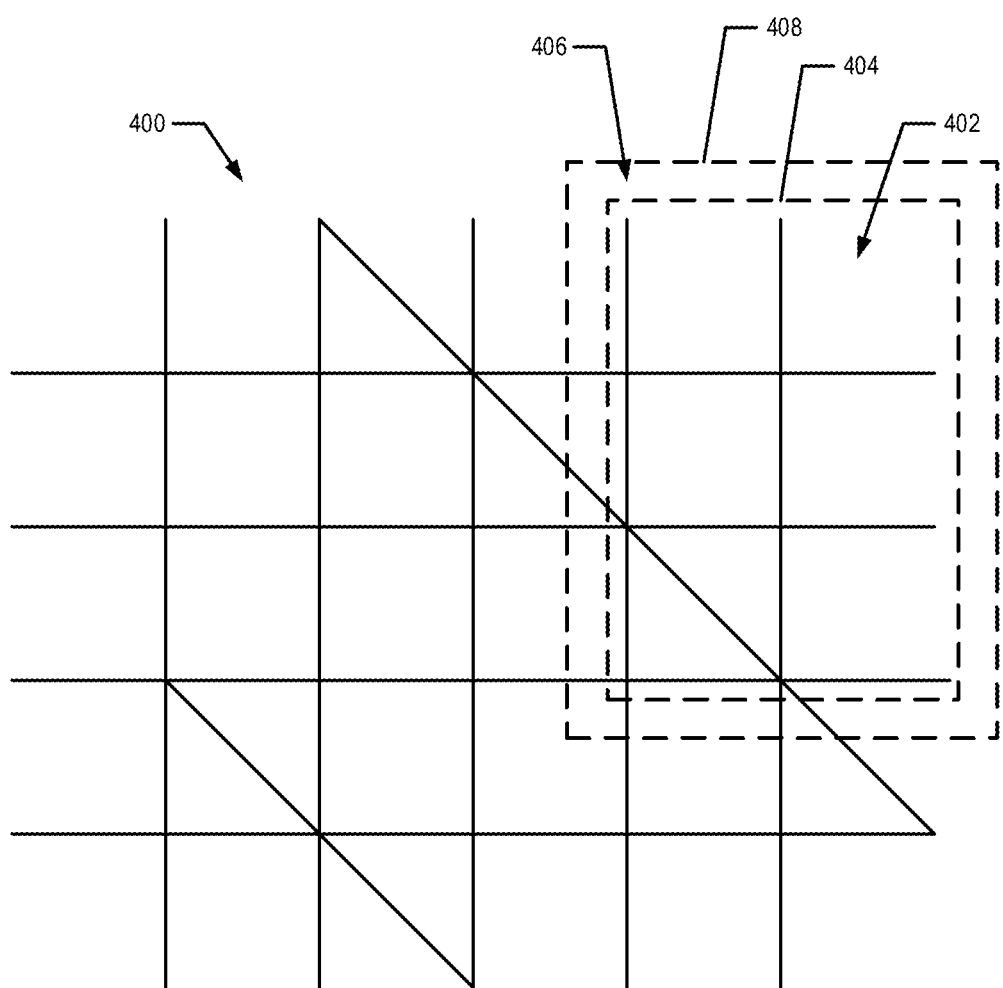
Figure 5:
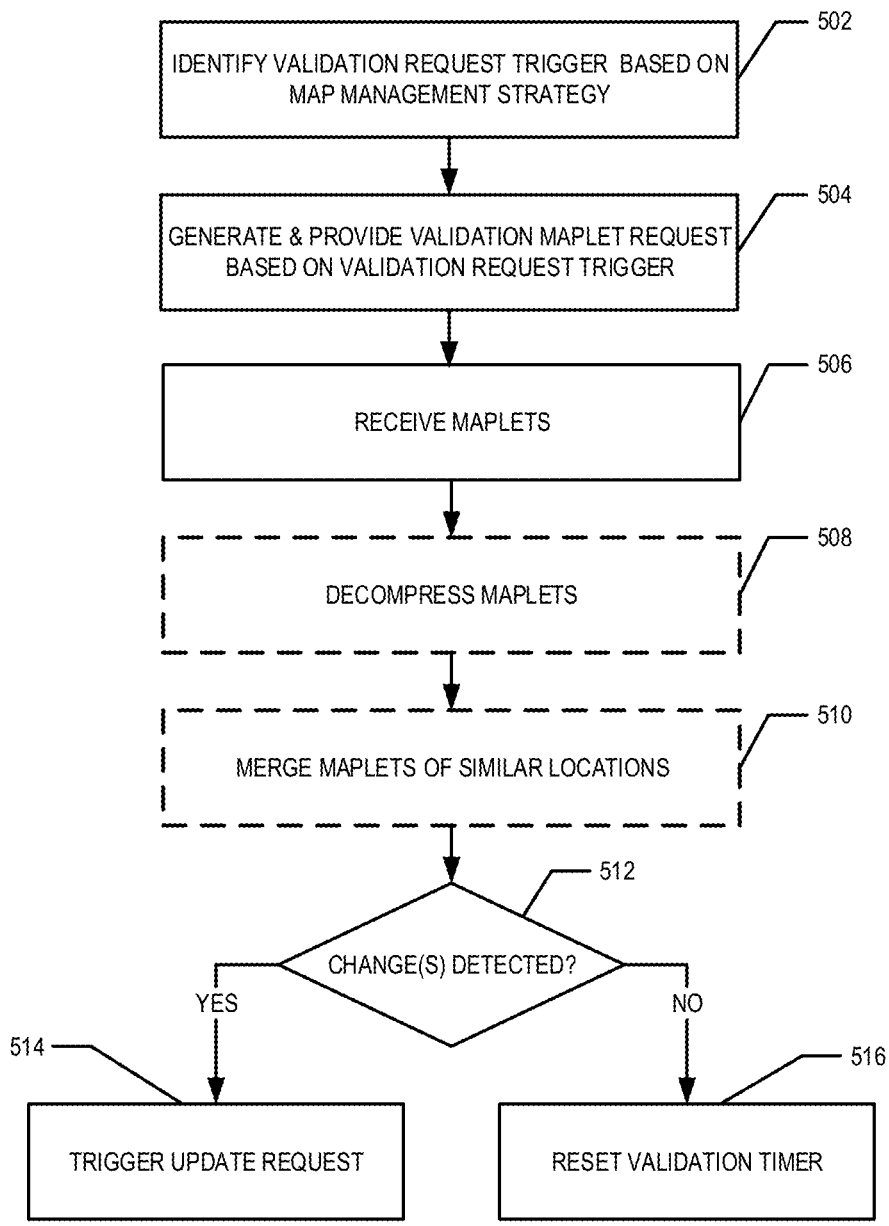
Figure 6:
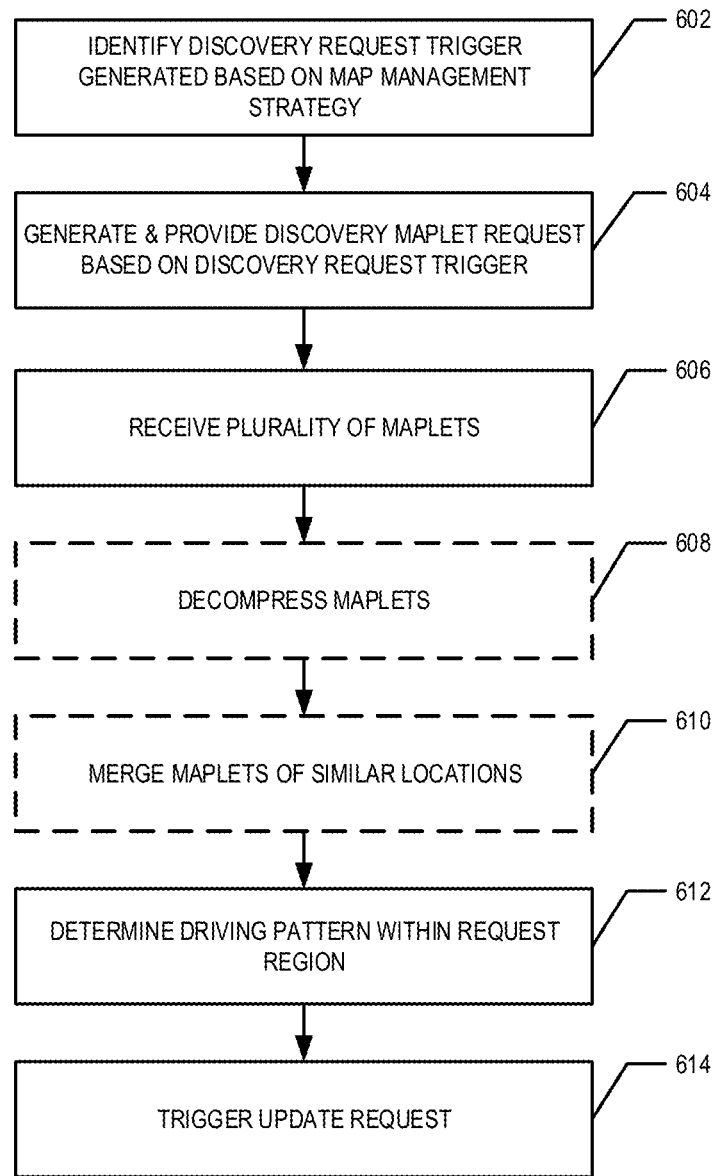
Figure 7:
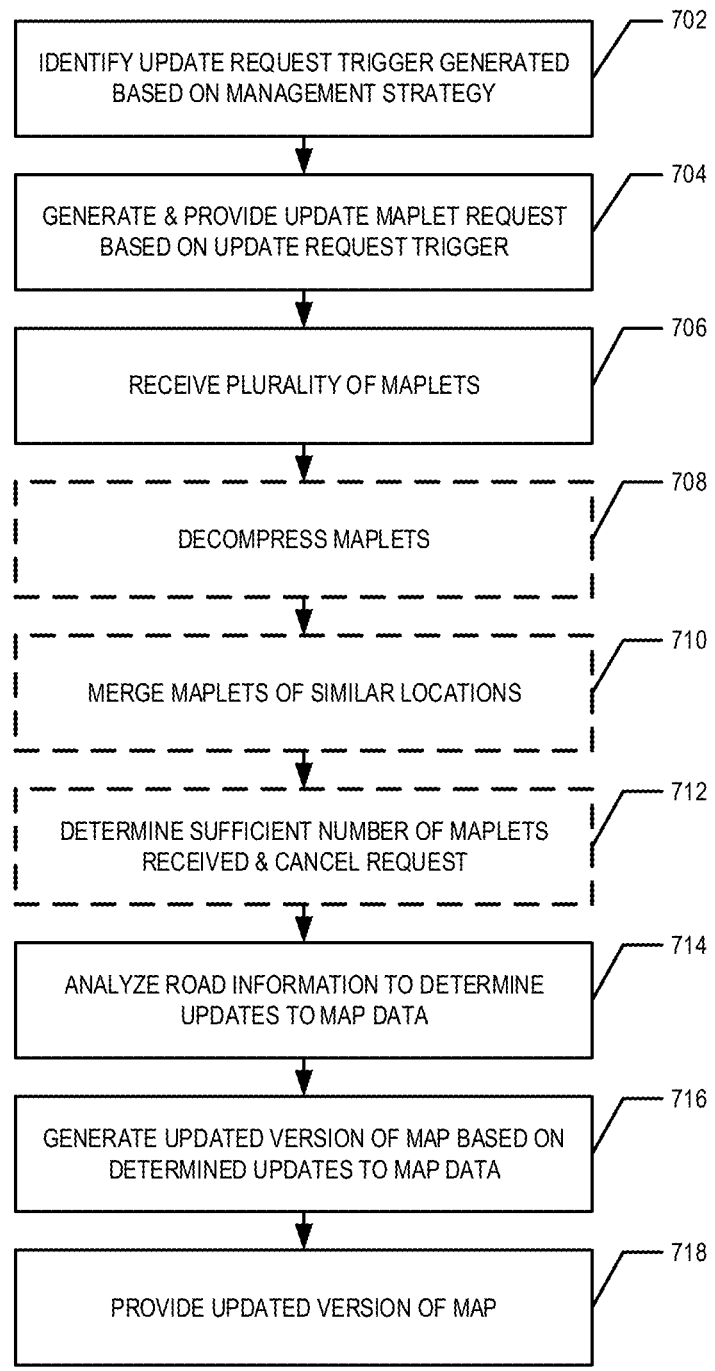
Figure 8:
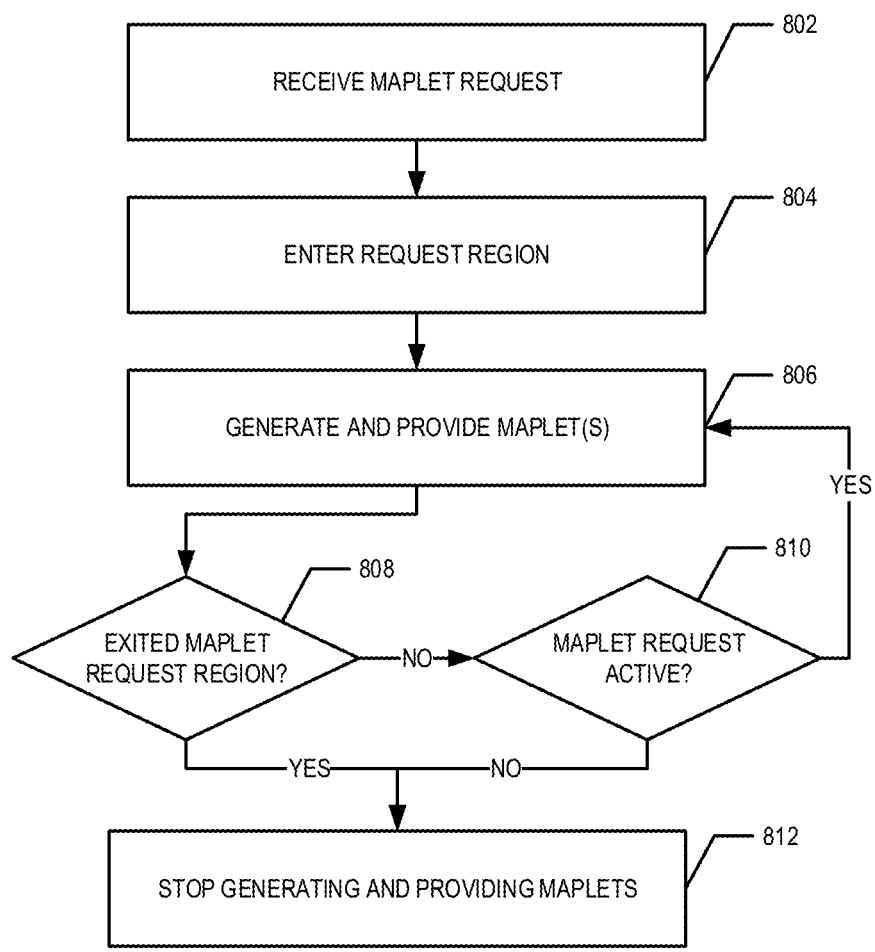
Figure 9:
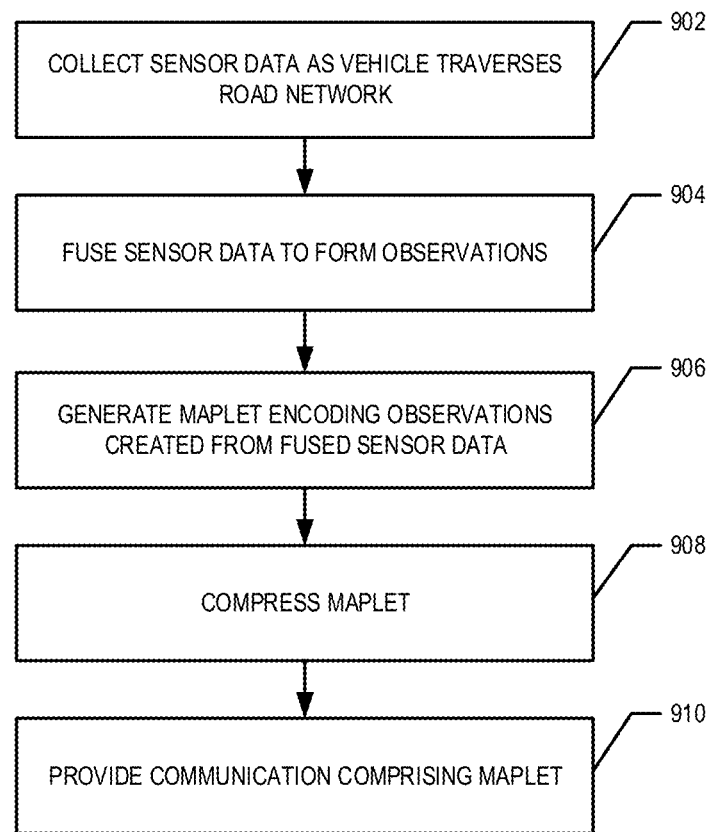
Figures 11A, 11B:
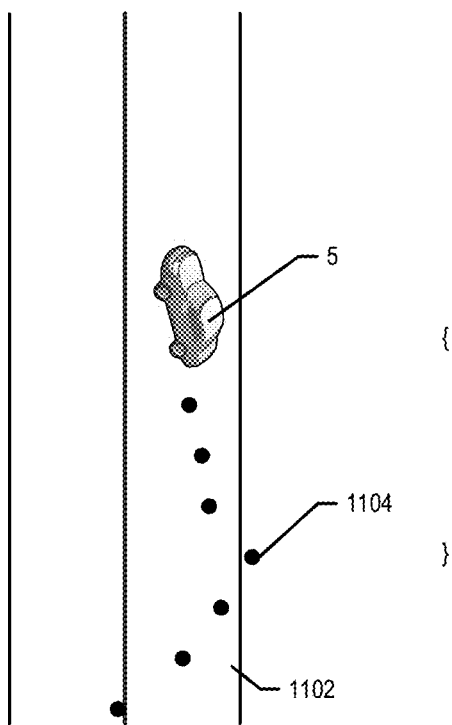
Figures 12A, 12B:
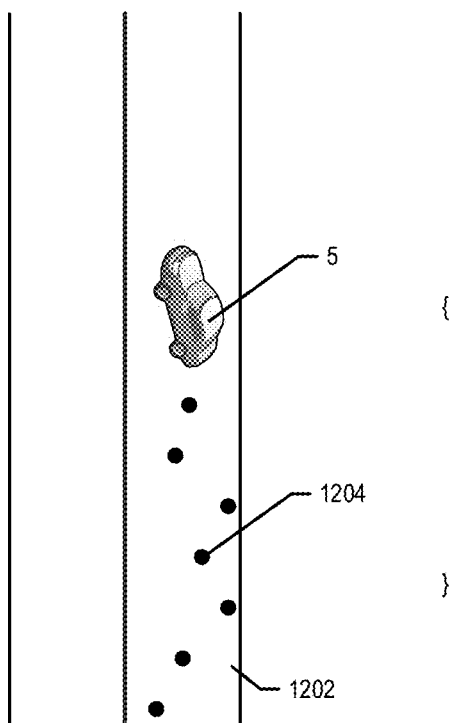
Figures 14A, 14B:
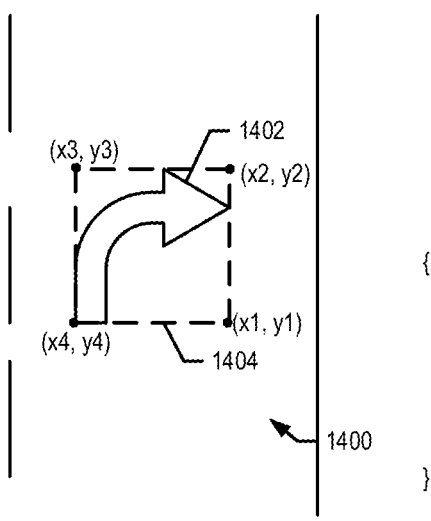
Figures 15A, 15B:
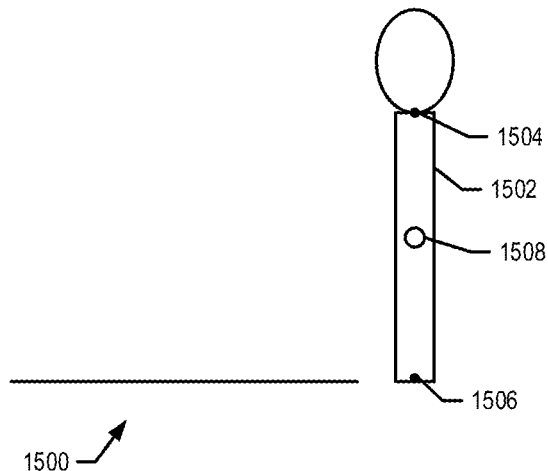
Figures 16A, 16B:
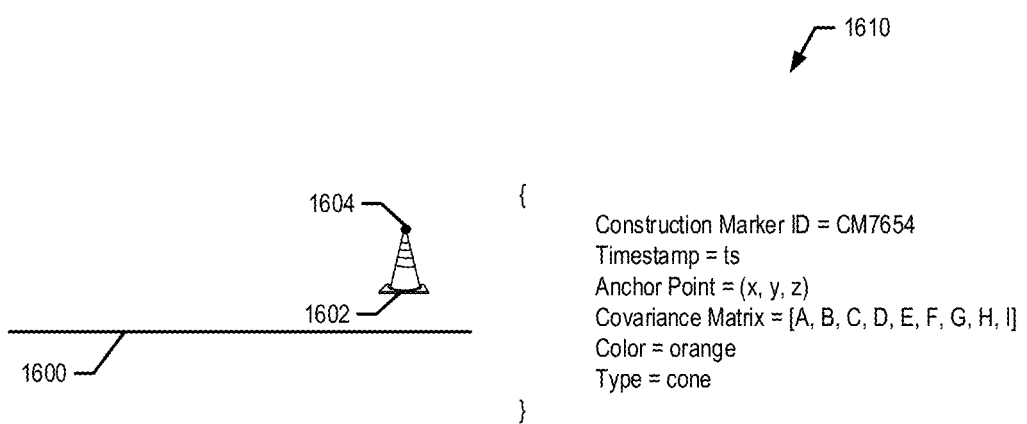
Figures 17A, 17B:
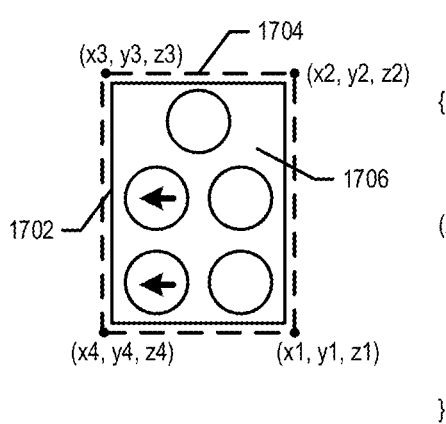
Figures 18A, 18B:
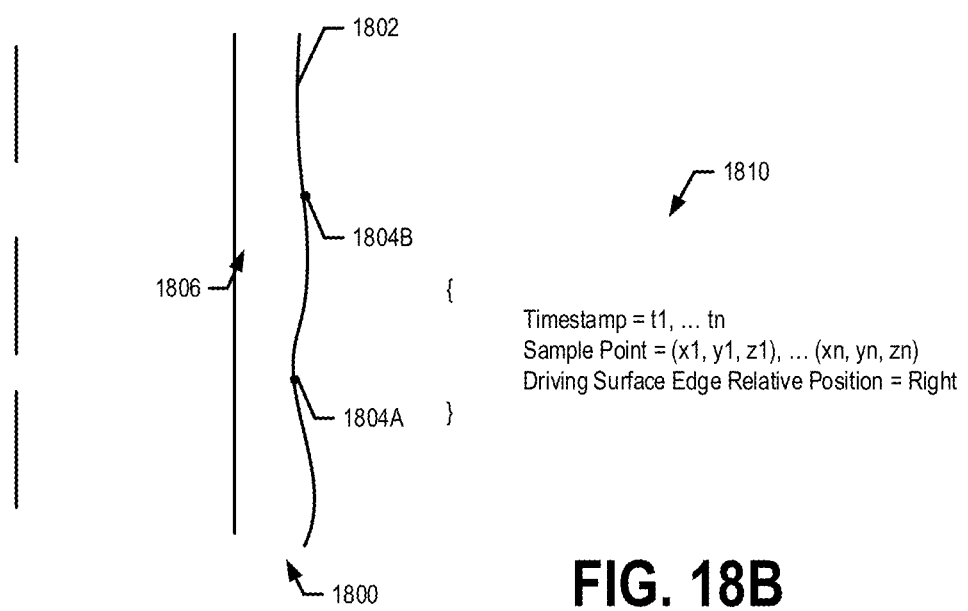
Figures 19A, 19B:
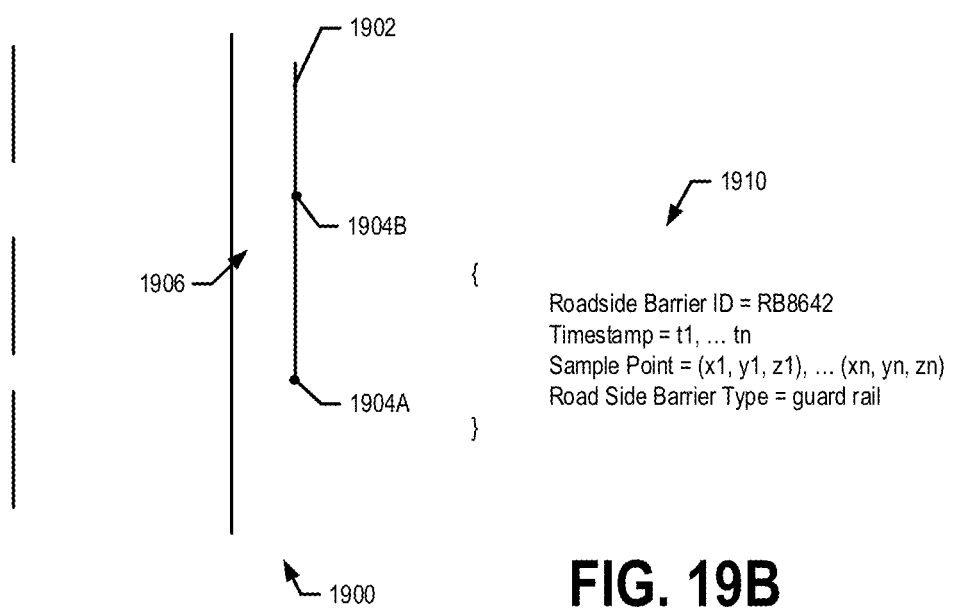
Figures 20A, 20B:
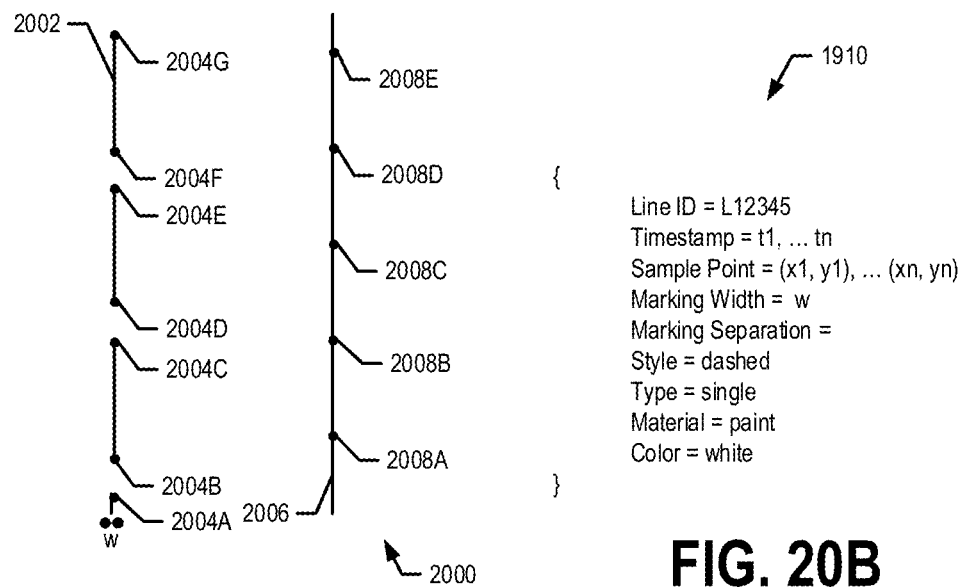

Having thus described certain example embodiments in general terms, reference will hereinafter be made to the accompanying drawings, which are not necessarily drawn to scale, and wherein:

FIG. 1 is a block diagram showing an example architecture of an example embodiment of the present invention;

FIG. 1A is a block diagram showing another example architecture of an example embodiment of the present invention;

FIG. 2A is a block diagram of a network apparatus that may be specifically configured in accordance with an example embodiment;

FIG. 2B is a block diagram of a vehicle apparatus that may be specifically configured in accordance with an example embodiment;

FIG. 2C is a block diagram of an intermediary apparatus that may be specifically configured in accordance with an example embodiment;

FIG. 3 is a flowchart illustrating operations performed, such as by the network apparatus of FIG. 2A to maintain and/or update a digital map, in accordance with an example embodiment;

FIG. 4 is schematic diagram showing a portion of a road network, a request region, and a buffer region about the request region, in accordance with an example embodiment;

FIG. 5 is a flowchart illustrating operations performed, such as by the network apparatus of FIG. 2A to validate map information/data of a digital map, in accordance with an example embodiment;

FIG. 6 is a flowchart illustrating operations performed, such as by the network apparatus of FIG. 2A to expand a digital map, in accordance with an example embodiment;

FIG. 7 is a flowchart illustrating operations performed, such as by the network apparatus of FIG. 2A to update a digital map, in accordance with an example embodiment;

FIG. 8 is a flowchart illustrating operations performed, such as by the vehicle apparatus of FIG. 2B to provide maplets in response to a maplet request, in accordance with an example embodiment;

FIG. 9 is a flowchart illustrating operations performed, such as by the vehicle apparatus of FIG. 2B to generate and provide a maplet, in accordance with an example embodiment;

FIG. 10 illustrates an example of a maplet header, in accordance with an example embodiment;

FIG. 10A illustrates an example maplet, in accordance with an example embodiment;

FIG. 11A illustrates a trajectory of a vehicle along a portion of a road network;

FIG. 11B illustrates an example maplet portion comprising pose points that encode the trajectory of the vehicle shown in FIG. 11A, in accordance with an example embodiment;

FIG. 12A illustrates a trajectory of a vehicle along a portion of a road network;

FIG. 12B illustrates an example maplet portion comprising GNSS points that encode the trajectory of the vehicle shown in FIG. 12A, in accordance with an example embodiment;

FIGS. 13A and 13C illustrate a front view and a top view, respectfully, of a sign identified in an observation as the vehicle traversed the portion of the road network;

FIG. 13B illustrates an example maplet portion encoding road information/data representing the sign face shown in FIGS. 13A and 13C, in accordance with an example embodiment;

FIG. 14A illustrates a road marking identified in an observation as the vehicle traverse the portion of a road network;

FIG. 14B illustrates an example maplet portion encoding road information/data representing the road marking shown in FIG. 14A, in accordance with an example embodiment;

FIG. 15A illustrates a pole-like object identified in an observation as the vehicle traverse the portion of a road network;

FIG. 15B illustrates an example maplet portion encoding road information/data representing the pole-like object shown in FIG. 15A, in accordance with an example embodiment;

FIG. 16A illustrates a construction marker identified in an observation as the vehicle traverse the portion of a road network;

FIG. 16B illustrates an example maplet portion encoding road information/data representing the construction marker shown in FIG. 16A, in accordance with an example embodiment;

FIG. 17A illustrates a traffic signal identified in an observation as the vehicle traverse the portion of a road network;

FIG. 17B illustrates an example maplet portion encoding road information/data representing the traffic signal shown in FIG. 17A, in accordance with an example embodiment;

FIG. 18A illustrates a driving surface edge identified in an observation as the vehicle traverse the portion of a road network;

FIG. 18B illustrates an example maplet portion encoding road information/data representing the driving surface edge shown in FIG. 18A, in accordance with an example embodiment;

FIG. 19A illustrates a road side barrier identified in an observation as the vehicle traverse the portion of a road network;

FIG. 19B illustrates an example maplet portion encoding road information/data representing the road side barrier shown in FIG. 19A, in accordance with an example embodiment;

FIG. 20A illustrates a dashed lane marking and a solid lane marking identified in an observation as the vehicle traverse the portion of a road network; and FIG. 20B illustrates an example maplet portion encoding road information/data representing the dashed lane marking shown in FIG. 20A, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines, allowances, and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

As used herein, the term "detection" denotes a simple atomic detection of a single real world object by a single sensor at a single instant in time. As used herein, the term "observation" denotes a single representation of a single real world object as it exists at the time the sensor information/data used to generate a corresponding maplet was captured, collected, and/or the like. An observation is formed and/or generated by fusing together two or more detections of the single real world object made by one sensor or a plurality of sensors over the course of the collection and/or capturing of the sensor information/data used to generate the corresponding maplet. As used herein, the term "feature" denotes an encoding of a single real world object that is part of and/or added to a digital map. A feature may be created by fusing together multiple observations of the single real world object provided by multiple maplets provided by multiple different vehicle apparatuses.

I. General Overview

Methods, apparatus, systems, and computer program products are provided in accordance with an example embodiment for maintaining and/or updating a digital map. In various embodiments, the digital map is maintained and/or updated such that the map information/data is correct, accurate, and up-to-date. In an example embodiment, the map information/data is automatically updated in near real time or real time with respect to changes in the road network represented by the digital map. In various embodiments, the digital map is maintained and/or updated based on road information/data encoded in maplets. A maplet is a data structure comprising abstracted, parameterized, fused representations of one or more environment elements (e.g., real world objects and/or properties of the road network (e.g., topology)) detected in sensor information/data captured by one or more sensors of a vehicle apparatus and/or onboard a corresponding vehicle. For example, a maplet is a data structure that encodes observations created by fusing together detections corresponding to sensor information/data captured and/or collected as a vehicle traverses a portion of a road network (e.g., a segment of a vehicle trajectory). In an example embodiment, the data structure of the maplet further comprises a representation of the vehicle's trajectory history for a segment of a vehicle's trajectory. In an example embodiment, the segment of the vehicle's trajectory may correspond to predetermined length and/or time of a single vehicle ignition cycle. In various embodiments, the environment elements comprise a topology of a segment of the road network as indicated by segment of the vehicle's trajectory and observations corresponding to the segment of the road network such as sign faces, road surface markings, pole-like objects, construction markers, traffic signals, lane markings, driving surface edge (e.g., edge of the pavement comprising the driving surface), road side barriers, and/or the like. In various embodiments, the data structure of the maplet is a predefined and/or predetermined, standardized data structure. For example, the data structure of the maplet may be in accordance with a predetermined/predefined, standardized data model and have predetermined/predefined, standardized data formats for road information/data of each trajectory type or observation class.

In an example embodiment, a network apparatus is configured to automatically enforce and/or administrate a map management strategy. For example, the map management strategy may provide guidance and/or dictate how often a region of the road network is monitored for updates and/or changes, which observation classes of road information/data are requested from vehicle apparatuses for a particular maplet request, what trajectory type(s) to include in the maplet, and/or the like. Based on the map management strategy, the network apparatus may identify a request trigger corresponding to a request region. Responsive to determining that a request trigger has been identified, the network apparatus may generate and provide a corresponding maplet request such that plurality of vehicle apparatuses receive the maplet request. For example, the maplet request may be provided to vehicle apparatuses that are located within the request region; within a predetermined, predefined, and/or configurable distance from the request region; expected to enter the request region during a predetermined and/or predefined time window corresponding to the maplet request (e.g., based on travel history of the vehicle apparatus, a current route of the vehicle apparatus, and/or the like); and/or the like.

A vehicle apparatus may receive a maplet request and, responsive thereto, when the vehicle is located within the request region, the vehicle apparatus may generate and provide maplets based on the maplet request. For example, sensors onboard the vehicle may capture sensor information/data as the vehicle traverses a portion of the road network within the request region. For each predefined and/or predetermined length (e.g., 1 km, 5 km, and/or the like) and/or time (e.g., 30 seconds, 1 minute, 2 minutes, 3 minutes, and/or the like) of travel of the vehicle along the road network within the request region, a maplet may be generated. For example, the vehicle apparatus may fuse the sensor information/data captured by the sensors onboard the vehicle as the vehicle traversed the portion of the road network to form a uniform multi-sensor information/data stream of the environment surrounding the vehicle as the vehicle traversed the portion of the road network. For example, the detections corresponding to sensor information/data captured as the vehicle traversed the portion of the road network may be fused to form observations corresponding to the environment surrounding the vehicle as the vehicle traversed the portion of the road network. The road information/data of these observations may then be encoded and/or formatted into a maplet. The multi-sensor data stream may include a trajectory of the vehicle encoded as pose points and/or GNSS points. The multi-sensor data stream may include one or more observations such as sign faces, road surface markings, pole-like objects, construction markers, traffic signals, lane markings, driving surface edge (e.g., edge of the pavement comprising the driving surface), road side barriers, and/or the like. Each observation is associated with a corresponding observation class. Example observation classes include sign faces, road surface markings, pole-like objects, construction markers, traffic signals, lane markings, driving surface edge (e.g., edge of the pavement comprising the driving surface), road side barriers, and/or the like. The vehicle apparatus may generate a maplet encoding the trajectory of the vehicle as pose points and/or GNSS points. In various embodiments, the maplet may further encode road information/data corresponding to one or more observations and/or observations of one or more observation classes identified in the multi-sensor data stream. The vehicle apparatus may then provide the maplet (e.g., may transmit the maplet) such that the network apparatus receives the maplet. In an example embodiment, the vehicle apparatus may compress the maplet and the provided maplet may be the compressed maplet.

The network apparatus may receive a plurality of maplets in response to the provided maplet request. The network apparatus may analyze the plurality of maplets to maintain and/or update the digital map. For example, the network apparatus may analyze the plurality of maplets to identify road segments and/or lane segments of the road network not represented by the digital map. The identified road segments and/or lane segments that were not represented by the digital map may then be added to the digital map. In another example, the network apparatus may analyze the plurality of maplets to determine if the map information/data of the digital map is correct, accurate, and/or up-to-date. For example, the network apparatus may analyze the plurality of maplets to determine if the road information/data provided by the maplets is in agreement with the map information/data and/or to determine if the road information/data provided by the maplets indicates that there have been changes to the road network since the map information/data was last updated. In another example, the network apparatus may analyze the plurality of maplets to determine one or more updates to a digital map. After the digital map has been updated, the network apparatus may provide the updated digital map (and/or tiles thereof) such that a plurality of vehicle apparatuses receive the updated digital map (and/or tiles thereof) for use in performing one or more navigation functions. For example, the network apparatus may analyze the plurality of maplets to generate one or more features that may be compared to features of the digital map and/or that may be added to the digital map.

For example, the network apparatus may be configured to generate maplet requests based on a map management strategy and/or request triggers generated based on the map management strategy; receive maplets (and/or communications comprising maplets) via the Internet, automotive cloud, and/or the like; analyze the maplets and update the digital map and/or portions thereof based on the road information/data provided by the maplets; and provide the updated digital map and/or one or more tiles of the updated digital map to one or more vehicle apparatuses. In an example embodiment, the digital map may be a high definition map that may be used for navigation functions for an autonomous, self-driving vehicle, an advanced driver assistances system (ADAS), and/or a human operator. For example, the digital map and/or portions thereof may be used to perform navigation functions such as localization, route determination, lane level route determination, lane maintenance, route guidance, lane level route guidance, provision of traffic information/data, provision of lane level traffic information/data and/or the like.

For example, a vehicle apparatus may be configured to receive a maplet request; when the corresponding vehicle is within the request region identified by the maplet request, generate maplets based on multi-sensor data streams of the surrounding of the vehicle generated based on fusing sensor information/data captured by sensors onboard the vehicle as the vehicle traverses the road network within the request region; and provide the maplets. In various embodiments, the vehicle apparatus may be further configured to receive an updated digital map and/or tiles thereof and use the updated digital map and/or portions thereof to perform navigation functions such as localization, route determination, lane level route determination, lane maintenance, route guidance, lane level route guidance, provision of traffic information/data, provision of lane level traffic information/data and/or the like.

FIG. 1 provides an illustration of an example system that can be used in conjunction with various embodiments of the present invention. As shown in FIG. 1, the system may include one or more network apparatuses 10, one or more vehicle apparatuses 20, wherein each vehicle apparatus 20 is disposed on and/or onboard a vehicle 5, one or more intermediary apparatuses 30, one or more networks 50, and/or the like.

In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the vehicle apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In various embodiments, the vehicle apparatus 20 may be a smartphone, tablet, personal digital assistant (PDA), personal computer, desktop computer, laptop, and/or other mobile computing device. In an example embodiment, a vehicle apparatus 20 is onboard a vehicle 5 and is used to perform one or more navigation functions corresponding to the vehicle 5 traversing at least a portion of a road network.

In an example embodiment, the network apparatus 10 may be a server, group of servers, distributed computing system, and/or other computing system. For example, the network apparatus 10 may be in communication with one or more vehicle apparatuses 20, one or more intermediary apparatuses 30, and/or the like via one or more wired or wireless networks 50. In an example embodiment, an intermediary apparatus 30 may act as an intermediary between a vehicle apparatus 20 and a network apparatus 10. For example, in an example embodiment, an intermediary apparatus 30 is an apparatus in communication with a proprietary network 50A (e.g., an original equipment manufacturer (OEM) Cloud) such that the intermediary apparatus 30 is in communication with the vehicle apparatus via the proprietary network 50A, as shown in FIG. 1A. For example, the intermediary apparatus 30 may be configured to receive compressed maplets, decompress the maplets, and provide the decompressed maplets to the network apparatus 10 via one or more wired or wireless networks 50B. For example, the compression algorithm used to compress and/or decompress a maplet may be a proprietary compression algorithm. In an example embodiment, the intermediary apparatus 30 communicates with the vehicle apparatus 20 via a first network (e.g., proprietary network 50A) that is a bandwidth limited network (e.g., the automotive Cloud, a proprietary Cloud, and/or the like). In an example embodiment, the intermediary apparatus 30 communicates with the network apparatus 10 via a second network 50B that has fewer bandwidth restrictions than the first network. In an example embodiment, the intermediary apparatus 30 is a server, group of servers, distributed computing system, and/or other computing system.

In an example embodiment, a network apparatus 10 may comprise components similar to those shown in the example network apparatus 10 diagrammed in FIG. 2A. In an example embodiment, the network apparatus 10 is configured to generate maplet requests based on a map management strategy and/or request triggers generated based on the map management strategy; receive maplets (and/or communications comprising maplets); analyze the maplets and update the digital map and/or portions thereof based on the road information/data provided by the maplets; and provide the updated digital map and/or one or more tiles of the updated digital map to one or more vehicle apparatuses, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a vehicle apparatus 20 is onboard a vehicle 5. In an example embodiment, the vehicle apparatus 20 may be configured to receive a maplet request; when the corresponding vehicle is within the request region identified by the maplet request, generate maplets based on multi-sensor data streams of the surroundings of the vehicle generated by fusing sensor information/data captured by sensors onboard the vehicle as the vehicle traverses the road network within the request region; provide the maplets; receive an updated digital map and/or tiles thereof; use the updated digital map and/or portions thereof to perform navigation functions; and/or the like. For example, the vehicle apparatus 20 may comprise and/or be in communication with one or more sensors onboard the vehicle 5 for capturing sensor information/data that encodes information/data corresponding to a road network and/or the environment surrounding at least a portion of the road network. The sensor information/data may comprise location information/data indicating a location (e.g., geolocation such as latitude and longitude and/or the like) of the vehicle 5 and/or vehicle apparatus 20 when the corresponding sensor information/data was captured. For example, an instance of location information/data may comprise a time stamp indicating the time that the instance of location information/data was gathered, collected, captured and/or the like. In an example, an instance of location information/data may comprise a position and/or heading corresponding to a location and/or heading of the vehicle 5 at the time the instance of location information/data was gathered, collected, captured, and/or the like. In various embodiments, a pose point and/or a GNSS point may be an instance of location information/data.

In an example embodiment, as shown in FIG. 2B, the vehicle apparatus 20 may comprise a processor 22, memory 24, a communications interface 26, a user interface 28, one or more sensors 29 (e.g., one or more location sensors and/or sensors used for localization such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to generate an observation representing the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, as shown in FIG. 2C, the intermediary apparatus 30 may comprise a processor 32, memory 34, a communications interface 36, and/or other components configured to perform various operations, procedures, functions or the like described herein. In at least some example embodiments, the memory 34 is non-transitory. In an example embodiment, the intermediary apparatus 30 acts as an intermediary between the network apparatus 10 and a vehicle apparatus 20. For example, the intermediary apparatus 30 may communicate via a proprietary network 50A to provide maplet requests to and receive maplets from a vehicle apparatus 20. The intermediary apparatus 30 may be in communication with a network apparatus 10 via one or more wired and/or wireless networks 50B to receive maplet request from the network apparatus 10 and provide received (decompressed) maplets to the network apparatus 10.

In an example embodiment, the network apparatus 10 may be in communication with one or more of vehicle apparatuses 20, and/or one or more intermediary apparatuses 30, via one or more wired and/or wireless networks 50. For example, each of the components of the system may be in electronic communication with, for example, one another over the same or different wireless or wired networks 50 (e.g., 50A, 50B) including, for example, a wired or wireless Personal Area Network (PAN), Local Area Network (LAN), Metropolitan Area Network (MAN), Wide Area Network (WAN), cellular network, short and/or medium range communications, and/or the like. In some embodiments, a network 50 may comprise the automotive cloud (e.g., an OEM cloud), digital transportation infrastructure (DTI), radio data system (RDS)/high definition (HD) radio or other digital radio system, and/or the like. For example, a vehicle apparatus 20 and/or intermediary apparatus 30 may be in communication with a network apparatus 10 via the network 50. For example, a vehicle apparatus 20, and/or intermediary apparatus 30 may communicate with the network apparatus 10 via a network, such as the Cloud. For example, the Cloud may be a computer network that provides shared computer processing resources and data to computers and other devices connected thereto. For example, in an example embodiment, a vehicle apparatus 20 is in communication with an intermediary apparatus 30 via a proprietary network 50A and the intermediary apparatus 30 is in communication with a network apparatus 10 via another (e.g., non-proprietary) network 50B. For example, the vehicle apparatus 20 and/or intermediary apparatus 30 may be configured to receive one or more map tiles of a digital map and/or maplet requests from the network apparatus 10 or another map service connected via the network 50, traffic information/data (embedded in a map tile of a digital map and/or separate therefrom), and/or provide maplets to the network apparatus 10, and/or the like.

Certain example embodiments of the network apparatus 10, vehicle apparatus 20, and/or intermediary apparatus 30, are described in more detail below with respect to FIGS. 2A, 2B, and 2C.

II. Example Operation

Example embodiments provide methods, apparatus, systems, computer program products, and/or the like for maintaining and/or updating a digital map. In various embodiments, the digital map is maintained and/or updated (e.g., by the network apparatus 10) such that the map information/data is correct, accurate, and up-to-date. In an example embodiment, the map information/data is automatically updated in near real time or real time with respect to changes in the road network represented by the digital map. In various embodiments, the digital map is maintained and/or updated by the network apparatus 10 based on road information/data encoded in maplets. In various embodiments, the maplets were generated by vehicle apparatuses 20 based on sensor information/data captured by sensors 29 onboard the corresponding vehicles 5. A maplet is a data structure comprising abstracted, parameterized, fused representations (e.g., observations) of one or more environment elements detected in sensor information/data captured by one or more sensors 29 of a vehicle apparatus 20 and/or onboard a corresponding vehicle 5. In an example embodiment, the data structure of the maplet further comprises a representation of the vehicle's 5 trajectory history for a segment of a vehicle's 5 trajectory. In an example embodiment, the segment of the vehicle's 5 trajectory may correspond to predetermined length and/or time of a single vehicle ignition cycle. An ignition cycle is the period of time between when a vehicle 5 is turned on (e.g., the ignition is initiated) and when the vehicle (e.g., the engine) is turned off. In various embodiments, the environment elements comprise a topology of a segment of the road network as indicated by segment of the vehicle's trajectory and observations corresponding to the segment of the road network such as sign faces, road surface markings, pole-like objects, construction markers, traffic signals, lane markings, driving surface edge (e.g., edge of the pavement comprising the driving surface), road side barriers, and/or the like. In various embodiments, the data structure of the maplet is a predefined and/or predetermined, standardized data structure. For example, the data structure of the maplet may be in accordance with a predetermined/predefined, standardized data model and have predetermined/predefined, standardized data formats for each observation class of road information/data and/or each trajectory type (e.g., pose points, GNSS points, and/or the like).

In an example embodiment, a network apparatus 10 is configured to automatically enforce and/or administrate a map management strategy. For example, the map management strategy may provide guidance and/or dictate how often a region of the road network is monitored for updates and/or changes, which observation classes of road information/data are requested from vehicle apparatuses 20 for a particular maplet request, which type of trajectory (e.g., pose points, GNSS points, and/or the like) to include in the maplet and/or the like. Based on the map management strategy, the network apparatus 10 may identify a request trigger corresponding to a request region. Responsive to determining that a request trigger has been identified, the network apparatus 10 may generate and provide a corresponding maplet request such that plurality of vehicle apparatuses 20 receive the maplet request. For example, the maplet request may be provided to vehicle apparatuses 20 that are located within the request region; within a predetermined, predefined, and/or configurable distance from the request region; expected to enter the request region during a predetermined and/or predefined time window corresponding to the maplet request (e.g., based on travel history of the vehicle apparatus 20, a current route of the vehicle apparatus 20, and/or the like); and/or the like.

A vehicle apparatus 20 may receive a maplet request and, responsive thereto, when the vehicle 5 is located within the request region (e.g., as determined by the one or more location sensors 29), the vehicle apparatus 20 may generate and provide maplets based on the maplet request. For example, sensors 29 onboard the vehicle 5 may capture sensor information/data as the vehicle 5 traverses a portion of the road network within the request region. For each predefined and/or predetermined length (e.g., 1 km, 5 km, and/or the like) and/or time (e.g., 30 seconds, 1 minute, 2 minutes, 3 minutes, and/or the like) of travel of the vehicle 5 along the road network within the request region, the vehicle apparatus 20 may generate a maplet. The vehicle apparatus 20 may fuse the sensor information/data captured by the sensors 29 onboard the vehicle 5 as the vehicle 5 traversed the portion of the road network to form a uniform multi-sensor data stream of the environment surrounding the vehicle 5 as the vehicle 5 traversed the portion of the road network. The multi-sensor data stream may include a trajectory of the vehicle 5 encoded as pose points and/or GNSS points. The multi-sensor data stream may include one or more observations such as sign faces, road surface markings, pole-like objects, construction markers, traffic signals, lane markings, driving surface edge (e.g., edge of the pavement comprising the driving surface), road side barriers, and/or the like. Each observation is associated with a corresponding observation class. Example observation classes include sign faces, road surface markings, pole-like objects, construction markers, traffic signals, lane markings, driving surface edge (e.g., edge of the pavement comprising the driving surface), road side barriers, and/or the like. The vehicle apparatus 20 may generate a maplet encoding the trajectory of the vehicle 5 as pose points, GNSS points, and/or the like. In various embodiments, the maplet may further encode road information/data corresponding to one or more observations and/or observations of one or more observation classes identified in the multi-sensor data stream. The vehicle apparatus 20 may then provide the maplet (e.g., may transmit the maplet) such that the network apparatus 10 receives the maplet. In an example embodiment, the vehicle apparatus 20 may compress the maplet and the provided maplet may be the compressed maplet.

The network apparatus 10 may receive a plurality of maplets in response to the provided maplet request. In an example embodiment, the network apparatus 10 receives the plurality of maplets via one or more intermediary apparatuses 30. In an example embodiment, the intermediary apparatus 30 may receive a compressed maplet provided by a vehicle apparatus 20, decompress the compressed maplet, and provide the decompressed maplet such that the network apparatus 10 receives the decompressed maplet. The network apparatus 10 may analyze the plurality of maplets to maintain and/or update the digital map. For example, the network apparatus 10 may analyze the plurality of maplets to identify road segments and/or lane segments of the road network not represented by the digital map. The identified road segments and/or lane segments that were not represented by the digital map may then be added to the digital map. In another example, the network apparatus 10 may analyze the plurality of maplets to determine if the map information/data of the digital map is correct, accurate, and/or up-to-date. For example, the network apparatus may analyze the plurality of maplets to determine if the road information/data provided by the maplets is in agreement with the map information/data and/or to determine if the road information/data provided by the maplets indicates that there have been changes to the road network since the map information/data was last updated. In another example, the network apparatus 10 may analyze the plurality of maplets to determine one or more updates to a digital map. After the digital map has been updated, the network apparatus 10 may provide the updated digital map (and/or tiles thereof) such that a plurality of vehicle apparatuses 20 (e.g., possibly via one or more intermediary apparatuses 30) receive the updated digital map (and/or tiles thereof) for use in performing one or more navigation functions.

Maintaining and/or Updating a Digital Map

FIG. 3 provides a flowchart illustrating operations performed by a network apparatus 10 to maintain and/or update a digital map, in accordance with an example embodiment. Starting at block 302, a request trigger is identified. For example, the network apparatus 10 may identify a request trigger. For example, the network apparatus 10 may comprise means, such as processor 12, memory 14, communication interface 16, and/or the like, for identifying a request trigger. In an example embodiment, the request trigger is provided by a computing entity independent of the network apparatus 10 (e.g., via network 50). For example, a vehicle apparatus 20 may provide a communication indicating that the map information/data of the digital map is incorrect. For example, a traffic management organization (e.g., department of transportation) may provide a communication indicating one or more changes to a road network (e.g., a roadwork/construction plan announcement and/or the like). In an example embodiment, the request trigger is identified based on a timer expiring. For example, a timer may indicate that a predetermined time period has elapsed since map information/data corresponding to a region of a road network was last validated and/or updated.

At block 304, responsive to identifying the request trigger, a maplet request is generated. For example, the network apparatus 10 may generate a maplet request. For example, the network apparatus 10 may comprise means, such as processor 12, memory 14, and/or the like for generating a maplet request. For example, the maplet request may identify a request region. In an example embodiment, a request region is a region of a road network for which the maplet information/data is desired. For example, road information/data corresponding to the request region is desired. In an example embodiment, a request region may be defined using the nodes and/or road or lane segments bounding the request region, using a plurality of geolocation points defining a polygon bounding the request region (e.g., points located at the vertices of the polygon), using a radius and a central point to define a circle that bounds the request region, and/or the like. In an example embodiment, the maplet request may define a buffer region about the request region. In an example embodiment, a buffer region is a region about and/or immediately adjacent to and outside of the request region. For example, the buffer region may extend a default distance out from the request region (e.g., 0.1 km, 0.25 km, 0.5 km, 1 km, 2 km, 5 km, and/or the like). In an example embodiment, the maplet request may define the buffer region using the nodes and/or road or lane segments bounding the exterior of the bugger region, using a plurality of geolocation points defining a polygon bounding the exterior of the buffer region, using a radius and a central point to define a circle that bounds the exterior of the buffer region, and/or the like.

For example, FIG. 4 illustrates an example portion of a road network 400. A maplet request defines a request region 402. For example, the maplet request may comprise a plurality of node and/or road/lane segment identifiers defining a boundary 404 of the request region 402, points located at the vertices of a polygon that is the boundary 404 the request region 402, a center point of the request region 402 and a radius that define a boundary 404 of the request region 402, and/or the like. The maplet request defines a buffer region 406 about the request region 402. For example, the maplet request may comprise a plurality of node and/or road/lane segment identifiers defining a buffer boundary 408 of the buffer region 406, points located at the vertices of a polygon that is the buffer boundary 408 of the buffer region 406, a center point of the request region 402 and a radius that define a buffer boundary 408 of the buffer region 406, and/or the like. In an example embodiment, the buffer boundary

408 may be positioned a default distance out from the boundary 404 of the request region 402.

In various embodiments, a maplet request may indicate one or more observation classes of road information/data to be included in the maplets generated in response to the maplet request. Example observation classes of road information/data that may be included in a maplet include sign faces, road surface markings, pole-like objects, construction markers, traffic signals, lane markings, driving surface edge (e.g., edge of the pavement comprising the driving surface), road side barriers, and/or the like. In an example embodiment, a maplet request may indicate that only road information/data corresponding to a trajectory (e.g., pose points, GNSS points, and/or the like) is to be included in the maplet. In an example embodiment, a maplet request may indicate that road information/data corresponding to a trajectory (e.g., pose points, GNSS points, and/or the like) is to be included in the maplet. In an example embodiment, a maplet request may indicate that the maplet should include road information/data corresponding to one or more observations and/or observations of one or more observation classes identified in the multi-sensor data stream. In an example embodiment, a maplet request may indicate that the maplet should include road information/data corresponding to one or more observations and/or observations of one or more observation classes identified in the multi-sensor data stream and road information/data corresponding to a trajectory (e.g., pose points, GNSS points, and/or the like).

In an example embodiment, the maplet request may indicate a time window during which the maplet request is active. For example, the maplet request may indicate a start time and an end time defining the time window for which the maplet request is active. For example, vehicle apparatuses 20 traversing a portion of the road network within the request region are to provide maplets during the time window that the maplet request is active. In another example, the maplet request may indicate an ending time for the time window during which the maplet request is active and a vehicle apparatus 20 traversing a portion of the road network within the request region is to provide maplets between the time the maplet request was received by the vehicle apparatus 20 and the ending time. The time window for which the maplet request is active may be determined based on a goal number of maplets to be received in response to the maplet request.

At block 306, the maplet request is provided. For example, the network apparatus 10 may provide (e.g., transmit) the maplet request. For example, the network apparatus 10 may comprise means, such as processor 10, memory 14, communication interface 16, and/or the like for providing the maplet request. In an example embodiment, the maplet request is provided such that one or more vehicle apparatuses 20 receive the maplet request. In an example embodiment, an intermediary apparatus 30 may receive the maplet request provided by the network apparatus 10 and may provide the maplet request such that one or more vehicle apparatuses 20 receive the maplet request.

Continuing with FIG. 3, at block 308, a plurality of maplets are received. For example, the network apparatus 10 may receive a plurality of maplets in response to the maplet request. For example, the network apparatus 10 may comprise means, such as processor 10, memory 14, communication interface 16, and/or the like for receiving maplets. In an example embodiment, the network apparatus 10 receives maplets that have been decompressed by an intermediary apparatus 30. In an example embodiment, the network apparatus 10 may receive compressed maplets and may decompress the maplets.

In an example embodiment, the maplet request does not include an ending time. Rather, the network apparatus 10 may be configured to provide a cancellation of the maplet request after a desired or sufficient number of maplets are received and/or after a desired and/or sufficient coverage of the request region is achieved. In such an example embodiment, at block 310, it may be determined that a sufficient number of maplets have been received. For example, the network apparatus 10 may determine that a sufficient number of maplets have been received. For example, the network apparatus 10 may comprise means, such as processor 12, memory 14, communications interface 16, and/or the like, for determining that a sufficient number of maplets have been received. At block 312, the a request cancellation message is provided such that the vehicle apparatuses 20 receive the request cancellation message and stop providing maplets corresponding to the request region. For example, the network apparatus 10 may provide the request cancellation message. For example, the network apparatus 10 may comprise means, such as the processor 12, memory 14, communication interface 16, and/or the like, for providing the request cancellation message such that the vehicle apparatuses 20 receive the request cancellation message.

At block 314, the digital map is maintained and/or updated based on the received plurality of maplets. For example, the map information/data of the digital map may be automatically validated (e.g., determined to be correct, accurate, and/or up-to-date) based on the maplets. For example, it may be determined, based on the received plurality of maplets, that one or more changes have occurred to the road network since the map information/data was last updated and the map information is not currently correct, accurate and/or up-to-date and/or that the map information/data should be updated. For example, updated map information/data may be determined and the digital map may be updated based on the received plurality of maplets. For example, the map information/data may be updated and/or modified to match and/or be in agreement with the road information/data provided by the received plurality of maplets.

In various embodiments, the road information/data of multiple maplets corresponding to the same location may be merged. For example, if a plurality of maplets are received that report an observation of a particular observation class at similar locations (e.g., each maplet reports an observation of the particular observation class within one meter, five meters, and/or the like of the other maplets), it may be determined (e.g., by the network apparatus 10) that a real world object and/or a feature corresponding to the particular observation class is located at a location determined by averaging the locations reported for the observations by the plurality maplets. The average may be a weighted average based, for example, on covariance matrices provided by the corresponding maplets, a relevant accuracy or standard deviation provided in the header of the maplet, and/or the like. The average and/or weighted average of corresponding road information/data provided by the plurality of maplets provides merged road information/data, in an example embodiment. For example, the merged road information/data may comprise one or more features. Thus, merged road information/data may be determined based on the plurality of received maplets. In an example embodiment, the map information/data may be compared to the merged road information/data to validate the map information/data. In an example embodiment, new road/lane segments may be added to the map information/data based on merged road information/data. In an example embodiment, an update or modification of map information/data may be determined based on the merged road information/data.

Map Management Strategy

As noted above, the network 50 (and/or proprietary network 50A) may be a bandwidth limited network. For example, network 50 (and/or proprietary network 50A) is a wireless network, in various embodiments. Moreover, the constant processing of maplets corresponding to the entire road network would require a large amount of processing/computing power. In order to efficiently use network bandwidth and processing/computing resources, a map management strategy may be used. In an example embodiment, a map management strategy may be used to define request regions, determine how often map information/data corresponding to a request region is validated, determine when efforts will be made to discover road and/or lane segments not represented by the digital map, and/or the like. In an example embodiment, a map management strategy may comprise three different modes.

For example, a first mode may be a validation mode. The map management strategy may indicate that map information/data of each request region be validated using the validation mode at a validation frequency (e.g., once an hour, twice a day, once a day, once a week, once a month, and/or the like). In an example embodiment, each request region may be assigned a validation frequency with which the corresponding map information/data is to be validated. For example, the validation frequency of a first request region may be different than the validation frequency of a second request region, in an example embodiment. In various embodiments, the validation frequency for a first request region is determined based on whether the previous validation cycle validated the map information/data or indicated the map information/data needed to be updated.

For example, a second mode may be a discovery mode. The map management strategy may use the discovery mode to identify road and/or lane segments of the road network for which representations are not yet incorporated into the map information/data. For example, the discovery mode may be used to determine the topology of road and/or lane segments for which map information/data does not yet exist in the digital map. In an example embodiment, the discovery mode may be activated when a validation mode indicates that the map information/data corresponding to a request region is validated (e.g., an update does not need to be performed for the request region at this time). For example, if map information/data of a first request region is validated such that an update does not need to be performed for the first request region at this time, the discovery mode may be triggered with respect to a second request region. In an example embodiment, the discovery mode may be activated when processing resources are available (e.g., not being used by the validation mode or update mode operations).

For example, a third mode may be an update mode. In an example embodiment, the update mode may be activated for a request region in response to a validation mode operation determining that map information/data corresponding to a request region should be updated (e.g., an inconsistency between the (merged) road information/data of received maplets and the corresponding map information/data is identified). In an example embodiment, the update mode may be activated for a request region in response to one or more new road and/or lane segments being identified by discovery mode operations. In various embodiments, the update mode is used to update and/or modify map information/data of a digital map based on (merged) road information/data.

Thus, a map management strategy may provide for efficient use of resources (e.g., network bandwidth, processing/computing resources) and automated timely updating of a digital map. In an example embodiment, the map management plan may cause simultaneous operations for multiple regions. For example, the map management strategy may cause simultaneous operating of a validation mode for request regions 1 and 2, update mode for request regions 3, 4, and 5, and discovery mode for request region 6. In various embodiments, the network apparatus 10 may enforce and/or implement the map management strategy. For example, the network apparatus 10 may identify request triggers based on the map management strategy.

Exemplary Validation Mode Operation

FIG. 5 provides a flowchart illustrating operations of a validation mode, according to an example embodiment of the present invention. Starting at block 502, a validation request trigger is identified based on the map management strategy. For example, the network apparatus 10 may identify a validation request trigger for a request region based on the map management strategy. For example, the network apparatus 10 may comprise means, such as processor 12, memory 14, communication interface 16, and/or the like, for identifying a validation request trigger for a request region. In an example embodiment, the validation request trigger for the request region is provided by a computing entity independent of the network apparatus 10 (e.g., via network 50). For example, one or more vehicle apparatuses 20 may provide communications indicating that the map information/data of the digital map is incorrect which may, according to the rules/guidelines of the map management strategy, cause a validation request trigger to be identified for a corresponding request region. For example, a traffic management organization (e.g., department of transportation) may provide a communication indicating one or more changes to a road network (e.g., a roadwork/construction plan announcement and/or the like) which may, according to the rules/guidelines of the map management strategy, cause a validation request trigger to be identified for a corresponding request region. In an example embodiment, the validation request trigger for the request region is identified based the validation frequency for the request region. For example, a timer may indicate that a predetermined time period (e.g., determined based on the validation frequency for the request region) has elapsed since map information/data corresponding to the request region of a road network was last validated and/or updated.

At block 504, a validation maplet request is generated and provided for the request region. For example, a network apparatus 10 may generate and provide a validation maplet request corresponding to the request region. For example, a network apparatus 10 may comprise means, such as processor 12, memory 14, communication interface 16, and/or the like for generating and providing a validation maplet request corresponding to the request region. In various embodiments, the validation maplet request corresponding to the request region is generated and provided responsive to the identification of the validation request trigger corresponding to the request region.

In various embodiments, the validation maplet request may identify a request region. In an example embodiment, a request region is a region of a road network for which the maplet information/data is desired. For example, road information/data corresponding to the request region is desired.

In an example embodiment, a request region may be defined using the nodes and/or road or lane segments bounding the request region, using a plurality of geolocation points defining a polygon bounding the request region (e.g., points located at the vertices of the polygon), using a radius and a central point to define a circle that bounds the request region, and/or the like. In an example embodiment, the maplet request may define a buffer region about the request region. In an example embodiment, a buffer region is a region about and/or immediately adjacent to and outside of the request region. For example, the buffer region may extend a default distance out from the request region (e.g., 0.1 km, 0.25 km, 0.5 km, 1 km, 2 km, 5 km, and/or the like). In an example embodiment, the maplet request may define the buffer region using the nodes and/or road or lane segments bounding the exterior of the bugger region, using a plurality of geolocation points defining a polygon bounding the exterior of the buffer region, using a radius and a central point to define a circle that bounds the exterior of the buffer region, and/or the like.

In various embodiments, a validation maplet request may indicate one or more observation classes of road information/data to be included in the maplets generated in response to the validation maplet request. For example, a maplet may comprise road information/data providing a trajectory of a vehicle 5 through the request region (e.g., pose points and/or GNSS points). For example, a maplet may comprise road information/data corresponding to observations of one or more observation classes that were identified in the multi-sensor data stream as the vehicle 5 traveled through the request region. The road information/data corresponding to observations may be provided as part of the maplet in addition to the maplet comprising the road information/data providing the trajectory. Example observation classes for which corresponding observations may be included in a maplet include sign faces, road surface markings, pole-like objects, construction markers, traffic signals, lane markings, driving surface edge (e.g., edge of the pavement comprising the driving surface), road side barriers, and/or the like. In an example embodiment, a validation maplet request may indicate that only road information/data corresponding to a trajectory (e.g., pose points, GNSS points, and/or the like) is to be included in the maplet. In an example embodiment, a validation maplet request may indicate that either and/or both pose point and/or GNSS point road information/data is to be included in the maplet. In an example embodiment, a validation maplet request may indicate that the maplet should include road information/data corresponding to one or more observations and/or observations of one or more observation classes identified in the multi-sensor data stream. In an example embodiment, a validation maplet request may indicate that the maplet should include road information/data corresponding to one or more observations and/or observations of one or more observation classes identified in the observation and road information/data corresponding to a trajectory (pose point, GNSS point, and/or the like road information/data) of a corresponding vehicle 5 through the request region.

In an example embodiment, the validation maplet request may indicate a time window during which the validation maplet request is active. For example, the validation maplet request may indicate a start time and an end time defining the time window for which the maplet request is active. For example, vehicle apparatuses 20 traversing a portion of the road network within the request region are to provide maplets during the time window that the validation maplet request is active. In another example, the validation maplet request may indicate an ending time for the time window during which the maplet request is active and a vehicle apparatus 20 traversing a portion of the road network within the request region is to provide maplets between the time the validation maplet request was received by the vehicle apparatus 20 and the ending time. In various embodiments, a goal number of maplets to be received in response to a validation maplet request may be fewer than the goal number of maplets to be received in response to an update maplet request. The time window for which the validation maplet request is active may be determined based on the goal number of maplets to be received in response to the validation maplet request.

In an example embodiment, the validation maplet request is provided such that one or more vehicle apparatuses 20 receive the validation maplet request. For example, after the validation maplet request is generated, the validation maplet request may be provided such that a plurality of vehicle apparatuses 20 receive the validation maplet request. In an example embodiment, an intermediary apparatus 30 may receive the validation maplet request provided by the network apparatus 10 and may provide the validation maplet request such that one or more vehicle apparatuses 20 receive the validation maplet request.

At block 506, a plurality of maplets are received. For example, the network apparatus 10 may receive a plurality of maplets in response to the maplet request. For example, the network apparatus 10 may comprise means, such as processor 12, memory 14, communication interface 16, and/or the like for receiving maplets. For example, a plurality of vehicle apparatuses 20 may each provide one or more maplets such that the network apparatus 10 receives a plurality of maplets.

At block 508, the plurality of maplets may be decompressed. For example, in an example embodiment, the network apparatus 10 may decompress the plurality of maplets. For example, the network apparatus 10 may comprise means, such as processor 12, memory 14, and/or the like, for decompressing the plurality of maplets. In an example embodiment, the network apparatus 10 receives maplets that have already been decompressed by an intermediary apparatus 30.

At block 510, road information/data from two or more maplets may be merged. For example, the topology of a road and/or lane segment indicated by road information/data corresponding to a trajectory (e.g., pose points, GNSS points, and/or the like) may be merged to determine a topology of the corresponding road and/or lane segment indicated by the road information/data of the two or more maplets. In an example embodiment, the topology of a road and/or lane segment may be indicated by a center line of a road and/or lane segment, a right side line defining a right side boundary of a road and/or lane segment, a left side line defining a left side boundary of a road and/or lane segment, and/or the like. For example, road information/data from two or more maplets corresponding to a same observation may be merged. In an example embodiment, it may be determined if observations described by road information/data of two or more maplets correspond to the same real world object and/or feature based on observation identifiers provided by each maplet, locations of the observations, the observation class corresponding to the observations, similarity of dimensions of the observations, description of the observations (e.g., shape, color, type, and/or the like), and/or the like. For example, if a first maplet provides road information/data regarding a first observation of observation class sign face and of type stop sign located at a first position and a second maplet provides road information/data regarding a second observation of observation class sign face and of type speed limit located at a second position that is near the first position, it may be determined that the first and second observations do not correspond to the same real world object or feature/element. Thus, the road information/data regarding the first and second observations will not be merged. In another example, if a first maplet provides road information/data regarding a first observation of observation class sign face and of type stop sign located at a first position and a third maplet provides road information/data regarding a third observation of observation class sign face and of type stop sign located at a third position that is near the first position, it may be determined that the first and third observations correspond to the same real world object or feature/element. Thus, the road information/data regarding the first and third observations may be merged.

In various embodiments, merged road information/data may be generated from road information/data provided by two or more maplets by averaging corresponding fields of the road information/data. For example, using the above stop sign example, the location of the stop sign may be determined by averaging the first position and the third position. In an example embodiment, merged road information/data may be generated from two more maplets by taking a weighted average of corresponding fields of the road information/data. For example, the first and third positions may be weighted based on the accuracy of each of the first and third positions. For example, a weighted average may be determined based on covariance matrices provided by the corresponding maplets, a relevant accuracy or standard deviation provided in the headers of the corresponding maplets, and/or the like. Various other methods of merging road information/data provided by two or more maplets may be used in various embodiments to generate merged road information/data.

At block 512, it may be determined if the (merged) road information/data corresponding to the received plurality of maplets validate the current map information/data. For example, it may be determined if the (merged) road information/data corresponding to the received plurality of maplets is in agreement with the map information/data of the digital map or if the (merged) road information/data corresponding to the received plurality of maplets indicate one or more changes to the road network compared to the representation of the road network provided by the digital map. For example, it may be determined if one or more changes to the road network have occurred since the map information/data was last updated based on the (merged) road information/data corresponding to the received plurality of maplets. For example, it may be determined, based on the (merged) road information/data corresponding to the received plurality of maplets, if the current map information/data is correct, accurate, and/or up-to-date. For example, the network apparatus 10 may determine if the (merged) road information/data corresponding to the received plurality of maplets validates the current map information/data. For example, the network apparatus 10 may comprise means, such as the processor 12, memory 14, and/or the like, for determining if the (merged) road information/data corresponding to the received plurality of maplets validates the current map information/data. In various embodiments, the determination may be made by comparing the (merged) road information/data corresponding to the received plurality of maplets to the current map information/data to determine whether all corresponding elements of the (merged) road information/data and the current map information/data match and therefore the map information/data corresponding to the request region is validated. In various embodiments, the determination may be may made by comparing the (merged) road information/data corresponding to received plurality of maplets to the current map information/data to determine whether (a) one or more elements of the (merged) road information/data do not match the corresponding element of the current map information/data, (b) one or more elements of the (merged) road information/data does not have a corresponding element in the map information/data, and/or (c) one or more elements of the current map information/data does not have a corresponding element of the (merged) road information/data and the therefore the map information/data corresponding to the request region is not validated and/or should be updated.

If it is determined at block 512 that the (merged) road information/data corresponding to the received plurality of maplets does not validate the current map information/data and/or indicates that the current map information/data should be updated, the process continues to block 514. At block 514, an update request trigger corresponding to the request region is generated and/or the identification of an update request trigger corresponding to the request region is caused. For example, the network apparatus 10 may generate an update request trigger corresponding to the request region and/or cause an update request trigger corresponding to the request region to be identified. For example, the network apparatus 10 may comprise means, such as processor 12, memory 14, and/or the like, for generating an update request trigger corresponding to the request region and/or causing the identification of an update request trigger corresponding to the request region. For example, the request region of the update request trigger is the same as the request region of the validation maplet request.

If it is determined at block 512 that the (merged) road information/data corresponding to the received plurality of maplets does validate the current map information/data, the process continues to block 516. At block 516, a validation timer may be reset in accordance with the validation frequency corresponding to the request region. For example, the network apparatus 10 may reset a validation timer for the request region in accordance with the validation frequency corresponding to the request region. For example, the network apparatus 10 may comprise means, such as processor 12, memory 14, and/or the like, for resetting a validation timer for the request region in accordance with the validation frequency corresponding to the request region. The resetting of the validation timer may cause the identification of a validation request trigger for the request region at some point in the future in accordance with the validation frequency corresponding to the request region and/or the map management strategy.

Exemplary Discovery Mode Operation

FIG. 6 provides a flowchart illustrating operations of a discovery mode, according to an example embodiment of the present invention. Starting at block 602, a discovery request trigger is identified based on the map management strategy. For example, the network apparatus 10 may identify a discovery request trigger for a request region based on the map management strategy. For example, the network apparatus 10 may comprise means, such as processor 12, memory 14, communication interface 16, and/or the like, for identifying a discovery request trigger for a request region. In an example embodiment, the discovery request trigger for the request region is provided by a computing entity independent of the network apparatus 10 (e.g., via network 50). For example, one or more vehicle apparatuses 20 may provide a communication indicating that the vehicle apparatuses 20 are traveling along a road and/or lane segment that is not represented by map information/data of the digital map which may, according to the rules/guidelines of the map management strategy, cause a discovery request trigger to be identified for a corresponding request region. For example, a traffic management organization (e.g., department of transportation) may provide a communication indicating one or more changes and/or (planned) additions to a road network (e.g., a roadwork/construction plan announcement and/or the like) which may, according to the rules/guidelines of the map management strategy, cause a discovery request trigger to be identified for a corresponding request region. In an example embodiment, the discovery request trigger for the request region is identified based on availability of computing/processing resources, and/or the like. In an example embodiment, a request region for a discovery request trigger may be a region outside of (but adjacent, adjoining, and/or abutting) the road network represented by the digital map and/or a region where the digital map includes a sparse representation of the road network within the request region (e.g., major thoroughfares may be represented in the current digital map, but smaller roads may be not represented by the current digital map).

At block 604, a discovery maplet request is generated and provided for the request region. For example, a network apparatus 10 may generate and provide a discovery maplet request corresponding to the request region. For example, a network apparatus 10 may comprise means, such as processor 12, memory 14, communication interface 16, and/or the like for generating and providing a discovery maplet request corresponding to the request region. In various embodiments, the discovery maplet request corresponding to the request region is generated and provided responsive to the identification of the discovery request trigger corresponding to the request region.

In various embodiments, the discovery maplet request may identify a request region. In an example embodiment, a request region is a region of a road network (and/or a region adjacent, adjoining, and/or abutting the road network as represented by digital map) for which the maplet information/data is desired. For example, road information/data corresponding to the request region is desired. In an example embodiment, a request region may be defined using the nodes and/or road or lane segments bounding the request region, using a plurality of geolocation points defining a polygon bounding the request region (e.g., points located at the vertices of the polygon), using a radius and a central point to define a circle that bounds the request region, and/or the like. In an example embodiment, the maplet request may define a buffer region about the request region. In an example embodiment, a buffer region is a region about and/or immediately adjacent to and outside of the request region. For example, the buffer region may extend a default distance out from the request region (e.g., 0.1 km, 0.25 km, 0.5 km, 1 km, 2 km, 5 km, and/or the like). In an example embodiment, the maplet request may define the buffer region using the nodes and/or road or lane segments bounding the exterior of the bugger region, using a plurality of geolocation points defining a polygon bounding the exterior of the buffer region, using a radius and a central point to define a circle that bounds the exterior of the buffer region, and/or the like.

In various embodiments, a discovery maplet request may indicate that only road information/data corresponding to a trajectory of a vehicle 5 through at least a portion of the request region is to be included in the maplets generated in response to the discovery maplet request. For example, the discovery maplet request may indicate that the maplet is only to include pose point road information/data in addition to the maplet header information/data. For example, the discovery maplet request may indicate that the maplet is only to include pose point road information/data and/or GNSS point road information/data in addition to the maplet header information/data. For example, the discovery mode may be configured to determine a topology of one or more road and/or lane segments within the request region and therefore only road information/data corresponding to the trajectory of a vehicle 5 through at least a portion of the request region is desired.

In an example embodiment, the discovery maplet request may indicate a time window during which the discovery maplet request is active. For example, the discovery maplet request may indicate a start time and an end time defining the time window for which the maplet request is active. For example, vehicle apparatuses 20 traversing a portion of the road network within the request region are to provide maplets during the time window that the discovery maplet request is active. In another example, the discovery maplet request may indicate an ending time for the time window during which the maplet request is active and a vehicle apparatus 20 traversing a portion of the road network within the request region is to provide maplets between the time the discovery maplet request was received by the vehicle apparatus 20 and the ending time. In various embodiments, a goal number of maplets to be received in response to a discovery maplet request may be fewer than the goal number of maplets to be received in response to an update maplet request. The time window for which the discovery maplet request is active may be determined based on the goal number of maplets to be received in response to the discovery maplet request.

In an example embodiment, the discovery maplet request is provided such that one or more vehicle apparatuses 20 receive the discovery maplet request. For example, after the discovery maplet request is generated, the discovery maplet request may be provided such that a plurality of vehicle apparatuses 20 receive the discovery maplet request. In an example embodiment, an intermediary apparatus 30 may receive the discovery maplet request provided by the network apparatus 10 and may provide the discovery maplet request such that one or more vehicle apparatuses 20 receive the discovery maplet request.

At block 606, a plurality of maplets are received. For example, the network apparatus 10 may receive a plurality of maplets provided by vehicle apparatuses 20 in response to the discovery maplet request. For example, the network apparatus 10 may comprise means, such as processor 12, memory 14, communication interface 16, and/or the like for receiving maplets provided by vehicle apparatuses 20 in response to the discovery maplet request. For example, a plurality of vehicle apparatuses 20 may each provide one or more maplets such that the network apparatus 10 receives a plurality of maplets.

At block 608, the plurality of maplets may be decompressed. For example, in an example embodiment, the network apparatus 10 may decompress the plurality of maplets. For example, the network apparatus 10 may comprise means, such as processor 12, memory 14, and/or the like, for decompressing the plurality of maplets. In an example embodiment, the network apparatus 10 receives maplets that have already been decompressed by an intermediary apparatus 30.

At block 610, road information/data from two or more maplets may be merged. For example, the topology of a road and/or lane segment indicated by road information/data corresponding to a trajectory (e.g., pose points, GNSS points, and/or the like) may be merged to determine a topology of the corresponding one or more road and/or lane segments indicated by the trajectory road information/data of the two or more maplets. In an example embodiment, the topology of a road and/or lane segment may be indicated by a center line of a road and/or lane segment, a right side line defining a right side boundary of a road and/or lane segment, a left side line defining a left side boundary of a road and/or lane segment, and/or the like. In an example embodiment, a curve may be fit to the pose points and/or GNSS points provided by the trajectory road information/data of each maplet. It may be determined which curves are expected to correspond to the same road and/or lane segment if the curves satisfy a distance threshold requirements and/or the like. For example, if two curves indicate that two vehicles 5 traveled in the same direction less than a threshold distance from one another (e.g., less than five meters, two meters, one meter, and/or the like) it may be determined that two vehicles 5 were traveling along the same road and/or lane segment and the curves may be merged.

In various embodiments, merged road information/data may be generated from road information/data provided by two or more maplets by averaging corresponding fields of the road information/data. For example, if a plurality of curves are determined to correspond to the same road and/or lane segment, an average curve and/or weighted average curve may be determined. For example, if a plurality of curves are determined to correspond to the same road and/or lane segment, the curves may be fit to statistical distribution (e.g., a Gaussian distribution, chi-squared distribution, and/or the like). In various embodiments, the curves fit to the pose points and/or GNSS points of various maplets may be averaged and/or fit to a statistical distribution based on a weight associated with each curve and determined based on covariance matrices provided by the corresponding maplets, a relevant accuracy or standard deviation provided in the headers of the corresponding maplets, and/or the like. Various other methods of merging road information/data provided by two or more maplets may be used in various embodiments to generate merged road information/data that defines the topology of one or more road and/or lane segments within the request region.

At block 612, driving patterns within the request region are determined. In various embodiments, the driving patterns may define the topology of one or more road and/or lane segments within the request region. For example, if a plurality of curves are determined to correspond to the same road and/or lane segment, an average curve and/or weighted average curve may be used to define the center line of a road and/or lane segment. For example, if a plurality of curves are determined to correspond to the same road and/or lane segment, the curve furthest to the right hand side of the road and/or lane segment may be determined to define the right side line for the road and/or lane segment. For example, if a plurality of curves are determined to correspond to the same road and/or lane segment, the curve furthest to the left hand side of the road and/or lane segment may be determined to define the left side line for the road and/or lane segment. In another example, the curves may be fit to statistical distribution (e.g., a Gaussian distribution, chi-squared distribution, and/or the like) and the center line may be taken as the average point along the distribution, the right and left side lines may be taken as a particular number of standard deviations for the statistical distribution from the average point along the distribution, and/or the like. In various embodiments, the curves fit to the pose points and/or GNSS points of various maplets may be averaged and/or fit to a statistical distribution based on a weight associated with each curve and determined based on covariance matrices provided by the corresponding maplets, a relevant accuracy or standard deviation provided in the headers of the corresponding maplets, and/or the like. Various other methods of determining the driving patterns of vehicle 5 traveling through the request region and/or the topology of road and/or lane segments within the request region may be determined based on (merged) road information/data provided by two or more maplets and corresponding to trajectories of vehicles 5 through at least a portion of the request region.

At block 612, an update request trigger corresponding to the request region is generated and/or the identification of an update request trigger corresponding to the request region is caused. For example, the network apparatus 10 may generate an update request trigger corresponding to the request region and/or cause an update request trigger corresponding to the request region to be identified. For example, the network apparatus 10 may comprise means, such as processor 12, memory 14, and/or the like, for generating an update request trigger corresponding to the request region and/or causing the identification of an update request trigger corresponding to the request region. For example, the request region of the update request trigger is the same as the request region of the discovery maplet request. For example, the update request trigger may cause maplets comprising richer road information/data (e.g., including road information/data corresponding to various observations within the request region) corresponding to the request region to be received such that map information/data for the request region (e.g., the road and/or lane segments identified in the request region during the discovery mode operation) may be more fully fleshed out.

Exemplary Update Mode Operation

FIG. 7 provides a flowchart illustrating operations of an update mode, according to an example embodiment of the present invention. Starting at block 702, an update request trigger is identified based on the map management strategy. For example, the network apparatus 10 may identify an update request trigger for a request region based on the map management strategy. For example, the network apparatus 10 may comprise means, such as processor 12, memory 14, communication interface 16, and/or the like, for identifying an update request trigger for a request region. In an example embodiment, the update request trigger for the request region is provided by a computing entity independent of the network apparatus 10 (e.g., via network 50). For example, one or more vehicle apparatuses 20 may provide a communication indicating that the map information/data of the digital map is incorrect which may, according to the rules/guidelines of the map management strategy, cause an update request trigger to be identified for a corresponding request region. For example, a traffic management organization (e.g., department of transportation) may provide a communication indicating one or more changes to a road network (e.g., a roadwork/construction plan announcement and/or the like) which may, according to the rules/guidelines of the map management strategy, cause an update request trigger to be identified for a corresponding request region. In an example embodiment, the update request trigger for the request region is identified based on a validation mode and/or discovery mode operation for the request region. For example, an update request trigger may be identified responsive to the results of analyzing maplets provided by vehicle apparatuses 20 in response to a validation or discovery maplet request.

At block 704, an update maplet request is generated and provided for the request region. For example, a network apparatus 10 may generate and provide an update maplet request corresponding to the request region. For example, a network apparatus 10 may comprise means, such as processor 12, memory 14, communication interface 16, and/or the like for generating and providing an update maplet request corresponding to the request region. In various embodiments, the update maplet request corresponding to the request region is generated and provided responsive to the identification of the update request trigger corresponding to the request region.

In various embodiments, the update maplet request may identify the request region. In an example embodiment, a request region is a region of a road network for which the maplet information/data is desired. For example, road information/data corresponding to the request region is desired. In an example embodiment, a request region may be defined using the nodes and/or road or lane segments bounding the request region, using a plurality of geolocation points defining a polygon bounding the request region (e.g., points located at the vertices of the polygon), using a radius and a central point to define a circle that bounds the request region, and/or the like. In an example embodiment, the maplet request may define a buffer region about the request region. In an example embodiment, a buffer region is a region about and/or immediately adjacent to and outside of the request region. For example, the buffer region may extend a default distance out from the request region (e.g., 0.1 km, 0.25 km, 0.5 km, 1 km, 2 km, 5 km, and/or the like). In an example embodiment, the maplet request may define the buffer region using the nodes and/or road or lane segments bounding the exterior of the bugger region, using a plurality of geolocation points defining a polygon bounding the exterior of the buffer region, using a radius and a central point to define a circle that bounds the exterior of the buffer region, and/or the like.

In various embodiments, an update maplet request may indicate one or more observation classes of road information/data to be included in the maplets generated in response to the update maplet request. For example, a maplet may comprise road information/data providing a trajectory of a vehicle 5 through the request region (e.g., pose points and/or GNSS points). For example, a maplet may comprise road information/data corresponding to observations of one or more observation classes that were identified in the multi-sensor data stream as the vehicle 5 traveled through the request region. The road information/data corresponding to observations may be provided as part of the maplet in addition to the road information/data providing the trajectory. Example observation classes for which corresponding observations may be included in a maplet include sign faces, road surface markings, pole-like objects, construction markers, traffic signals, lane markings, driving surface edge (e.g., edge of the pavement comprising the driving surface), road side barriers, and/or the like. In an example embodiment, an update maplet request may indicate that only road information/data corresponding to a trajectory (e.g., pose points, GNSS points, and/or the like) is to be included in the maplet. In an example embodiment, a maplet request may indicate that either and/or both pose point and/or GNSS point road information/data is to be included in the maplet. In an example embodiment, an update maplet request may indicate that the maplet provided in response thereto should include road information/data corresponding to one or more observations and/or observations of one or more observation classes identified in the multi-sensor data stream. In an example embodiment, an update maplet request may indicate that a maplet provided in response thereto should include road information/data corresponding to one or more observations and/or observations of one or more observation classes identified in the multi-sensor data stream and road information/data corresponding to a trajectory (pose point, GNSS point, and/or the like road information/data) of a corresponding vehicle 5 through the request region.

For example, if operation of a validation mode indicates that there are construction markers in the request region that are not included in the current digital map, the update maplet request may indicate that road information/data corresponding to observations corresponding to the construction marker observation class should be provided in the maplets provided in response to the update maplet request. In an example embodiment, if operation of the validation mode indicated that the construction markers were the only change to the road network within the request region (since the last update of the digital map information/data), the update maplet request may indicate that only maplets comprising road information/data corresponding to observations corresponding to the observation class construction markers are to be provided and that the maplets should only include road information/data corresponding to vehicle trajectories (e.g., pose points, GNSS points, and/or the like) and the road information/data corresponding to observations corresponding to the observation class construction markers. Thus, the update maplet request may indicate particular observation classes for which road information/data is desired. The desired road information/data may be determined based on operation of a validation mode for the request region. Thus, the bandwidth used for the vehicle apparatuses 20 to provide the requested maplets and the processing/computing resources needed to analyze the maplets may be reduced and/or minimized.

In an example embodiment, the update maplet request may indicate a time window during which the update maplet request is active. For example, the update maplet request may indicate a start time and an end time defining the time window for which the maplet request is active. For example, vehicle apparatuses 20 traversing a portion of the road network within the request region are to provide maplets during the time window that the update maplet request is active. In another example, the update maplet request may indicate an ending time for the time window during which the maplet request is active and a vehicle apparatus 20 traversing a portion of the road network within the request region is to provide maplets between the time the update maplet request was received by the vehicle apparatus 20 and the ending time. In various embodiments, a goal number of maplets to be received in response to an update maplet request may be larger than the goal number of maplets to be received in response to a validation or discovery maplet request. The time window for which the update maplet request is active may be determined based on the goal number of maplets to be received in response to the update maplet request.

In an example embodiment, the update maplet request is provided such that one or more vehicle apparatuses 20 receive the update maplet request. For example, after the update maplet request is generated, the update maplet request may be provided such that a plurality of vehicle apparatuses 20 receive the update maplet request. In an example embodiment, an intermediary apparatus 30 may receive the update maplet request provided by the network apparatus 10 and may provide the update maplet request such that one or more vehicle apparatuses 20 receive the update maplet request.

At block 706, a plurality of maplets are received. For example, the network apparatus 10 may receive a plurality of maplets provided by vehicle apparatuses 20 in response to the update maplet request. For example, the network apparatus 10 may comprise means, such as processor 12, memory 14, communication interface 16, and/or the like for receiving maplets provided by vehicle apparatuses 20 in response to the update maplet request. For example, a plurality of vehicle apparatuses 20 may each provide one or more maplets such that the network apparatus 10 receives a plurality of maplets.

At block 708, the plurality of maplets may be decompressed. For example, in an example embodiment, the network apparatus 10 may decompress the plurality of maplets. For example, the network apparatus 10 may comprise means, such as processor 12, memory 14, and/or the like, for decompressing the plurality of maplets. In an example embodiment, the network apparatus 10 receives maplets that have already been decompressed by an intermediary apparatus 30.

At block 710, road information/data from two or more maplets may be merged. For example, the topology of a road and/or lane segment indicated by road information/data corresponding to a trajectory (e.g., pose points, GNSS points, and/or the like) may be merged to determine a topology of the corresponding road and/or lane segment indicated by the road information/data of the two or more maplets. In an example embodiment, the topology of a road and/or lane segment may be indicated by a center line of a road and/or lane segment, a right side line defining a right side boundary of a road and/or lane segment, a left side line defining a left side boundary of a road and/or lane segment, and/or the like. For example, road information/data from two or more maplets corresponding to a same real world object and/or feature/element may be merged. In an example embodiment, it may be determined if observations described by road information/data of two or more maplets correspond to the same real world object and/or feature/element based on observation identifiers provided by each maplet, locations of the observations, the observation class corresponding to the observations, similarity of dimensions of the observations, description of the observations (e.g., shape, color, type, and/or the like), and/or the like. For example, if a first maplet provides road information/data regarding a first observation of observation class sign face and of type stop sign located at a first position and a second maplet provides road information/data regarding a second observation of observation class sign face and of type speed limit located at a second position that is near the first position, it may be determined that the first and second observations do not correspond to the same real world object and/or feature/element. Thus, the road information/data regarding the first and second observations will not be merged. In another example, if a first maplet provides road information/data regarding a first observation of observation class sign face and of type stop sign located at a first position and a third maplet provides road information/data regarding a third observation of observation class sign face and of type stop sign located at a third position that is near the first position, it may be determined that the first and third observations do correspond to the same real world object and/or feature/element. Thus, the road information/data regarding the first and third observations may be merged.

In various embodiments, merged road information/data may be generated from road information/data provided by two or more maplets by averaging corresponding fields of the road information/data and/or determining a statistical distribution of values for various fields of the road information/data corresponding to an observation. For example, using the above stop sign example, the location of the stop sign may be determined by averaging the first position and the third position. In an example embodiment, merged road information/data may be generated from two more maplets by taking a weighted average of corresponding fields of the road information/data. For example, the first and third positions may be weighted based on the accuracy of each of the first and third positions. For example, a weighted average may be determined based on covariance matrices provided by the corresponding maplets, a relevant accuracy or standard deviation provided in the headers of the corresponding maplets, and/or the like. In another example, if road information/data corresponding to the stop sign is provided by a plurality of maplets, a statistical distribution corresponding to each of various features of the stop sign (e.g., location, dimensions, orientation, and/or the like) may be determined based on the corresponding fields of the road information/data. In various embodiments, determining the statistical distributions may take into account any covariance matrices provided by the corresponding maplets, a relevant accuracy or standard deviation provided in the headers of the corresponding maplets, and/or the like. Various other methods of merging road information/data provided by two or more maplets may be used in various embodiments to generate merged road information/data.

At block 712, if a time window was not defined in the update maplet request, the number of maplets received in response to the update maplet request may be monitored to determine when a sufficient number of maplets have been received and a request cancellation message cancelling the update maplet request may be provided in response to determining that the sufficient number of maplets have been received. For example, the network apparatus 10 may monitor the number of maplets received in response to the update maplet request to determine when a sufficient number of maplets have been received. Responsive to determining that a sufficient number of maplets have been received in response to the update maplet request, the network apparatus 10 may provide a request cancellation message cancelling the update maplet request. For example, the network apparatus 10 may comprise means, such as processor 12, memory 14, and/or the like, for monitoring the number of maplets received in response to the update maplet request to determine when a sufficient number of maplets have been received. The network apparatus 10 may comprise means, such as processor 12, memory 14, communication interface 16, and/or the like for, responsive to determining that a sufficient number of maplets have been received in response to the update maplet request, providing a request cancellation message cancelling the update maplet request. For example, the request cancellation message may be provided such that the request cancellation message is received by a plurality of vehicle apparatuses 20. In an example embodiment, the request cancellation message may indicate that the update maplet request is no longer active.

At block 714, the (merged) road information/data of the plurality of maplets is analyzed to determine one or more updates to the map information/data corresponding to the request region. For example, the network apparatus 10 may analyze the (merged) road information/data of the plurality of maplets to determine one or more updates to the map information/data corresponding to the request region. For example, the network apparatus 10 may comprise means, such as processor 12, memory 14, and/or the like for analyzing the (merged) road information/data of the plurality of maplets to determine one or more updates to the map information/data corresponding to the request region. For example, the (merged) road information/data and the corresponding map information/data may be compared to identify (a) one or more elements of the (merged) road information/data that do not match the corresponding element(s) of the current map information/data, (b) one or more elements of the (merged) road information/data do not have a corresponding element in the map information/data, and/or (c) one or more elements of the current map information/data do not have a corresponding element of the (merged) road information/data. When one or more elements of the (merged) road information/data are identified that do not match the corresponding element(s) of the current map information/data, an update for the current map information/data may be determined that would place the map information/data in agreement with the (merged) road information/data. When one or more elements of the (merged) road information/data do not have a corresponding element in the map information/data, map information/data representing the one or more elements of the (merged) road information/data that do not have corresponding elements in the current map information/data are generated and/or determined. When one or more elements of the current map information/data do not have a corresponding element of the (merged) road information/data, it may be determined if the current map information/data representing the elements of the map information that do not have corresponding elements of (merged) road information/data should be removed from the digital map (e.g., the geographic database storing the map information/data), turned off, and/or the like. Thus, one or more updates to the digital map and/or the map information/data of the digital map may be determined based on the (merged) road information/data.

At block 716, the digital map may be updated based on the one or more updates to the digital map information/data determined based on the (merged) road information/data. For example, the network apparatus 10 may update the digital map based on the one or more updates to the digital map information/data determined based on the (merged) road information/data. For example, the network apparatus 10 may comprise means, such as the processor 12, memory 14, and/or the like, for updating the digital map based on the one or more updates to the digital map information/data determined based on the (merged) road information/data. In various embodiments, the updated map may be packaged into tiles and/or portions of the digital map for efficient transmission of the digital map (and/or tile(s)/portion(s) thereof). For example, one or more tiles of the digital map corresponding to the request region may be updated based on the updates to the digital map information/data determined based on the (merged) road information/data.

At block 718, the updated version of the digital map (and/or tile(s)/portion(s) thereof) are provided. For example, the network apparatus 10 may provide the updated version of the digital map (and/or tile(s)/portion(s) thereof). For example, the network apparatus 10 may comprise means, such as the processor 12, memory 14, communication interface 16, and/or the like, for providing the updated version of the digital map (and/or tile(s)/portion(s) thereof). For example, the updated digital map (and/or updated tile(s)/portion(s) thereof) may be provided such that one or more vehicle apparatuses 20 receive the updated digital map (and/or updated tile(s)/portion(s) thereof). For example, the one or more vehicle apparatuses 20 may perform one or more navigation functions using the updated digital map (and/or updated tile(s)/portion(s) thereof).

Providing A Maplet

In various embodiments, a vehicle apparatus 20 may receive a maplet request (e.g., a validation maplet request, discovery maplet request, and/or update maplet request). The maplet request may indicate a request region (possibly including a buffer region about the request region), a time window for which the maplet request is active, and/or the like. If the vehicle apparatus 20 determines that the corresponding vehicle 5 is located within and/or has entered the request region and/or the buffer region while the maplet request is active, the vehicle apparatus 20 may generate and provide maplets in response to the maplet request.

FIG. 8 provides a flowchart illustrating operations performed to provide a maplet in response to a maplet request, in accordance with an example embodiment. Starting at block 802, a maplet request is received. For example, a vehicle apparatus 20 may receive a maplet request. For example, a vehicle apparatus 20 may comprise means, such as processor 22, memory 24, communication interface 26, and/or the like, for receiving a maplet request. For example, a network apparatus 10 may generate and provide the maplet request such that the vehicle apparatus 20 receives the maplet request. As noted above, in various embodiments, the maplet request comprises an indication of a request region, a buffer region about the request region, a time window during which the maplet request is active, and/or the like.

At block 804, it is determined that the vehicle apparatus 20 and/or the corresponding vehicle 5 enters and/or is located within the request region and/or within the buffer region while the maplet request is active. For example, the vehicle apparatus 20 may determine (e.g., based on a location sensor 29 of and/or in communication with the vehicle apparatus 20) that the vehicle apparatus 20 and/or the corresponding vehicle 5 has entered and/or is located within the request region and/or the buffer region while the maplet request is active. For example, the vehicle apparatus 20 may comprise means, such as processor 22, memory 24, and/or the like, for determining that the vehicle apparatus 20 and/or the corresponding vehicle 5 has entered and/or is located within the request region and/or the buffer region while the maplet request is active.

Responsive to determining that the vehicle apparatus 20 and/or the corresponding vehicle 5 has entered and/or is located within the request region and/or the buffer region while the maplet request is active, a maplet may be generated and provided, at block 806. For example, the vehicle apparatus 20 may generate and provide a maplet. For example, the vehicle apparatus 20 may comprise means, such as processor 22, memory 24, communication interface 26, sensors 29, and/or the like, for generating and providing a maplet. In various embodiments, one or more sensors 29 onboard the vehicle 5 may generate and/or capture sensor information/data comprising a plurality of detections of real world objects in the environment about the vehicle 5. Based on the sensor information/data, the vehicle apparatus 20 may generate a maplet encoding at least a portion of the road information/data indicated by the sensor information/data. In various embodiments, the maplet request indicates what road information/data should be included in the maplet. For example, the maplet request may indicate that only road information/data corresponding to a trajectory of the vehicle 5 through the request region (e.g., pose points and/or GNSS points) is to be provided. For example, the maplet request may indicate that road information/data corresponding to a trajectory of the vehicle 5 through the request region and road information/data corresponding to observations of one or more observation classes are to be included in the maplet. The generated maplet may include road information/data corresponding to the trajectory of the vehicle 5 through the request region and road information/data corresponding to observations of any observation classes identified in the maplet request. Thus, the vehicle apparatus 20 may generate a maplet based on the maplet request.

At block 808, responsive to providing a maplet, it may be determined if the vehicle apparatus 20 and/or vehicle 5 has exited the request region and/or buffer region. For example, the vehicle apparatus 20 may determine (e.g., based on a location sensor 29 of and/or in communication with the vehicle apparatus 20) if the vehicle apparatus 20 and/or vehicle 5 has exited the request region and/or buffer region. For example, the vehicle apparatus may comprise means, such as processor 22, memory 24, sensors 29, and/or the like, for determining if the vehicle 20 and/or vehicle 5 has exited the request region and/or buffer region.

If it is determined that the vehicle apparatus 20 and/or vehicle 5 has exited the request region and/or buffer region, at block 808, the process continues to block 812. At block 812, the vehicle apparatus 20 stops generating and providing maplets in response to and/or based on the maplet request.

If it is determined that the vehicle apparatus 20 and/or vehicle 5 has not exited the request region and/or buffer region, at block 808, the process continues to block 810. At block 810, it is determined if the maplet request is still active. For example, the vehicle apparatus 20 may determine if the maplet request is still active. For example, the vehicle apparatus 20 may comprise means, such as processor 22, memory 24, communication interface 26, and/or the like, for determining if the maplet request is still active. For example, it may be determined if the time window provided by the maplet request has expired or is still active. For example, it may be determined if a request cancellation message corresponding to the maplet request has been received.

If it is determined, at block 810, that the maplet request is still active, the process returns to block 808 and another maplet is generated and provided. In an example embodiment, the geographic extents of adjacent maplets provided by a vehicle apparatus 20 during a single vehicle ignition cycle do not overlap with one another. In an example embodiment, the geographic extents of adjacent maplets provided by a vehicle apparatus 20 during a single vehicle ignition cycle may overlap with one another. Any overlap may be kept to a minimum in order to minimize bandwidth requirements for transmitting the maplets. In an example embodiment, the geographic extends of adjacent maplets provided by a vehicle apparatus 20 during a single vehicle ignition cycle adjoin, abut, and/or slightly overlap such that there are not any spatial gaps between adjacent maplets.

If it is determined, at block 810, that the maplet request is not still active, the process continues to block 812. At block 812, the vehicle apparatus 20 stops generating and providing maplets in response to and/or based on the maplet request.

Generating a Maplet

In various embodiments, a maplet is generated that comprises road information/data in a predetermined/predefined, standardized data structure (and/or predetermined/predefined, standardized format in accordance with a predetermined/predefined, standardized data model). In an example embodiment, a plurality of sensors 29 are onboard the vehicle 5 and in communication with the processor 22 of the vehicle apparatus 20. Sensor information/data captured by the one or more sensors comprises a plurality of detections that may be used to generate one or more observations. The observation is a coherent and/or consistent description of the sensor information/data captured by sensors 29 onboard the vehicle 5 corresponding to detections of the same real world object. In various embodiments, the observation is described and/or encoded by road information/data. In various embodiments, the sensor information/data captured by the one or more sensors is used to generate a multi-sensor data stream comprising a plurality of observations encoded via road information/data. A maplet generated based on and/or responsive to a maplet request comprises at least a portion of the road information/data encoding the multi-sensor data stream and/or one or more observations thereof. In an example embodiment, the multi-sensor data stream corresponds to sensor information/data collected and/or captured over a predetermined length and/or time of a single vehicle ignition cycle. For example, in an example embodiment, the predetermined length is 1 km in urban situations and/or 5 km in highway situations. In various embodiments, road information/data provided by a maplet is an intermediary between raw sensor information/data and map information/data of a digital map.

In various embodiments, as the vehicle 5 traverses the segment of the vehicle's trajectory corresponding to a maplet, the sensors 29 capture sensor information/data. The captured sensor information/data comprises a plurality of detections of real world objects and/or environment elements in the environment about the vehicle 5. The captured sensor information/data may further comprise pose points and/or GNSS points describing the vehicle's trajectory through and/or along a segment of the road network. The sensor information/data is fused to form a multi-sensor data stream. For example, multiple detections of a first real world object and/or environment element captured, detected, collected, and/or the like by the same or different sensors 29 onboard the vehicle 5 may be fused to form a coherent, consistent observation of the first real world object and/or environment element. The sensor information/data comprises a plurality of detections that correspond to a plurality of real world objects and/or environment elements. The fusing of the sensor information/data generates a multi-sensor data stream comprising a plurality of observations corresponding to a plurality of real world objects and/or environment elements and/or a description (e.g., pose points and/or GNSS points) of at least a portion of the vehicle's 5 trajectory through and/or along a segment of the road network. The multi-sensor data stream (e.g., the fused sensor information/data) comprises observation road information/data that characterizes each of the observations of the multi-sensor data stream and/or trajectory road information/data that characterizes a portion of the vehicle's trajectory through and/or along a segment of the road network. The observation and/or trajectory road information/data, and/or a portion thereof, may be used to generate a maplet by formatting the observation and/or trajectory road information/data, and/or a portion thereof, into the predetermined, standardized data structure of the maplet and/or observation class portions thereof.

FIG. 9 provides a flowchart illustrating operations performed to generate a maplet in response to a maplet request, in accordance with an example embodiment. Starting at block 902, sensor information/data is captured, collected, and/or the like as the vehicle 5 traverses the road network. For example, the vehicle apparatus 20 may cause the capturing, collection, and/or the like of sensor information/data as the vehicle 5 traverses the road network, in an example embodiment. In various embodiments, the vehicle apparatus 20 receives sensor information/data captured, collected, and/or the like by a plurality of sensors 29 onboard the vehicle 5 as the vehicle 5 traverses a portion of the road network. For example, the vehicle apparatus 20 comprises means, such as processor 22, memory 24, communication interface 26, sensors 29, and/or the like, for receiving sensor information/data captured, collected, and/or the like by a plurality of sensors 29 onboard the vehicle 5 as the vehicle 5 traverses a portion of the road network. In various embodiments, the sensor information/data comprises a plurality of detections. For example, the portion of the road network may be within a request region and/or corresponding buffer region.

At block 904, at least a portion of the sensor information/data is processed, fused, combined, and/or the like to generate observations. An observation is a representation of a real world object located in the environment about the vehicle 5 as the vehicle traversed a segment of the vehicle's trajectory that is determined based on and/or is consistent with the sensor information/data (e.g., detections of the real world object) collected, captured, and/or the like as the vehicle traversed the segment of the vehicle's trajectory. In an example embodiment, the segment of the vehicle's trajectory may correspond to a predetermined length and/or time of a single vehicle ignition cycle. For example, the vehicle apparatus 20 may process, fuse, combine, and/or the like at least a portion of the sensor information/data to generate observations. For example, the vehicle apparatus 20 may comprise means, such as processor 22, memory 24, and/or the like for processing, fusing, combining, and/or the like at least a portion of the sensor information/data to generate observations.

In an example embodiment, the plurality of observations are encoded by road information/data generated by processing, fusing, and/or combining the sensor information/data and/or detections. The road information/data comprises trajectory road information/data. For example, the trajectory road information/data comprises pose points, GNSS points, and/or the like. The road information/data may further comprise road information/data corresponding to observations of real world objects in the environment about the vehicle 5 as the vehicle traversed the segment of the vehicle's trajectory. The observations may be associated with an observation class. In an example embodiment, each observation is associated with an observation class. Some example observation classes include sign faces, road surface markings, pole-like objects, construction markers, traffic signals, lane markings, driving surface edge (e.g., edge of the pavement comprising the driving surface), road side barriers, and/or the like. In an example embodiment, the road information/data corresponding to a particular observation is associated with an observation class.

At block 906, the maplet encoding the observations created from the fused sensor information/data is generated. For example, the maplet may comprise a header, trajectory road information/data (e.g., pose points, GNSS points, and/or the like), and observation road information/data for observations identified within the multi-sensor data stream that are associated with any observation classes for which the corresponding maplet request has requested information/data. For example, if the maplet request indicates that observation road information/data is request for observations associated with first and second observation classes and that observation road information/data for observations associated with a third observation class should not be included in the maplet, the maplet would comprise a header, trajectory road information/data (e.g., pose points, GNSS points, and/or the like), and observation road information/data for any observations associated with either of the first or second observation classes identified within the multi-sensor data stream. The maplet would not contain observation road information/data corresponding to any observations associated with the third observation class identified within the multi-sensor data stream. In an example embodiment, the maplet request may indicate the type of trajectory road information/data to be included in the maplet. For example, the maplet request may indicate that pose points are desired, that GNSS points are desired, or that both pose points and GNSS points are desired. The maplet is then generated in accordance with the road information/data requested in the maplet request. For example, the road information/data may be packaged, compiled, formatted, and/or the like into a maplet.

A maplet is a data structure comprising (a) abstracted, parameterized, fused representations of environment elements detected in sensor information/data captured by one or more sensors 29 of a vehicle apparatus 20 as represented by the corresponding observation road information/data and (b) a representation of the vehicle's 5 trajectory history for a segment of a vehicle's trajectory as represented by the trajectory road information/data. In an example embodiment, the segment of the vehicle's 5 trajectory may correspond to a predetermined length and/or time of a single vehicle ignition cycle. In various embodiments, the environment elements comprise a topology of a segment of the road network as indicated by segment of the vehicle's trajectory and observations corresponding to the segment of the road network such as sign faces, road surface markings, pole-like objects, construction markers, traffic signals, lane markings, driving surface edge (e.g., edge of the pavement comprising the driving surface), road side barriers, and/or the like. In various embodiments, the data structure of the maplet is a predefined and/or predetermined, standardized data structure. In an example embodiment, not every field of a maplet portion included in the maplet is populated. In various scenarios, the sensor configuration of a vehicle 5 may allow a corresponding vehicle apparatus 20 to determine various features of an observation but not every feature for which a field is provided in the corresponding data format. In such scenarios, a vehicle apparatus 20 may populate the fields of the data format for the observation for which the vehicle apparatus 20 has road information/data and may leave blank and/or omit fields of the data format for which the vehicle apparatus 20 does not have appropriate road information/data.

In various embodiments, maplets contain road information/data (e.g., fused sensor information/data captured and/or collected by sensors 29 onboard the vehicle 5, including vehicle trajectory and orientation, and observations which represent detected real world objects). A vehicle apparatus 20 may store maplets in the protobuf data structures defined by SENSORIS (e.g., SDII-Vx, where SDII-Vx is a future release of SDII currently under development). The maplets are generated in the vehicle 5 (by the vehicle apparatus 20) by storing road information/data (e.g., trajectory road information/data and/or object road information/data) within an SENSORIS data package. In an example embodiment, the vehicle apparatus 20 generates the maplet (e.g., processes/fuses/combines sensor information/data, identifies objects, and adds trajectory road information/data and observation road information/data to the maplet) as the vehicle 5 traverses the segment of the trajectory corresponding to the maplet. In an example embodiment, the vehicle apparatus 20 generates the maplet (e.g., processes/fuses/combines sensor information/data=and adds trajectory road information/data and observation road information/data to the maplet) after the vehicle 5 has finished traversing the segment of the trajectory corresponding to the maplet.

At block 910, the maplet is compressed. For example, the vehicle apparatus 20 may compress the maplet. For example, the vehicle apparatus 20 may comprise means, such as processor 22, memory 24, and/or the like for compressing the maplet. In various embodiments, the maplet is compressed to meet one or more predetermined and/or predefined compression ratio goals while not exceeding one or more predetermined and/or predefined maximum allowed data loss levels. In an example embodiment, the numerical changes caused by a compression-decompression cycle in any coordinate values, using lossy compression, should be less than 1% of the accuracy requirements for that coordinate value.

At block 912, the compressed maplet is provided. For example, the vehicle apparatus 20 may provide (e.g., transmit) the compressed maplet. For example, the vehicle apparatus 20 may comprise means, such as processor 22, memory 24, communication interface 26, and/or the like, for providing (e.g., transmitting) the compressed maplet. In various embodiments, the vehicle apparatus 20 provides (e.g., transmits) the maplet such that the network apparatus 10 receives the maplet. For example, the vehicle apparatus 20 may provide the compressed maplet such that an intermediary apparatus 30 receives the compressed maplet. The intermediary apparatus 30 may decompress the maplet. For example, the intermediary apparatus 30 may decompress the maplet to a SENSORIS (e.g., SDII-Vx) format. The intermediary apparatus 30 may then provide (e.g., transmit) the decompressed maplet such that the network apparatus 10 receives the decompressed maplet. In an example embodiment, the intermediary apparatus 30 may anonymize the maplet (e.g., remove information/data identifying the vehicle 5, the vehicle apparatus 20, and/or the user corresponding to the vehicle 5 and/or vehicle apparatus 20) prior to providing the (decompressed) maplet such that the network apparatus 10 receives the (decompressed) maplet. In an example embodiment, the intermediary apparatus 30 recompresses the maplet using a lossless compression before providing the maplet such that the network apparatus 10 receives the maplet. For example, the network apparatus 10 may receive a maplet provided by the intermediary apparatus 30 that has been compressed using a lossless compression. In an example embodiment, the vehicle apparatus 20 provides the (compressed) maplet such the network apparatus 10 receives the (compressed) maplet directly (e.g., without the intermediary actions of the intermediary apparatus 30).

Exemplary Maplet Data Structure

As noted above, a maplet is a data structure comprising (a) abstracted, parameterized, fused representations of environment elements detected in sensor information/data captured by one or more sensors of a vehicle apparatus and (b) a representation of the vehicle's trajectory history for a segment of a vehicle's trajectory. In some scenarios, a maplet may only comprise road information/data representing a vehicle's trajectory history for a segment of the vehicle's trajectory. In various embodiments, the data structure of the maplet is a predefined and/or predetermined, standardized data structure. The predefined and/or predetermined, standardized data structure comprises a predefined and/or predetermined standardized data format in accordance with a predefined and/or predetermined, standardized data model. The predefined and/or predetermined, standardized data model and predefined and/or predetermined standardized data formats are configured for efficient use of network bandwidth for the transmitting of the road information/data.

In various embodiments, the predefined and/or predetermined, standardized data structure comprises a header having a predefined and/or predetermined, standardized data format. In various embodiments, the predefined and/or predetermined, standardized data structure comprises one or more trajectory portions (e.g., for trajectory road information/data such as pose points, GNSS points, and/or the like) each having a predefined and/or predetermined, standardized data format. In various embodiments, the predefined and/or predetermined standardized data structure comprises one or more observation portions (e.g., for observation road information/data) each having a predefined and/or predetermined, standardized data format. In an example embodiment, each observation portion is associated with an observation class and the corresponding predefined and/or predetermined, standardized data format may be particular to the corresponding observation class. The predefined and/or predetermined, standardized data structure allows a variety of vehicles, each having different, possibly proprietary, sensor configurations to provide maplets that are efficiently transmitted (e.g., do not require a large amount of bandwidth for transmission) and that may be readily merged and/or combined for analysis.

Exemplary Header

In various embodiments, a maplet comprises a header. In various embodiments, the header comprises elements which are either global to the maplet or that change only slowly within a single maplet. Elements that are global to the maplet apply generally to maplets generated by the vehicle apparatus 20 or that do not change along the segment of the vehicle's trajectory corresponding to the maplet. Elements that are global within a maplet are represented as single values within the header. Elements that are changing slowly within a maplet are elements that change slowly as the vehicle 5 traverses the segment of the vehicle's trajectory corresponding to the maplet. Elements that are changing slowly within the maplet are represented as time ordered lists of values, where each value in a list is associated with a timestamp indicating when it becomes the currently valid value.

FIG. 10 provides an example header data format 1010, according to an example embodiment. For example, the header data format 1010 comprises a Sensor Data Request Interface (SDRI) format identifier (ID) field, the value of which identifies the maplet request to which the maplet was generated in response. In an example embodiment, each maplet request has a unique SDRI ID configured for use in identifying the maplet request. For example, the header data format 1010 comprises a compression factor field, the value of which describes the lossiness of the compression used to compress the maplet before the vehicle apparatus 20 provides the maplet. For example, the header data format 1010 comprises a coordinated universal time (UTC) time offset field, the value of which is the offset between the average nominal relative time of the on-vehicle sensors' 29 clocks and UTC. In various embodiments, the value of the UTC time offset should be accurate to one millisecond or better to allow precise correlation between vehicle 5 systems (e.g., including the vehicle apparatus 20) and external systems, such as traffic light networks or external performance validation systems. For example, the header data format 1010 comprises trajectory type and observation class flag fields. For example, the header data format 1010 may comprise a pose point flag field, GNSS point flag field, sign face flag field, road surface marking flag field, pole-like object flag field, construction marker flag field, traffic signal flag field, lane marking flag field, driving surface edge flag field, road side barrier flag field, and/or the like. When the value of a trajectory type or observation class flag field is set to true, the maplet comprises a portion corresponding to that trajectory type or observation class. When the value of a trajectory type or observation class flag field is set to false, the maplet does not comprise a portion corresponding to that trajectory type or observation class. For example, if the pose point flag field value is set to true and the GNSS point flag field is set to false, the corresponding maplet includes a portion providing trajectory road information/data in the form of pose points but does not include a portion providing trajectory road information/data in the form of GNSS points.

In an example embodiment, the header data format 1010 comprises one or more fields corresponding to positions and/or locations provided by the maplet. For example, the header format 1010 comprises one or more fields providing information regarding a coordinate system used by the vehicle apparatus 20 to provide positions and/or locations, standard deviations relevant to one or more positions and/or locations, and/or the like. For example, the header data format 1010 comprises a position type field. The value of the position type field indicates the coordinate system used to provide the coordinates of the pose points. For example, the coordinates of the pose points may be provided in earth-centered earth-fixed (ECEF) coordinates, geodetic coordinates, vehicle centered system (VCS), and/or other coordinate system. For example, the header data format 1010 comprises a GNSS antennae to VCS offset field, the value of which is a three dimensional vector originating at the antennae of the GNSS sensor (of the sensors 29) and ending at the center/origin of the VCS coordinate system. For example, the header data format 1010 comprises a pose point standard deviation field, the value of which indicates the standard deviation for the pose point coordinates relative to the VSC coordinate system under conditions assuming good GNSS performance. For example, the pose point standard deviation field may comprise a vector/array comprising standard deviations for longitudinal (x), lateral (y), and vertical (z) pose point coordinates relative to the VSC coordinate system under conditions assuming good GNSS performance. In an example embodiment, the pose point standard deviations provided in the pose point standard deviation field are OEM certified, nominal standard deviations for the pose point coordinates. For example, the header data format 1010 comprises a GNSS standard deviation field, the value of which indicates the standard deviations for the [X, Y, Z] coordinates of the GNSS sensor (of the sensors 29; e.g., in meters) relative to a planimetric mapping coordinate system, such as Geodetic or local Cartesian mapping coordinate systems. For example, the positive X direction may be east, the positive Y direction may be north, and the positive Z direction may be up. In an example embodiment, the GNSS standard deviations provided in the GNSS standard deviation field are OEM certified, nominal standard deviations for the GNSS sensor.

For example, the header data format 1010 comprises a lane marking standard deviation field, the value which is an array and/or list of the standard deviations of the longitudinal (x), lateral (y), and vertical (z) lane markings sample points relative to the VCS coordinate system. In an example embodiment, the lane marking standard deviations provided in the lane marking standard deviation field are OEM certified, nominal standard deviations for the lane marking sample points for the sensor configuration of the vehicle 5 and/or vehicle apparatus 20. For example, the data header format 1010 comprises a driving surface edge standard deviation field, the value of which is an array and/or list of the standard deviations of the longitudinal (x), lateral (y), and vertical (z) driving surface sample points relative to the VCS coordinate system. In an example embodiment, the driving surface edge standard deviations provided in the driving surface edge standard deviation field are OEM certified, nominal standard deviations for the driving surface edge sample points for the sensor configuration of the vehicle 5 and/or vehicle apparatus 20. For example, the data header format 1010 comprises a roadside barrier standard deviation field, the value which is an array and/or list of the standard deviations of the longitudinal (x), lateral (y), and vertical (z) roadside barrier sample points relative to the VCS coordinate system. In an example embodiment, the roadside barrier standard deviations provided in the roadside barrier standard deviation field are OEM certified, nominal standard deviations for the roadside barrier sample points for the sensor configuration of the vehicle 5 and/or vehicle apparatus 20. For example, the header data format 1010 comprises a pose point drift rates field, the values of which provide the drift rates of the pose points in the longitudinal (x), lateral (y), and vertical (z) coordinates relative to the VCS coordinate system when GNSS information/data is not available as part of the pose point fusion processing. The pose point drift rates indicate the rate of increase in the respective standard deviations of the vehicle's 5 position over time. In an example embodiment, the pose point drift rates provided in the pose points drift rates field are OEM certified, nominal drift rates for the pose points for the sensor configuration of the vehicle 5 and/or vehicle apparatus 20.

In various embodiments, the header data format 1010 comprises one or more fields regarding orientations provided by the maplet. For example, the header data format 1010 comprises an orientation type field, the value of which indicates if the rotation of the VCS coordinate system to its associated local coordinate system (LCS) system is given as Euler angles or quaternions. For example, the header data format 1010 comprises an Euler rotation type field. If the vehicle rotation angles are given as Euler angles, the value of the Euler rotation type field indicates if the rotations are to be applied in an intrinsic or extrinsic manner. As should be understood, intrinsic rotations are elemental rotations that occur about the axes of a coordinate system attached to a moving body (e.g., the VCS system coordinates attached to the vehicle 5) and extrinsic rotations are elemental rotations that occur about the axes of a fixed coordinate system (e.g., the coordinates of the LCS system). For example, the header data format 1010 comprises an Euler rotation order field. If vehicle rotation angles are given as Euler angles, the value of the Euler rotation order field indicates one of twelve possible orders of rotation for Euler angles. For example, the header data format 1010 comprises a quaternion order field. If vehicle rotation angles are given as Euler angles, the value of the quaternion order field indicates which of two conventions are used for the order of the quaternions.

Various embodiments may use various fields of the header data format 1010 and/or various other fields. In an example embodiment, the header data format 1010 only comprises fields relevant to the corresponding maplet. For example, FIG. 10A provides an example maplet 1020 that only comprises pose points road information/data and roadside barrier road information/data. Thus, the header 1025 only comprises fields that are relevant to the pose points road information/data and the roadside barrier road information/data. For example, the header 1025 does not comprise a sign faces flag field and the omission thereof indicates that the value of the sign faces flag field is false. Thus, the size of the maplet 1020 may be minimized for efficient transmission of the maplet via the network 50 (e.g., proprietary network 50A).

Exemplary Pose Points Portion

In various embodiments, a maplet may comprise a pose points portion. The pose points portion is configured to provide trajectory road information/data in the form of pose points. In various embodiments, a pose point defines the position and orientation of the vehicle 5 at a given instant in time. Pose point coordinates are provided as either ECEF coordinates or geodetic coordinates with a height above ellipsoid, but not both, in various embodiments. In various embodiments, pose point orientations are provided either as Euler angles or quaternions, as specified in the header of the maplet, but not both. By not including duplicate road information/data (e.g., coordinates in two different coordinate systems or orientations in two different coordinate systems), the small size of the maplet is maintained. In various embodiments, pose points are collected every pose point distance and/or every pose point time. In an example embodiment, the pose point distance is one meter. In an example embodiment, the post point time is every second. In an example embodiment, the pose points are collected every point distance and/or every pose point time, which ever will result in a denser (e.g., more pose points) instantaneous collection rate. In an example embodiment, the relative positional accuracy of spatially separated pose points within a single drive session is 40 cm, per 100 meters of travel, or better, under all conditions, in an example embodiment. In various embodiments, pose point information/data shall not be processed in any manner that attempts to reposition the pose point information/data to match with existing maps or road features such as road lane markings, and/or the like. For example, pose points should not be map matched.

FIG. 11A shows an example portion of road network 1102 and a plurality of pose points 1104 indicating the travel of the vehicle 5 along the portion of the road network 1102. FIG. 11B shows an example pose point portion 1110 of a maplet corresponding to the pose points 1104. In an example embodiment, the data format of the pose point portion 1110 is a predefined and/or predetermined standardized format. The pose point portion 1110 comprises a timestamp field. For example, the predefined and/or predetermined standardized format corresponding to pose points may comprise a timestamp field. The timestamp field comprises a list of timestamps (e.g., t1, . . . tn) each corresponding to the time when a corresponding pose point was captured, determined, and/or the like. The pose point portion 1110 comprises a pose point ECEF field. For example, the predefined and/or predetermined standardized format corresponding to pose points may comprise a pose point ECEF field. In this example, the position of the pose points are provided in ECEF coordinates. Thus, the pose point ECEF field comprises a list of three dimensional pose point positions in the ECEF coordinate system indicating the position and/or location of the vehicle at each of the pose points 1104 and/or timestamps (e.g., (x1, y1, z1), . . . (xn, yn, zn)). The pose point portion 1110 may further comprise a pose point geodetic field and a pose point elevation field. For example, the predefined and/or predetermined standardized format corresponding to pose points may comprise a pose point geodetic field and a pose point elevation field. In a scenario where the pose points are provided in a geodetic coordinate system along with an elevation, the pose point geodetic field would comprise a list of two dimensional pose point positions in a geodetic coordinate system and the pose point elevation field would include a list of the pose points' heights above the WGS84 (G1762) ellipsoid. In an example embodiment, the pose point portion 1110 comprises a vehicle orientation Euler field. For example, the predefined and/or predetermined standardized format corresponding to pose points may comprise a vehicle orientation Euler field. In this example, the position of the vehicle orientations are provided in Euler angles. Thus, the vehicle orientation Euler field comprises a list of vehicle orientations in Euler angles corresponding to the orientation of the vehicle 5 at each of the pose points 1104 and/or timestamps (e.g., O1, . . . On). The pose point portion 1110 may further comprise a vehicle orientation quaternion field. For example, the predefined and/or predetermined standardized format corresponding to pose points may comprise a vehicle orientation quaternion field. In a scenario where the vehicle orientation are provided in quaternions, the vehicle orientation quaternion field would comprise a list of quaternions indicating the orientation of the vehicle 5 at each of the pose points 1104 and/or timestamps.

In an example embodiment, if the pose points are provided in ECEF coordinates, the pose point geodetic and elevation fields may be omitted from the maplet to reduce the size of the maplet. Similarly, in an example embodiment, if the pose points are provided in geodetic coordinates with an elevation, the pose point ECEF field may be omitted from the maplet to reduce the size of the maplet. In a similar vein, in an example embodiment, if the vehicle orientations are provided in Euler angles, the vehicle orientation quaternion field may be omitted from the maplet to reduce the size of the maplet. In an example embodiment, if the vehicle orientations are provided in quaternions, the vehicle orientation Euler field may be omitted from the maplet to reduce the size of the maplet. In various embodiments, the predefined and/or predetermined standardized format corresponding to pose points may comprise various variations and/or additions to the fields shown in FIG. 11B.

Exemplary GNSS Points Portion

In various embodiments, a maplet may comprise a GNSS points portion. The GNSS points portion is configured to provide trajectory road information/data in the form of GNSS points. In an example embodiment, GNSS points are coordinate readings from a GNSS sensor (of the sensors 29) onboard the vehicle 5. In an example embodiment, GNSS points are coordinate readings from the highest accuracy (e.g., at the GNSS sensor's native frequency) onboard the vehicle 5. In an example embodiment, GNSS point coordinates are provided in either ECEF coordinates or geodetic coordinates with a height above ellipsoid, but not both. In an example embodiment, the accuracy requirements for individual GNSS points assume position (3D) dilution of precision (PDOP) is four or less, the satellite constellation is four or more, and/or multipath is absent. In an example embodiment, the GNSS ECEF coordinates are defined relative to the International Terrestrial Reference Frame (e.g., ITRF2014).

FIG. 12A shows an example portion of road network 1202 and a plurality of GNSS points 1204 indicating the travel of the vehicle 5 along the portion of the road network 1202. FIG. 12B shows an example GNSS point portion 1210 of a maplet corresponding to the GNSS points 1204. In an example embodiment, the data format of the GNSS point portion 1210 is a predefined and/or predetermined standardized format. The GNSS point portion 1210 comprises a timestamp field. For example, the predefined and/or predetermined standardized format corresponding to GNSS points may comprise a timestamp field. The timestamp field comprises a list of timestamps (e.g., t1, . . . tn) each corresponding to the time when a corresponding GNSS point was captured, determined, and/or the like. The GNSS point portion 1210 comprises a GNSS point ECEF field. For example, the predefined and/or predetermined standardized format corresponding to GNSS points may comprise a GNSS point ECEF field. In this example, the position of the GNSS points are provided in ECEF coordinates. Thus, the GNSS point ECEF field comprises a list of three dimensional GNSS point positions in the ECEF coordinate system indicating the position and/or location of the vehicle at each of the GNSS points 1204 and/or timestamps (e.g., (x1, y1, z1), . . . (xn, yn, zn)). The GNSS point portion 1210 may further comprise a GNSS point geodetic field and a GNSS point elevation field. For example, the predefined and/or predetermined standardized format corresponding to GNSS points may comprise a GNSS point geodetic field and a GNSS point elevation field. In a scenario where the GNSS points are provided in a geodetic coordinate system along with an elevation, the GNSS point geodetic field would comprise a list of two dimensional GNSS point positions in a geodetic coordinate system and the GNSS point elevation field would include a list of the GNSS points' heights above the WGS84 (G1762) ellipsoid. In an example embodiment, the GNSS point portion 1210 comprises a PDOP field, constellation count field, mask angle field, Receiver Independent Exchange Format (RINEX) field, and/or the like. For example, the predefined and/or predetermined standardized format corresponding to GNSS points may comprise a PDOP field, constellation count field, mask angle field, Receiver Independent Exchange Format (RINEX) field, and/or the like. The PDOP field comprises a list of PDOP values corresponding to the GNSS measurements that provided each of the GNSS point positions (e.g., P1, . . . Pn). The constellation count field comprises a list of the number of GNSS satellites in the constellation used to determine the GNSS points positions at each GNSS point 1204 (e.g., C1, . . . Cn). The mask angle field comprises the angle limit under which satellites in the constellation are ignored in the determining the GNSS point position. In an example embodiment, the mask angle field may comprise a single angle that corresponds to all of the GNSS pose point position determinations. In an example embodiment, the mask angle field may comprise a list of angles with each angle corresponding to the determination of a corresponding GNSS pose point position. RINEX is a data interchange format for raw global satellite navigation system data. In an example embodiment, the RINEX field may comprise a string indicating the data interchange format corresponding to the GNSS points.

In an example embodiment, if the GNSS points are provided in ECEF coordinates, the GNSS point geodetic and elevation fields may be omitted from the maplet to reduce the size of the maplet. Similarly, in an example embodiment, if the GNSS points are provided in geodetic coordinates with an elevation, the GNSS point ECEF field may be omitted from the maplet to reduce the size of the maplet. In various embodiments, the predefined and/or predetermined standardized format corresponding to GNSS points may comprise various variations and/or additions to the fields shown in FIG. 12B.

Exemplary Sign Face Portion

In various embodiments, a maplet may comprise a sign face portion. For example, if a vehicle apparatus 20 identifies one or more observations in a multi-sensor data stream that are associated with the observation class of sign face, road information/data corresponding to the one or more observations may be provided as one or more sign face portions of a maplet. For example, in one embodiment, a maplet comprises a sign face portion for each of the one or more identified observations that are associated with the observation class sign face. In an example embodiment, a maplet comprises one sign face portion that includes road information/data for each of the one or more observations identified in the multi-sensor data stream and associated with the sign face observation class. In various embodiments, sign faces are sign features above the roadway surface, including signs mounted on posts or poles on either side of the road, as well as rectangular sign boards mounted on scaffolding above the road's surface.

FIG. 13A shows a front view of an example sign face 1302 and FIG. 13C shows a top view of the example sign face 1302, which happens to be stop sign. As should be understood, the observations associated with the observation class sign face may be stop signs, yield signs, speed limit signs, informational signs, exit signs, road name signs, and/or faces of other types of signs. The example sign face 1302 has a center point 1304, a height H, and a width W. The front surface 1306 of the example sign face 1302 has a normal vector 1308 that is at an angle α with respect to a reference direction 1320 (e.g., North).

FIG. 13B provides an example sign face portion 1310 of a maplet corresponding to the example sign face 1302. In an example embodiment, the data format of the sign face portion 1310 is a predefined and/or predetermined standardized format. The sign face portion 1310 may comprise a sign id field. For example, the predefined and/or predetermined, standardized format corresponding to the observation class sign face may comprise a sign id field. In an example embodiment, the value of the sign id field is a unique identifier for the real world sign. In an example embodiment, the sign id is used in case any single real world sign has multiple observations accidently returned. For example, the sign id may uniquely identify the real world sign within the road network and/or digital map. For example, the sign face portion 1310 may comprise a sign center point field. For example, the predefined and/or predetermined, standardized format corresponding to the observation class sign face may comprise a sign center point field. In an example embodiment, the value of the sign center point field is three dimensional vector providing the position of the center point 1304. For example, the sign face portion 1310 may comprise a sign type field. For example, the predefined and/or predetermined, standardized format corresponding to the observation class sign face may comprise a sign type field. In an example embodiment, the value of the sign type field is a type corresponding to the sign face. For example, in the illustrated embodiment, the type corresponding to the sign face 1302 is stop sign. Various sign types may be defined in various embodiments. In an example embodiment, the sign face portion 1310 may comprise a timestamp field. For example, the predefined and/or predetermined, standardized format corresponding to the observation class sign face may comprise a timestamp field. For example, the value of the timestamp field may be the timestamp (e.g., ts) of the sensor capture event whose body frame coordinate system instance is used to reference the sign's spatial coordinate(s). For example, the value of the timestamp field may be the timestamp of the sensor capture event whose body frame coordinate system instance was used to determine the coordinates of the center point 1304. In an example embodiment, the sign face portion 1310 may comprise an orientation field. For example, the predefined and/or predetermined, standardized format corresponding to the observation class sign face may comprise an orientation field. For example, the value of the orientation field may be the angle (e.g., a) between a normal vector 1308 of the front surface 1306 of the sign face 1302 and a reference direction 1320.

In an example embodiment, the sign face portion 1310 may comprise a height field, width field, and/or other field configured to describe the size of the sign face. For example, the predefined and/or predetermined, standardized format corresponding to the observation class sign face may comprise a height field, width field, and/or other field configured to describe the size of the sign face. For example, the value of the height field may be the height H of the sign face and the value of the width field may be the width W of the sign face. In an example embodiment, the sign face portion 1310 may comprise a shape field, color field, and/or other field configured to describe the appearance of the sign face. For example, the predefined and/or predetermined, standardized format corresponding to the observation class sign face may comprise a shape field, color field, and/or other field configured to describe the appearance of the sign face. For example, the value of the shape field may describe the shape of the sign face (e.g., square, rectangle, triangle, circle, octagon, and/or the like). For example, the value of the color field may describe the background color and/or a dominant color of the sign face. In various embodiments, the predefined and/or predetermined standardized format corresponding to the observation class sign face may comprise various variations and/or additions to the fields shown in FIG. 13B.

Exemplary Road Marking Portion

In various embodiments, a maplet may comprise a road marking portion. For example, if a vehicle apparatus 20 identifies one or more observations in a multi-sensor data stream that are associated with the observation class of road marking, road information/data corresponding to the one or more observations may be provided as one or more road marking portions of a maplet. For example, in one embodiment, a maplet comprises a road marking portion for each of the one or more identified observations that are associated with the observation class road marking. In an example embodiment, a maplet comprises one road marking portion that includes road information/data for each of the one or more observations identified in the multi-sensor data stream and associated with the road marking observation class. In various embodiments, road markings are signs and other markings that are painted on to the surface of a road. Road markings could include left, right, and forward arrows, stopping bars, cross walk bars, and/or the like. Road markings are typically white but may come in various colors.

FIG. 14A illustrates an example road marking 1402 on a road surface 1400. The road marking 1402 is a right turn arrow that is bounded by bounding polygon 1404. In the example illustrated embodiment, the bounding polygon 1404 is a bounding rectangle. The bounding polygon 1404 is defined by two dimensional vertex points (x1, y1), (x2, y2), (x3, y3), and (x4, y4) on the road surface 1400.

FIG. 14B provides an example road marking portion 1410 of a maplet corresponding to the example road marking 1402. In an example embodiment, the data format of the road marking portion 1410 is a predefined and/or predetermined standardized format. The road marking portion 1410 may comprise a road marking id field. For example, the predefined and/or predetermined, standardized format corresponding to the observation class road marking may comprise a road marking id field. In an example embodiment, the value of the road marking id field is a unique identifier for the real world road marking. In an example embodiment, the road marking id is used in case any single real world road marking has multiple observations accidently returned. For example, the road marking id may uniquely identify the real world road marking within the road network and/or digital map. In an example embodiment, the road marking portion 1410 may comprise a timestamp field. For example, the predefined and/or predetermined, standardized format corresponding to the observation class road marking may comprise a timestamp field. For example, the value of the timestamp field may be the timestamp (e.g., ts) of the sensor capture event whose body frame coordinate system instance is used to reference the road marking's spatial coordinate(s). For example, the value of the timestamp field may be the timestamp of the sensor capture event whose body frame coordinate system instance was used to determine the coordinates of the vertex points defining the bounding polygon 1404. In an example embodiment, the road marking portion 1410 may comprise a bounding polygon field. For example, the predefined and/or predetermined, standardized format corresponding to the observation class road marking may comprise a bounding polygon field. For example, the value of the bounding polygon field may be vertex points (e.g., (x1, y1), (x2, y2), (x3, y3), (x4, y4)) that indicate the location of the vertices of a polygon that bounds the road marking 1402. In an example embodiment, the bounding polygon is rectangle. In an example embodiment, the bounding polygon 1404 is large enough to bound (e.g., contain) the entire road marking 1402. In an example embodiment, the bounding polygon 1404 is the smallest polygon of a particular order (e.g., number of vertices and/or sides) that bounds the road marking 1402. In various embodiments, the vertex points may be provided as two or three dimensional points. In an example embodiment, the road marking portion 1410 may comprise a covariance matrix field. For example, the predefined and/or predetermined, standardized format corresponding to the observation class road marking may comprise a covariance matrix field. For example, the value of the covariance matrix field may be a covariance matrix for the coordinates of the vertex points defining the bounding polygon 1404. A covariance matrix corresponding to the vertex points is a matrix whose element in the i,j position is the covariance between the i-th and j-th elements of the coordinates of a vertex point. In an example embodiment, the covariance matrix is a three by three matrix. For example, the road marking portion 1410 may comprise a road marking type field. For example, the predefined and/or predetermined, standardized format corresponding to the observation class road marking may comprise a road marking type field. In an example embodiment, the value of the road marking type field is a type corresponding to the road marking. For example, in the illustrated embodiment, the type corresponding to the road marking 1402 is right turn arrow. Various sign types may be defined in various embodiments (e.g., right turn arrow, left turn arrow, stop line, forward arrow, cross walk, and/or the like). In an example embodiment, the road marking portion 1410 may comprise a color field. For example, the predefined and/or predetermined, standardized format corresponding to the observation class road marking may comprise a color field. For example, the value of the color field may describe the dominant color of the road marking. In various embodiments, the predefined and/or predetermined standardized format corresponding to the observation class road marking may comprise various variations and/or additions to the fields shown in FIG. 14B.

Exemplary Pole-Like Object Portion

In various embodiments, a maplet may comprise a pole-like object portion. For example, if a vehicle apparatus 20 identifies one or more observations in a multi-sensor data stream that are associated with the observation class of pole-like object, road information/data corresponding to the one or more observations may be provided as one or more pole-like object portions of a maplet. For example, in one embodiment, a maplet comprises a pole-like object portion for each of the one or more identified observations that are associated with the observation class pole-like objects. In an example embodiment, a maplet comprises one pole-like object portion that includes road information/data for each of the one or more observations identified in the multi-sensor data stream and associated with the pole-like object observation class. In various embodiments, pole-like objects are features or objects that are pole-like, such as posts used to mount roadside signs, street light poles, utility poles, poles used to mount traffic lights, and/or the like. In various embodiments, a pole-like object has a height that is equal to or greater than a predefined minimum height. In an example embodiment, the predefined minimum height is 50 cm. In various embodiments, a pole-like object is spatially separated by at least a minimum separation distance from other pole-like objects. In an example embodiment, the minimum separation distance is 50 cm. In an example embodiment, a pole-like object portion of a maplet comprises two or more reference points for a pole-like object, each with a corresponding diameter. In an example embodiment, a pole-like object portion of a maplet may comprise only one reference point for the pole-like object and a corresponding diameter. In various embodiments, pole-like objects have a diameter that is equal to or greater than a diameter threshold. Various pole-like objects may have reflectors and/or reflective dots mounted thereon. In various embodiments, narrow pole-like objects (e.g., pole-like objects that have diameters less than a threshold diameter of a pole-like object) may have one or more reflectors and/or reflective dots mounted thereon. The narrow pole-like object may then be reported as to the attributes thereof that are associated with the reflective function of the reflectors and/or reflective dots mounted on the narrow pole-like object.

FIG. 15A illustrates an example pole-like object 1502 along a road 1500. The pole-like object 1502 is a street lamp pole having upper point 1504 and lower point 1506. A reflector 1508 is mounted to the pole-like object 1502.

FIG. 15B provides an example pole-like object portion 1510 of a maplet corresponding to the example pole-like object 1502. In an example embodiment, the data format of the pole-like object portion 1510 is a predefined and/or predetermined standardized format. The pole-like object portion 1510 may comprise a pole-like object id (PLO ID) field. For example, the predefined and/or predetermined, standardized format corresponding to the observation class pole-like object may comprise a PLO ID field. In an example embodiment, the value of the PLO ID field is a unique identifier for the real world pole-like object. In an example embodiment, the PLO ID is used in case any single real world pole-like object has multiple observations accidently returned. For example, the PLO ID may uniquely identify the real world pole-like object within the road network and/or digital map. In an example embodiment, the pole-like object portion 1510 may comprise a timestamp field. For example, the predefined and/or predetermined, standardized format corresponding to the observation class pole-like object may comprise a timestamp field. For example, the value of the timestamp field may be the timestamp (e.g., ts) of the sensor capture event whose body frame coordinate system instance is used to reference the pole-like object's spatial coordinate(s). For example, the value of the timestamp field may be the timestamp of the sensor capture event whose body frame coordinate system instance was used to determine the coordinates of the upper point 1504 and the diameter of the pole-like object 1502 at the upper point 1504, lower point 1506 and the diameter of the pole-like object 1502 at the lower point 1506, and reflector coordinates for reflector 1508. In an example embodiment, the pole-like object portion 1510 may comprise an upper point field and an upper diameter field. For example, the predefined and/or predetermined, standardized format corresponding to the observation class pole-like object may comprise an upper point field and an upper diameter field. For example, the value of the upper point field may be the coordinates of the upper point 1504 which is a point located at or near the top of the pole-like object 1502 (e.g., upper point 1504). For example, the upper point 1504 may be a point located at the top of a portion of the pole-like object that is within the field of view of the sensors 29. The value of the upper diameter field may be an estimate of the diameter of the pole-like object at the upper point and/or the diameter of a bounding circle at the upper point 1504. For example, a bounding circle may be the smallest circle that bounds and/or encompasses the entire pole-like object at a particular point along the pole-like object. For example, the vehicle apparatus 20 may estimate the diameter of a bounding circle for the pole-like object at the upper point based on the observation. In an example embodiment, the pole-like object portion 1510 may comprise a lower point field and a lower diameter field. For example, the predefined and/or predetermined, standardized format corresponding to the observation class pole-like object may comprise a lower point field and a lower diameter field. For example, the value of the lower point field may be the coordinates of the lower point 1506 which is a point located at or near the bottom of the pole-like object 1502 (e.g., lower point 1506). For example, the lower point 1506 may be a point located at the bottom of a portion of the pole-like object that is within the field of view of the sensors 29. The value of the lower diameter field may be an estimate of the diameter of the pole-like object at the lower point and/or the diameter of a bounding circle that bounds the pole-like object about the lower point 1506. For example, the vehicle apparatus 20 may estimate the diameter of a bounding circle for the pole-like object at the lower point based on the observation. In an example embodiment, the pole-like object portion 1510 may comprise a covariance matrix field. For example, the predefined and/or predetermined, standardized format corresponding to the observation class pole-like object may comprise a covariance matrix field. For example, the value of the covariance matrix field may be a covariance matrix for the coordinates of the upper and lower points 1504, 1506. A covariance matrix corresponding to the coordinates of the upper and lower points 1504, 1506 is a matrix whose element in the i,j position is the covariance between the i-th and j-th elements of the coordinates of the upper or lower point 1504, 1506. In an example embodiment, the covariance matrix is a three by three matrix. In an example embodiment, the pole-like object portion 1510 may comprise a diameter accuracy field. For example, the predefined and/or predetermined, standardized format corresponding to the observation class pole-like object may comprise a diameter accuracy field. For example, the value of the diameter accuracy field may be an estimated accuracy of the upper and lower diameters provided in the upper and lower diameter fields. In an example embodiment, the pole-like object portion 1510 may comprise a color field. For example, the predefined and/or predetermined, standardized format corresponding to the observation class pole-like object may comprise a color field. For example, the value of the color field may describe the dominant color of the pole-like object.

In various embodiments, the pole-like object portion 1510 may comprise one or more fields relating to reflectors and/or reflective dots mounted to the pole-like object. For example, the pole-like object portion 1510 may comprise a reflectivity field. For example, the predefined and/or predetermined, standardized format corresponding to the observation class pole-like object may comprise a reflectivity field. For example, the value of the reflectivity field may provide a reflectivity of the pole-like object (e.g., a measure of how reflective and/or the reflectance of the pole-like object). For example, the pole-like object portion 1510 may comprise a reflector coordinates field. For example, the predefined and/or predetermined, standardized format corresponding to the observation class pole-like object may comprise a reflector coordinates field. For example, the value of the reflector coordinates field may be a list of the coordinates of any reflectors 1508 mounted to the pole-like object. In an example embodiment, the pole-like object portion 1510 may comprise a reflector covariance matrix field. For example, the predefined and/or predetermined, standardized format corresponding to the observation class pole-like object may comprise a reflector covariance matrix field. For example, the value of the reflector covariance matrix field may be a covariance matrix for the coordinates reflectors 1508 mounted to the pole-like object 1502. A reflector covariance matrix corresponding to the coordinates of the reflectors 1508 mounted to the pole-like object is a matrix whose element in the i,j position is the covariance between the i-th and j-th elements of the coordinates of the position of a reflector mounted to the pole-like object. In an example embodiment, the covariance matrix is a three by three matrix. In various embodiments, the predefined and/or predetermined standardized format corresponding to the observation class pole-like object may comprise various variations and/or additions to the fields shown in FIG. 15B.

Exemplary Construction Marker Portion

In various embodiments, a maplet may comprise a construction marker portion. For example, if a vehicle apparatus 20 identifies one or more observations in a multi-sensor data stream that are associated with the observation class of construction marker, road information/data corresponding to the one or more observations may be provided as one or more construction marker portions of a maplet. For example, in one embodiment, a maplet comprises a construction marker portion for each of the one or more observations that are associated with the observation class construction marker. In an example embodiment, a maplet comprises one construction marker portion that includes road information/data for each of the one or more observations identified in the multi-sensor data stream and associated with the construction marker observation class. In various embodiments, construction marker are features such as cones, barrels, delineators, and/or the like.

FIG. 16A illustrates an example construction marker 1602 located along a road 1600. The construction marker 1604 has an anchor point. An anchor point is a point located at the middle of the top of the construction marker. For example, for a cone, the anchor point is the topmost point of the cone and for a barrel the anchor point is the middle of the top of the barrel.

FIG. 16B provides an example construction marker portion 1610 of a maplet corresponding to the example construction object 1602. In an example embodiment, the data format of the construction marker portion 1610 is a predefined and/or predetermined standardized format. The construction marker portion 1610 may comprise a construction marker id field. For example, the predefined and/or predetermined, standardized format corresponding to the observation class construction marker may comprise a construction marker id field. In an example embodiment, the value of the construction marker id field is a unique identifier for the real world construction marker. In an example embodiment, the construction marker id is used in case any single real world construction marker has multiple observations accidently returned. For example, the construction marker id may uniquely identify the real world construction marker within the road network and/or digital map. In an example embodiment, the construction marker portion 1610 may comprise a timestamp field. For example, the predefined and/or predetermined, standardized format corresponding to the observation class construction marker may comprise a timestamp field. For example, the value of the timestamp field may be the timestamp (e.g., ts) of the sensor capture event whose body frame coordinate system instance is used to reference the construction marker's spatial coordinate(s). For example, the value of the timestamp field may be the timestamp of the sensor capture event whose body frame coordinate system instance was used to determine the coordinates of the anchor point 1604. In an example embodiment, the construction marker portion 1610 may comprise an anchor point field. For example, the predefined and/or predetermined, standardized format corresponding to the observation class construction marker may comprise an anchor point field. For example, the value of the anchor point field may be the coordinates of the anchor point 1604. In an example embodiment, the construction marker portion 1610 may comprise a covariance matrix field. For example, the predefined and/or predetermined, standardized format corresponding to the observation class construction marker may comprise a covariance matrix field. For example, the value of the covariance matrix field may be a covariance matrix for the coordinates of the anchor point 1604. A covariance matrix corresponding to the coordinates of the anchor point 1604 is a matrix whose element in the i,j position is the covariance between the i-th and j-th elements of the coordinates of the anchor point 1604. In an example embodiment, the construction marker portion 1610 may comprise a color field. For example, the predefined and/or predetermined, standardized format corresponding to the observation class construction marker may comprise a color field. For example, the value of the color field may describe the dominant color of the construction marker. In an example embodiment, the construction marker portion 1610 may comprise a type field. For example, the predefined and/or predetermined, standardized format corresponding to the observation class construction marker may comprise a type field. For example, the value of the type field may the type (e.g., cone, barrel, delineator, and/or the like) of the construction marker. In various embodiments, the predefined and/or predetermined standardized format corresponding to the observation class construction marker may comprise various variations and/or additions to the fields shown in FIG. 16B.

Exemplary Traffic Signal Portion

In various embodiments, a maplet may comprise a traffic signal portion. For example, if a vehicle apparatus 20 identifies one or more observations in a multi-sensor data stream that are associated with the observation class of traffic signal, road information/data corresponding to the one or more observations may be provided as one or more traffic signal portions of a maplet. For example, in one embodiment, a maplet comprises a traffic signal portion for each of the one or more identified observations that are associated with the observation class traffic signal. In an example embodiment, a maplet comprises one traffic signal portion that includes road information/data for each of the one or more observations identified in the observation and associated with the traffic signal observation class. In various embodiments, traffic signals are physical, real world objects associated with the road network and containing signal lights. The lights may be arranged vertically, horizontally, or in mixed configurations. Traffic signals control the stop-and-go motions of vehicles. In an example embodiment, Tram Signals; Lane Status Signals for tunnels, toll structures, and/or the like; Pedestrian Signals for walking, bicycles, and/or the like are not considered traffic signals.

FIG. 17A illustrates an example traffic signal 1702. The traffic signal 1702 is bounded by bounding polygon 1704. For example, the bounding polygon 1704 is a bounding rectangle. In an example embodiment, the bounding polygon 1704 is large enough to bound (e.g., contain) the entire traffic signal 1702. In an example embodiment, the bounding polygon 14704 is the smallest polygon of a particular order (e.g., number of vertices and/or sides) that bounds the traffic signal 1702. FIG. 17A shows the bounding polygon 1704 being slightly larger than the traffic signal 1702 for clarity. In various embodiments, the bounding polygon 1704 is a two dimensional polygon defined in the same plane as the face 1706 of the traffic signal 1702. The bounding polygon 1704 is defined by vertex points (x1, y1, z1), (x2, y2, z2), (x3, y3, z3), and (x4, y4, z4) located at the vertices of the bounding polygon.

FIG. 17B provides an example traffic signal portion 1710 of a maplet corresponding to the example traffic signal 1702. In an example embodiment, the data format of the traffic signal portion 1710 is a predefined and/or predetermined standardized format. The traffic signal portion 1710 may comprise a traffic signal id field. For example, the predefined and/or predetermined, standardized format corresponding to the observation class traffic signal may comprise a traffic signal id field. In an example embodiment, the value of the traffic signal id field is a unique identifier for the real world traffic signal. In an example embodiment, the traffic signal id is used in case any single real world traffic signal has multiple observations accidently returned. For example, in general a maplet should only contain one maplet portion and/or road information/data for one instance of observing a real world object. For example, the traffic signal id may uniquely identify the real world traffic signal within the road network and/or digital map. In an example embodiment, the traffic signal portion 1710 may comprise a timestamp field. For example, the predefined and/or predetermined, standardized format corresponding to the observation class traffic signal may comprise a timestamp field. For example, the value of the timestamp field (e.g., ts) may be the timestamp of the sensor capture event whose body frame coordinate system instance was used to determine the coordinates of the vertex points defining the bounding polygon 1704. In an example embodiment, the traffic signal portion 1710 may comprise a bounding polygon field. For example, the predefined and/or predetermined, standardized format corresponding to the observation class traffic signal may comprise a bounding polygon field. For example, the value of the bounding polygon field may be vertex points (e.g., (x1, y1, z1), (x2, y2, z2), (x3, y3, z3), (x4, y4, z4)) that indicate the location of the vertices of a polygon that bounds the traffic signal 1702. In an example embodiment, the bounding polygon is rectangle (e.g., a regular polygon of order four). In various embodiments, the vertex points may be provided as two or three dimensional points. In an example embodiment, the traffic signal portion 1710 may comprise a covariance matrix field. For example, the predefined and/or predetermined, standardized format corresponding to the observation class traffic signal may comprise a covariance matrix field. For example, the value of the covariance matrix field may be a covariance matrix for the coordinates of the vertex points defining the bounding polygon 1704. A covariance matrix corresponding to the vertex points is a matrix whose element in the i,j position is the covariance between the i-th and j-th elements of the coordinates of a vertex point. In an example embodiment, the covariance matrix is a three by three matrix.

The traffic signal portion 1710 may comprise a horizontal tier count field and/or a vertical tier count field. For example, the predefined and/or predetermined, standardized format corresponding to the observation class traffic signal may comprise a horizontal tier count field and/or a vertical tier count field. In an example embodiment, the value of the horizontal tier count field is the number of tiers of lights (e.g. the number of columns of lights) for horizontally oriented lights. In an example embodiment, the value of the vertical tier count field is the number of tiers of lights (e.g., the number of rows of lights) for vertically oriented lights. For example, the sample traffic signal 1702 is a vertically oriented light and thus the horizontal tier count field is not populated and the vertical tier count field is populated with the value three because the sample traffic signal has three rows of lights. The traffic signal portion 1710 may comprise a horizontal tier light count field and/or a vertical tier light count field. For example, the predefined and/or predetermined, standardized format corresponding to the observation class traffic signal may comprise a horizontal tier light count field and/or a vertical tier light count field. In an example embodiment, the value of the horizontal tier light count is a list and/or array having as many entries as the number of horizontal tiers of the traffic signal. Each entry indicates how many lights are in the corresponding horizontal tier of lights. The sample traffic signal 1702 is not a horizontally oriented light, and thus, in the illustrated example embodiment, the value of the horizontally tier light count field is 0. In an example embodiment, the value of the vertical tier light count is a list and/or array having as many entries as the number of vertical tiers of the traffic signal. Each entry indicates how many lights are in the corresponding vertical tier of lights. The sample traffic signal 1702 has three vertical tiers of lights with the bottom tier having two lights, the middle tier having two lights, and the top tier having one light. The value of the vertical tier light count reflects this configuration of the lights in the sample traffic signal 1702. In various embodiments, the predefined and/or predetermined standardized format corresponding to the observation class traffic signal may comprise various variations and/or additions to the fields shown in FIG. 17B.

Exemplary Driving Surface Edge Portion

In various embodiments, a maplet may comprise a driving surface edge portion. For example, if a vehicle apparatus 20 identifies one or more observations in a multi-sensor data stream that are associated with the observation class of driving surface edge, road information/data corresponding to the one or more observations may be provided as one or more driving surface edge portions of a maplet. For example, in one embodiment, a maplet comprises a driving surface edge portion for each of the one or more identified observations that are associated with the observation class driving surface edge. In an example embodiment, a maplet comprises one driving surface edge portion that includes road information/data for each of the one or more observations identified in the multi-sensor data stream and associated with the driving surface edge observation class. In various embodiments, the driving surface edge is the edge of the pavement that provides the driving surface of that portion of the road network. In various embodiments, a driving surface edge is the edge of a roadway where the surface of the adjacent to the roadway transitions to a material that is different from that of the driving surface. For example, for a paved driving surface, a driving surface edge is the edge of the roadway where the paved surface transitions to dirt, gravel, or other non-pavement material. In various scenarios, the driving surface edges may be somewhat ragged and poorly defined. In various embodiments, the driving surface edge is defined to be "on grade" transitions from the driving surface (e.g., paved surface) to a different material surface (e.g., non-paved surface, such as dirt, gravel, grass, and/or the like). In an example embodiment, the measurement rate for driving surface edge sample point coordinates is a predetermined and/or predefined spatial sampling rate. In an example embodiment, the predetermined and/or predefined spatial sampling rate is one sample point per meter.

FIG. 18A illustrates an example driving surface edge 1802 located along the edge of a road 1800. In the illustrated embodiment, the driving surface edge 1802 is an edge of the shoulder 1806. Sample points 1804A, 1804B are located along the observed driving surface edge 1802.

FIG. 18B provides an example driving surface edge portion 1810 of a maplet corresponding to the example driving surface edge 1802. In an example embodiment, the data format of the driving surface edge portion 1810 is a predefined and/or predetermined standardized format. The driving surface edge portion 1810 may comprise a timestamp field. For example, the predefined and/or predetermined, standardized format corresponding to the observation class driving surface edge may comprise a timestamp field. For example, the value of the timestamp field may be a list and/or array of timestamps (e.g., t1, . . . tn) of the sensor capture events whose body frame coordinate system instance is used to reference a corresponding sample point along the driving surface edge's spatial coordinate(s). For example, the ith value of the timestamp field may be the timestamp of the sensor capture event whose body frame coordinate system instance was used to determine the coordinates of the ith sample point 1804. In an example embodiment, the driving surface edge portion 1810 may comprise a sample point field. For example, the predefined and/or predetermined, standardized format corresponding to the object driving surface edge may comprise a sample point field. For example, the value of the sample point field may be a list or array of the coordinates of the sample points 1804 (e.g., 1804A, 1804B). Each of the sample points are located on the driving surface edge detected and/or identified in the observation. The driving surface edge sample points are located at intervals in accordance with the predetermined and/or predefined spatial sampling rate. For example, the driving surface edge sample points may be located at intervals of one meter along the driving surface edge, in an example embodiment. In an example embodiment, the driving surface edge portion 1810 may comprise a driving surface edge relative position field. For example, the predefined and/or predetermined, standardized format corresponding to the object driving surface edge may comprise a driving surface edge relative position field. For example, the value of the driving surface edge relative position field may indicate the position of the driving surface edge relative to the vehicle 5. For example, in an example embodiment, the value of the driving surface edge relative position field is either left or right. In various embodiments, the predefined and/or predetermined standardized format corresponding to the observation class driving surface edge may comprise various variations and/or additions to the fields shown in FIG. 18B.

Exemplary Roadside Barrier Portion

In various embodiments, a maplet may comprise a roadside barrier portion. For example, if a vehicle apparatus 20 identifies one or more observations in a multi-sensor data stream that are associated with the observation class of roadside barrier, road information/data corresponding to the one or more observation may be provided as one or more roadside barrier portions of a maplet. For example, in one embodiment, a maplet comprises a roadside barrier portion for each of the one or more identified observation that are associated with the observation class roadside barrier. In an example embodiment, a maplet comprises one roadside barrier portion that includes road information/data for each of the one or more observations identified in the multi-sensor data stream and associated with the roadside barrier observation class. In various embodiments, roadside barriers are defined as guard rails, embankments, road wall, and similar continuous solid boundaries located along the outer edge of a road way. In an example embodiment, a roadside barrier has a height of at least a minimum height above the road surface. In an example embodiment, the minim height is 50 cm. In an example embodiment, roadside barriers include an agglomeration of closely spaced pole-like objects (e.g., a set of pole-like objects that are less than the pole-like object minimum separation distance apart).

In an example embodiment, the measurement rate for driving surface edge sample point coordinates is a predetermined and/or predefined spatial sampling rate along the length of the roadside barrier. In an example embodiment, the predetermined and/or predefined spatial sampling rate is one sample point per meter. In an example embodiment, sample points are collected along the top edge of the roadside barrier, if the top edge is visible to the vehicle's 5 sensor(s) 29. If the top edge of a roadside barrier is not visible to the sensor(s) 29, sample points may be collected at the highest points of the roadside barrier visible to the sensor(s) 29. For roadside barriers higher than 0.5 meters (e.g., 50 cm), it is preferred to collect multiple parallel polylines of sample points at a vertical sampling rate, in an example embodiment. For example, the vertical sampling rate may be one sample point for every 0.5 meters of roadside barrier height. In an example embodiment, if it is not possible to collect sample points at multiple vertical positions along the height of the roadside barrier, it is sufficient to collect sample points along the topmost polyline of the roadside barrier (e.g., along the top surface of the roadside barrier or the top of the portion of the roadside barrier visible to the sensor(s) 29). In various embodiments, sample points are collected whenever the height of the roadside barrier transitions from less than a minimal height (e.g., 0.5 meters in height) to greater than the minimal height. For example, sample points may be taken at the beginning of the roadside barrier (e.g., when the roadside barrier reaches the minimum height). In various embodiments, sample points are collected whenever the height of the roadside barrier transitions from greater than the minimal height (e.g., 0.5 meters) to less than the minimal height. For example, sample points may be taken at the end of the roadside barrier (e.g., when the roadside barrier goes below the minimum height).

FIG. 19A illustrates an example roadside barrier 1902 located along the edge of a road 1900. In the illustrated embodiment, the roadside barrier 1902 is located at the outer edge of the shoulder 1906. Sample points 1904A, 1904B are located along the top edge and/or a polyline of the roadside barrier 1902.

FIG. 19B provides an example roadside barrier portion 1910 of a maplet corresponding to the example roadside barrier 1902. In an example embodiment, the data format of the roadside barrier portion 1910 is a predefined and/or predetermined standardized format. The roadside barrier portion 1910 may comprise a roadside barrier id field. For example, the predefined and/or predetermined, standardized format corresponding to the observation class roadside barrier may comprise a roadside barrier id field. In an example embodiment, the value of the roadside barrier id field is a unique identifier for the real world roadside barrier. In an example embodiment, the roadside barrier id is used in case any single real world roadside barrier has multiple observations accidently returned. For example, in general a maplet should only contain one maplet portion and/or road information/data for one instance of observing a real world object. For example, the roadside barrier id may uniquely identify the real world roadside barrier within the road network and/or digital map. The roadside barrier portion 1910 may comprise a timestamp field. For example, the predefined and/or predetermined, standardized format corresponding to the observation class roadside barrier may comprise a timestamp field. For example, the value of the timestamp field may be a list and/or array of timestamps (e.g., t1, . . . tn) of the sensor capture events whose body frame coordinate system instance is used to reference a corresponding sample point along the driving surface edge's spatial coordinate(s). For example, the ith value of the timestamp field may be the timestamp of the sensor capture event whose body frame coordinate system instance was used to determine the coordinates of the ith sample point 1904. In an example embodiment, the roadside barrier portion 1910 may comprise a sample point field. For example, the predefined and/or predetermined, standardized format corresponding to the object roadside barrier may comprise a sample point field. For example, the value of the sample point field may be a list or array of the coordinates of the sample points 1904 (e.g., 1904A, 1904B). Each of the sample points are located on a polyline (and/or top visible surface) of the roadside barrier detected and/or identified in the observation. The roadside barrier sample points are located at intervals in accordance with the predetermined and/or predefined spatial sampling rate. For example, the roadside barrier sample points may be located at intervals of one meter along the length of roadside barrier, in an example embodiment. In an example embodiment, the sample points include a beginning of the roadside barrier and/or an end of the roadside barrier if the beginning or end of the roadside barrier is within/along the trajectory segment represented by the maplet. In an example embodiment, the sample points are located at vertical intervals in accordance with the vertical sampling rate. In an example embodiment, the roadside barrier portion 1910 may comprise a type field. For example, the predefined and/or predetermined, standardized format corresponding to the observation class roadside barrier may comprise a type field. For example, the value of the type field may indicate a type corresponding to the roadside barrier 1902. For example, in an example embodiment, the value of the type field may be guard rail, Jersey barrier, curb, wall, fence, unknown, and/or the like. In various embodiments, the predefined and/or predetermined standardized format corresponding to the observation class roadside barrier may comprise various variations and/or additions to the fields shown in FIG. 19B.

Exemplary Lane Marking Portion

In various embodiments, a maplet may comprise a lane marking portion. For example, if a vehicle apparatus 20 identifies one or more observations in a multi-sensor data stream that are associated with the observation class of lane marking, road information/data corresponding to the one or more observations may be provided as one or more lane marking portions of a maplet. For example, in one embodiment, a maplet comprises a lane marking portion for each of the one or more identified observations that are associated with the observation class lane marking. In an example embodiment, a maplet comprises one roadside barrier portion that includes road information/data for each of the one or more observations identified in the multi-sensor data stream and associated with the lane marking observation class. In various embodiments, lane markings are markings on the road surface that denote the boundaries of lanes of the road network. Lane markings may be solid lines or dashed lines. Sample points may be taken along the length of a lane marking line. For example, a sample point is a point that lies within the lateral boundaries of the lane marking line. If a lane marking is part of a double line lane marking, sample points are collected on both lane marking lines, in an example embodiment. In various embodiments, a maplet may contain road information/data for lane markings immediately to the right and immediately to the left of the vehicle 5. For example, the maplet may contain road information/data for lane markings defining the location on the road surface of the lane within which the vehicle 5 is traveling. In an example embodiment, road information/data corresponding to other lane markings may be provided by the maplet (e.g., a lane marking corresponding to another lane of the road other than the lane the vehicle 5 is traveling in). In an example embodiment, the measurement rate for lane marking sample point coordinates along a solid lane marking line is a predetermined and/or predefined spatial sampling rate along the length of the lane marking line. In an example embodiment, the predetermined and/or predefined spatial sampling rate is one sample point per meter. In an example embodiment, when the lane marking is a dashed line, a sample point is collected for the beginning and/or end point of each dashed element of the dashed lane marking line.

FIG. 20A illustrates an example dashed lane marking line 2002 and a solid lane marking line 2006. Sample points 2004A, 2004B, 2004C, 2004D, 2004E, 2004F, 2004G are located at the beginning and ends, respectively, of the dashed elements of the dashed lane marking line 2002. Sample points 2008A, 2008B, 2008C, 2008D, 2008E are located on the solid lane marking line 2006 and are spaced in accordance with the predetermined and/or predefined spatial sample rate.

FIG. 20B provides an example lane marking portion 2010 of a maplet corresponding to the example lane marking 2002. In an example embodiment, the data format of the lane marking portion 2010 is a predefined and/or predetermined standardized format. The lane marking portion 2010 may comprise a line id field. For example, the predefined and/or predetermined, standardized format corresponding to the observation class lane marking may comprise a line id field. In an example embodiment, the value of the line id field is a unique identifier for the real world lane marking line. In an example embodiment, the line id is used in case any single real world lane marking line has multiple observations accidently returned. For example, in general a maplet should only contain one maplet portion and/or road information/data for one instance of observing a real world object. For example, the line id may uniquely identify the real world lane marking line within the road network and/or digital map. For example, the lane id may be used to group sample points on the same physical lane marking line into logical sets. In an example embodiment, when a single constantly tracked lane marking line splits into multiple separate lane marking lines, multiple new unique line ids will be assigned to each of the separate lane marking lines, starting at the split point. Conversely, in an example embodiment, when multiple, separate tracked lane marking lines merge into a single lane marking line, a new unique line id will be assigned to that separate single lane marking line, starting at the merge point. In an example embodiment, when lane marking lines come as paired double lane markings (e.g., double lines), the sample points collected on each lane marking line will have their own separate line ids.

The lane marking portion 2010 may comprise a timestamp field. For example, the predefined and/or predetermined, standardized format corresponding to the observation class lane marking may comprise a timestamp field. For example, the value of the timestamp field may be a list and/or array of timestamps (e.g., t1, . . . tn) of the sensor capture events whose body frame coordinate system instance is used to reference a corresponding sample point on the lane marking line's spatial coordinate(s). For example, the ith value of the timestamp field may be the timestamp of the sensor capture event whose body frame coordinate system instance was used to determine the coordinates of the ith sample point 2004. In an example embodiment, the lane marking portion 2010 may comprise a sample point field. For example, the predefined and/or predetermined, standardized format corresponding to the object lane marking may comprise a sample point field. For example, the value of the sample point field may be a list or array of the coordinates of the sample points 2004 (e.g., 2004A, 2004B, . . . 2004G). Each of the sample points are located on (e.g., within the lateral extent) of the corresponding lane marking line detected and/or identified in the observation. The lane marking sample points are located at intervals in accordance with the predetermined and/or predefined spatial sampling rate, for solid lane marking lines, or at a beginning and/or end point of a dashed element of the lane marking line, for dashed lane marking lines. For example, the lane marking sample points may be located at intervals of one meter along the length of solid lane marking line 2006, in an example embodiment. In an example embodiment, the sample points may be located at a beginning and/or an end of a dashed element of a dashed lane marking line 2002. In an example embodiment, the lane marking portion 2010 may comprise a marking width field. For example, the predefined and/or predetermined, standardized format corresponding to the observation class lane marking may comprise a marking width field. In an example embodiment, the value of the marking width field indicates the width of the lane marking line in a direction transverse and/or perpendicular to the direction of traffic flow along the corresponding travel lane of the road network. In an example embodiment, the lane marking portion 2010 may comprise a marking separation field. For example, the predefined and/or predetermined, standardized format corresponding to the observation class lane marking may comprise a marking separation field. In an example embodiment, the value of the marking separation field indicates the separation between two logically paired, double lane markings. For example, the value of the marking separation field, for lane markings of type double, may be the distance between adjacent inner edges of the two logically paired lane markings, in an example embodiment. In an example embodiment, the lane marking portion 2010 may comprise a style field and a type field. For example, the predefined and/or predetermined, standardized format corresponding to the observation class lane marking may comprise a style field and type field. In an example embodiment, the value of the style field indicates whether the lane marking line is a solid lane marking line or a dashed lane marking line. In an example embodiment, the value of the type field indicates whether the lane marking line is a single lane marking line or is a double lane marking line (e.g., a lane marking line that is logically paired to an adjacent lane marking line). In an example embodiment, the lane marking portion 2010 may comprise a material field and a color field. For example, the predefined and/or predetermined, standardized format corresponding to the observation class lane marking may comprise a material field and a color field. In an example embodiment, the value of the material field indicates the material out of which the lane marking line is made. For example, in various embodiments the value of the material field may be paint, mechanical (e.g., bott's dots), or both. In an example embodiment, the value of the color field indicates the color of the lane marking line (e.g., white, yellow, orange, and/or the like). In various embodiments, the predefined and/or predetermined standardized format corresponding to the observation class lane marking may comprise various variations and/or additions to the fields shown in FIG. 20B.

Technical Advantages

Accurate map information/data is important for the proper functioning of autonomous and ADAS vehicles. However, a road network is not static. Various embodiments of the present invention provide methods, apparatuses, systems, computer program products, and/or the like for providing a digital map that is correct, accurate, and up-to-date such that the digital map is an effective tool for performing navigation functions that enable navigation of a road network by an autonomous, self-driving vehicle, an advanced driver assistances system (ADAS), and/or a human operator. Various embodiments of the present invention provide technical solutions to the technical problem of transmitting sufficient and rich enough road information/data for maintaining and updating the digital map while not overwhelming the limited bandwidth network over which the road information/data is transmitted. Various embodiments of the present invention provide technical solutions to the technical problem of using sensor information/data captured by a plurality of vehicles having a variety of (possibly proprietary) sensor configurations onboard to build a coherent, self-consistent, and accurate representation of the road network (e.g., the digital map). In various embodiments, the maplets and corresponding methods, apparatuses, systems, and/or computer program products provide technical solutions to these technical problems by providing a maplet that provides road information/data in a predetermined/predefined, standardized data format using a predetermined/predefined, standardized data model and that is configured to be an efficient information/data packet so as to reduce the bandwidth needed to communicate the road information/data such that road information/data may be automatically, efficiently, and timely provided by the vehicle apparatus 20 to the network apparatus 10 for use in maintaining and updating the digital map. By having the vehicle apparatus 20 prepare and provide the maplet, a significantly smaller amount of bandwidth is used than if the vehicle apparatus 20 were to transmit the raw sensor information/data needed to create the maplet. By processing the raw sensor information/data onboard the vehicle 5 (e.g., by the vehicle apparatus 20), the network apparatus 10 may not need to know the details of the variety of (possibly proprietary) sensor configurations onboard the various vehicles 5 providing the maplets. By providing maplets in the predetermined/predefined standardized format, the size of the maplets may be minimized and/or reduced as the predetermined/predefined standardized format prevents transmission of superfluous content. Additionally, the predetermined/predefined standardized format allows the network apparatus 10 to efficiently merge a plurality of maplets provided by a plurality of vehicles, validate map information/data, and/or generate map updates such that the digital map may be maintained. For example, the efficient predetermined/predefined standardized format enables the network apparatus 10, in various embodiments, to update the digital map in near real time or real time with respect to changes in the road network.

Various embodiments of the present invention provide for efficient communication of changes in a road network that are detected by a vehicle apparatus 20 to a network apparatus 10 for updating of the digital map. For example, the information/data regarding the change to the network may be encapsulated in a maplet that is configured to be an efficient information/data packet so as to reduce the bandwidth needed to communicate the information/data regarding the change to the road network. Thus, various embodiments of the present invention provide for overcoming the technical challenge of being able to provide accurate and timely updates to a digital map. The digital map may then be used by the vehicle apparatus 20 to perform various navigation functions. Thus, various embodiments provide an improvement to navigation technology by providing for efficient and accurate updating of a digital map for use by a vehicle apparatus (e.g., navigation apparatus, ADAS, autonomous vehicle, and/or the like) in performing navigation functions.

III. Example Apparatus

The network apparatus 10, vehicle apparatus 20, and/or intermediary apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, vehicle apparatus 20, and/or intermediary apparatus 30 may be embodied in other types of computing devices, such as a server, a personal computer, a computer workstation, a laptop computer, a plurality of networked computing devices or the like, that are configured to update one or more map tiles, analyze probe points for route planning or other purposes. In an example embodiment, a vehicle apparatus 20 is an in-vehicle navigation system onboard a vehicle 5 or a mobile device, a network apparatus 10 is a server, and an intermediary apparatus 30 is a server. In this regard, FIG. 2A depicts an example network apparatus 10, FIG. 2B depicts an example vehicle apparatus 20, and FIG. 2C depicts an example intermediary apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In an example embodiment, an intermediary apparatus 30 may include, may be associated with, or may otherwise be in communication with a processor 32, a memory device 34, and a communication interface 36, and/or other components configured to perform various operations, procedures, functions, or the like described herein.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, vehicle apparatus 20, and/or intermediary apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. For example, the processor 22 may be configured to execute computer-executable instructions embedded within a link record of a map tile and/or provided as part of a travel plan. Alternatively or additionally, the processor 12, 22, 32 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or vehicle apparatus 20 may include a user interface 18, 28 that may, in turn, be in communication with the processor 12, 22 to provide output to the user, such as one or more instances of map information/data and/or graphical presentations thereof, one or more routes through a road network, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network apparatus 10, vehicle apparatus 20, and/or intermediary apparatus 30 may include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, vehicle apparatus 20, and/or intermediary apparatus 30 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, road segments, nodes, intersection, and/or the like and/or the corresponding data records, a localization layer (e.g., comprising localization features) and/or the corresponding data records, and/or the like.

In an example embodiment, the road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages comprising, for example, maplets. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, vehicle apparatus 20, and/or intermediary apparatus 30 in accordance with an example embodiment may determine the time to traverse a route that includes one or more turns at respective intersections more accurately.

IV. Apparatus, Methods, and Computer Program Products

As described above, FIGS. 3, 5, 6, and 7 illustrate flowcharts of a network apparatus 10, methods, and computer program products according to an example embodiment of the invention. FIGS. 8 and 9 illustrate flowcharts of a vehicle apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor, a communication interface configured to communicate via at least one network, and at least one memory storing computer program code, the apparatus being onboard a vehicle and in communication with a plurality of sensors onboard the vehicle, the at least one memory and the computer program code configured to, with the processor, cause the apparatus to at least:
   receive a maplet request identifying a request region and requesting pole like object observation data, wherein the maplet request is selected from one of a validation maplet request, a discovery maplet request, or an update maplet request based on a map management strategy;
   responsive to determining that the vehicle is within the request region, process sensor data captured by two or more sensors of the plurality of sensors to generate a multi-sensor data stream corresponding to a segment of a road network;
   identify one or more observations corresponding to at least one pole-like object within the multi-sensor data stream, wherein a pole-like object is a generally vertical element having a length longer than a minimum length;
   generate a maplet based on the observation and the maplet request, wherein generating the maplet comprises using a predetermined data model and a predetermined data format corresponding to a pole-like object observation class to encode road data corresponding to at least one of the one or more observations corresponding to the at least one pole-like object located in the request region;
   wherein the predetermined data format includes a header with fields comprising:
      a pole like object id field, which is a unique identifier for the pole like object;
      a timestamp field which contains the timestamp of the sensor capture event whose body frame coordinate system instance is used to reference the pole like object's spatial coordinates;
      a pole like object coordinate field which contains coordinates of (a) an upper point, wherein the upper point is a point located along a central axis of the pole-like object and located at an upper portion of a visible portion of the pole-like object or (b) a lower point, wherein the lower point is a point located along a central axis of the pole-like object and located at a lower portion of a visible portion of the pole-like object; and
      a pole like object diameter field which contains values of (a) an upper diameter, wherein the upper diameter is a diameter of bounding circle bounding the pole-like object at the upper point or (b) a lower diameter, wherein the lower diameter is a diameter of a bounding circle bounding the pole-like object at the lower point; and
   provide the maplet such that a network apparatus receives the maplet, wherein the network apparatus analyzes the maplet header fields to determine a correspondence between data in the maplet header fields and a digital map of the identified request region, and validate or update the digital map of the identified request region based at least in part on the correspondence determination.

2. The apparatus of claim 1, wherein the pole-like object is one of a post used to mount a roadside sign, a street light pole, a utility pole, or a pole used to mount a traffic signal.

3. The apparatus of claim 1, wherein the predetermined format comprises one or more fields configured to receive values characterizing one or more reflectors mounted to the pole-like object.

4. A method comprising:
   receiving, by a vehicle apparatus, a maplet request identifying a request region and requesting pole like object observation data, the vehicle apparatus (a) being onboard a vehicle, (b) comprising (i) a communication interface configured to communicate via at least one network, (ii) at least one processor, and (iii) at least one memory, and (c) being in communication with a plurality of sensors onboard the vehicle, wherein the maplet request is selected from one of a validation maplet request, a discovery maplet request, or an update maplet request based on a map management strategy;
   responsive to determining that the vehicle is within the request region, processing, by the vehicle apparatus, sensor data captured by two or more sensors of the plurality of sensors to generate a multi-sensor data stream corresponding to a segment of a road network;
   identifying, by the vehicle apparatus, one or more observations corresponding to at least one pole-like object within the multi-sensor data stream, wherein a pole-like object is a generally vertical element having a length longer than a minimum length;
   generating, by the vehicle apparatus, a maplet based on the observation and the maplet request, wherein generating the maplet comprises using a predetermined data model and a predetermined data format corresponding to a pole-like object observation class to encode road data corresponding to at least one of the one or more observations corresponding to the at least one pole-like object located in the request region;

wherein the predetermined data format includes a header with fields comprising:
- a pole like object id field, which is a unique identifier for the pole like object;
- a timestamp field which contains the timestamp of the sensor capture event whose body frame coordinate system instance is used to reference the pole like object's spatial coordinates;
- a pole like object coordinate field which contains coordinates of (a) an upper point, wherein the upper point is a point located along a central axis of the pole-like object and located at an upper portion of a visible portion of the pole-like object or (b) a lower point, wherein the lower point is a point located along a central axis of the pole-like object and located at a lower portion of a visible portion of the pole-like object; and
- a pole like object diameter field which contains values of (a) an upper diameter, wherein the upper diameter is a diameter of bounding circle bounding the pole-like object at an upper point or (b) a lower diameter, wherein the lower diameter is a diameter of a bounding circle bounding the pole-like object at the lower point; and providing, by the vehicle apparatus, the maplet such that a network apparatus receives the maplet, wherein the network apparatus analyzes the maplet header fields to determine a correspondence between data in the maplet header fields and a digital map of the identified request region, and validate or update the digital map of the identified request region based at least in part on the correspondence determination.

5. The method of claim 4, wherein the pole-like object is one of a post used to mount a roadside sign, a street light pole, a utility pole, or a pole used to mount a traffic signal.

6. The method of claim 4, wherein the predetermined format comprises one or more fields configured to receive values characterizing one or more reflectors mounted to the pole-like object.

7. A computer program product comprising at least one non-transitory computer-readable storage medium having computer-readable program code portions stored therein, the computer-readable program code portions comprising executable portions configured, when executed by a processor of a vehicle apparatus onboard a vehicle, to cause the vehicle apparatus to:

receive a maplet request identifying a request region and requesting pole like object observation data, wherein the maplet request is selected from one of a validation maplet request, a discovery maplet request, or an update maplet request based on a map management strategy;

responsive to determining that the vehicle is within the request region, process sensor data captured by two or more sensors of the plurality of sensors to generate a multi-sensor data stream corresponding to a segment of a road network;

identify one or more observations corresponding to at least one pole-like object within the multi-sensor data stream, wherein a pole-like object is a generally vertical element having a length longer than a minimum length;

generate a maplet based on the observation and the maplet request, wherein generating the maplet comprises using a predetermined data model and a predetermined data format corresponding to a pole-like object observation class to encode road data corresponding to at least one of the one or more observations corresponding to the at least one pole-like object located in the request region;

provide the maplet such that a network apparatus receives the maplet, wherein the network apparatus analyzes the maplet header fields to determine a correspondence between data in the maplet header fields and a digital map of the identified request region, and validate or update the digital map of the identified request region based at least in part on the correspondence determination.

8. The computer program product of claim 7, wherein the pole-like object is one of a post used to mount a roadside sign, a street light pole, a utility pole, or a pole used to mount a traffic signal.

9. The computer program product of claim 7, wherein the predetermined format comprises one or more fields configured to receive values characterizing one or more reflectors mounted to the pole-like object.

* * * * *

UNITED STATES PATENT AND TRADEMARK OFFICE
CERTIFICATE OF CORRECTION

| | | |
|---|---|---|
| PATENT NO. | : 11,287,266 B2 | Page 1 of 1 |
| APPLICATION NO. | : 16/352301 | |
| DATED | : March 29, 2022 | |
| INVENTOR(S) | : Rabel et al. | |

It is certified that error appears in the above-identified patent and that said Letters Patent is hereby corrected as shown below:

In the Claims

<u>Column 71,</u>
Line 21, "an upper point" should read --the upper point--.

Signed and Sealed this
Twenty-eighth Day of February, 2023

*Katherine Kelly Vidal*

Katherine Kelly Vidal
*Director of the United States Patent and Trademark Office*